(12) United States Patent
Shibatani et al.

(10) Patent No.: US 8,187,666 B2
(45) Date of Patent: May 29, 2012

(54) COLOR FILTER MANUFACTURING METHOD, COLOR FILTER, IMAGE DISPLAY DEVICE, AND ELECTRONIC DEVICE

(75) Inventors: Masaya Shibatani, Nagano (JP);
Hidekazu Moriyama, Fujimi-machi (JP); Mitsuhiro Isobe, Yamanashi (JP);
Hiroshi Takiguchi, Nagano (JP);
Sadaharu Komori, Shiojiri (JP);
Junichi Sano, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 748 days.

(21) Appl. No.: 12/333,477

(22) Filed: Dec. 12, 2008

(65) Prior Publication Data
US 2009/0186202 A1 Jul. 23, 2009

(30) Foreign Application Priority Data
Jan. 18, 2008 (JP) .................................. 2008-008816

(51) Int. Cl.
*B05D 5/06* (2006.01)
*B05D 5/00* (2006.01)
*B05D 1/02* (2006.01)

(52) U.S. Cl. .......... 427/58; 427/164; 427/165; 427/256; 427/386; 427/421.1; 427/424; 427/427.3

(58) Field of Classification Search .................... 427/58, 427/164–165, 386, 421.1, 424, 427.3, 256
See application file for complete search history.

(56) References Cited

U.S. PATENT DOCUMENTS

| 2001/0026307 A1* | 10/2001 | Akahira ........................ 347/101 |
| 2005/0168526 A1* | 8/2005 | Yamada .......................... 347/43 |
| 2006/0079605 A1* | 4/2006 | Sato et al. ..................... 523/176 |
| 2006/0181660 A1* | 8/2006 | Kawashima et al. ......... 349/106 |
| 2006/0290764 A1* | 12/2006 | Nagae et al. ................. 347/107 |
| 2007/0111507 A1* | 5/2007 | Noda ............................ 438/622 |
| 2007/0252927 A1* | 11/2007 | Ichihashi et al. ............. 349/106 |
| 2009/0114888 A1* | 5/2009 | Nishida et al. ................ 252/586 |

FOREIGN PATENT DOCUMENTS

| JP | 2002-372613 A | 12/2002 |
| WO | WO 2007-116854 | * 10/2007 |

* cited by examiner

*Primary Examiner* — James Lin
(74) *Attorney, Agent, or Firm* — Global IP Counselors, LLP

(57) ABSTRACT

A color filter manufacturing method includes discharging droplets of an ink from a droplet discharge head into a plurality of cells formed on a substrate while moving the substrate with respect to the droplet discharge head, and curing the ink discharged in the cells to form a colored portion within each of the cells. The discharging of the droplets includes prohibiting landing of the droplets in a landing prohibition region formed at a predetermined width from edges of each of the cells in a movement direction of the substrate with respect to the droplet discharge head. The landing prohibition region being arranged so that a relationship $0.5 \leq L_1/L_2 \leq 4.5$ is satisfied, wherein a value $L_1$ indicates a width of the landing prohibition region and a value $L_2$ indicates an average diameter of the droplets of the ink.

12 Claims, 11 Drawing Sheets

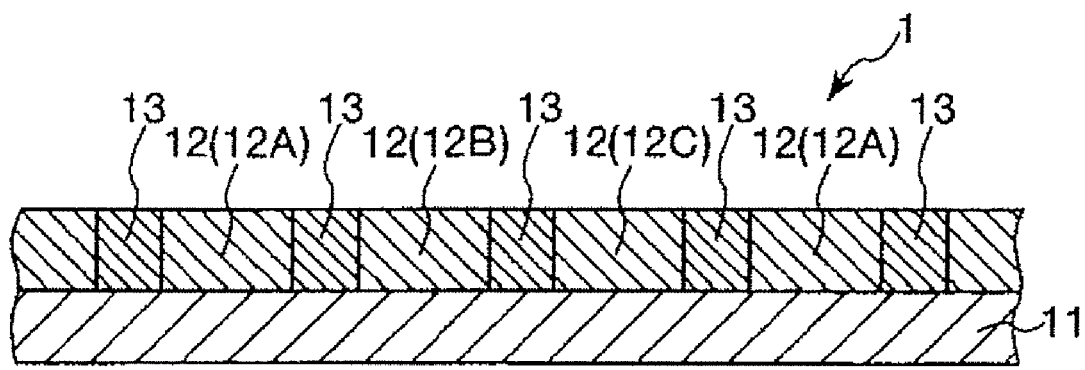
F I G. 1

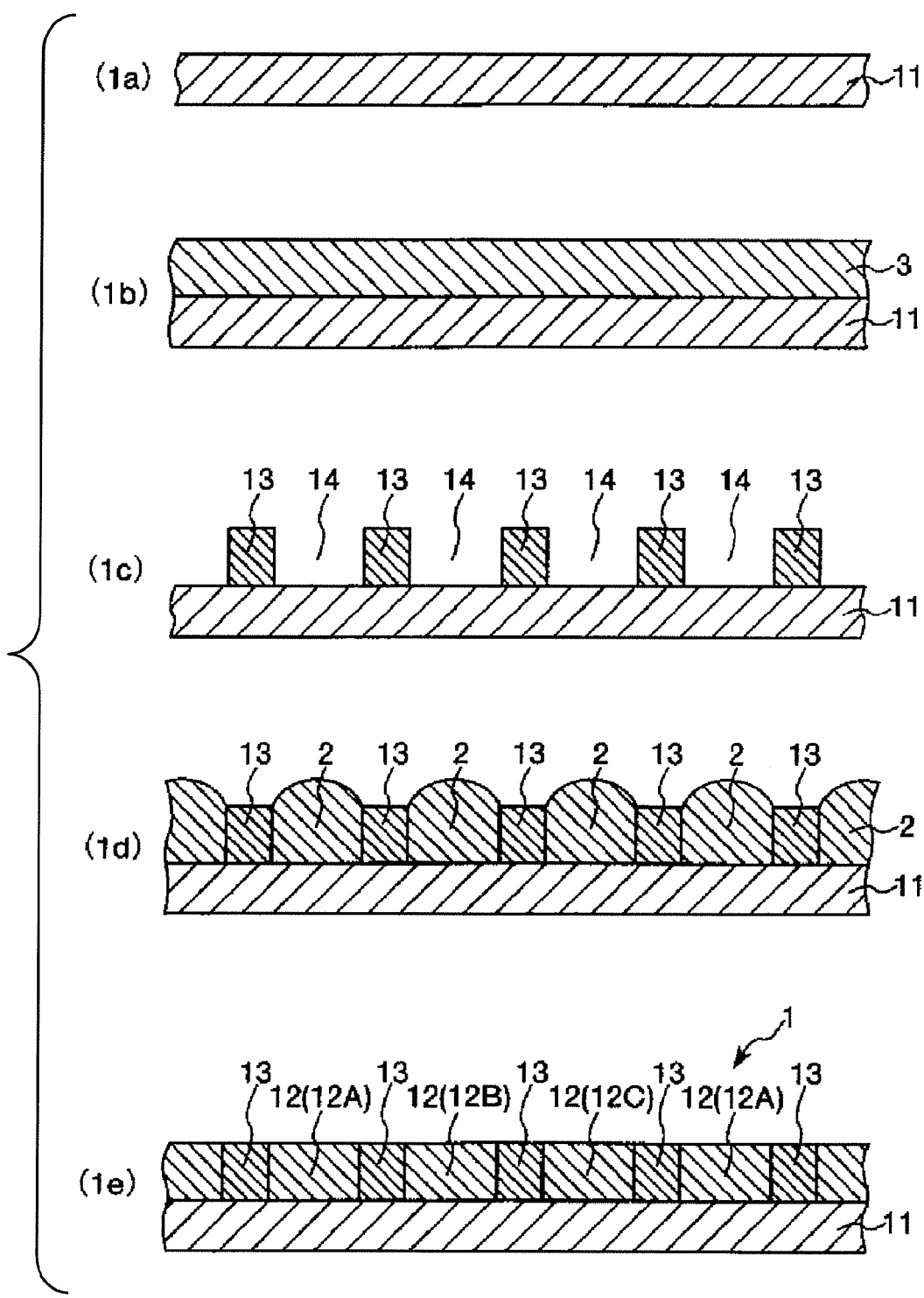
F I G. 2

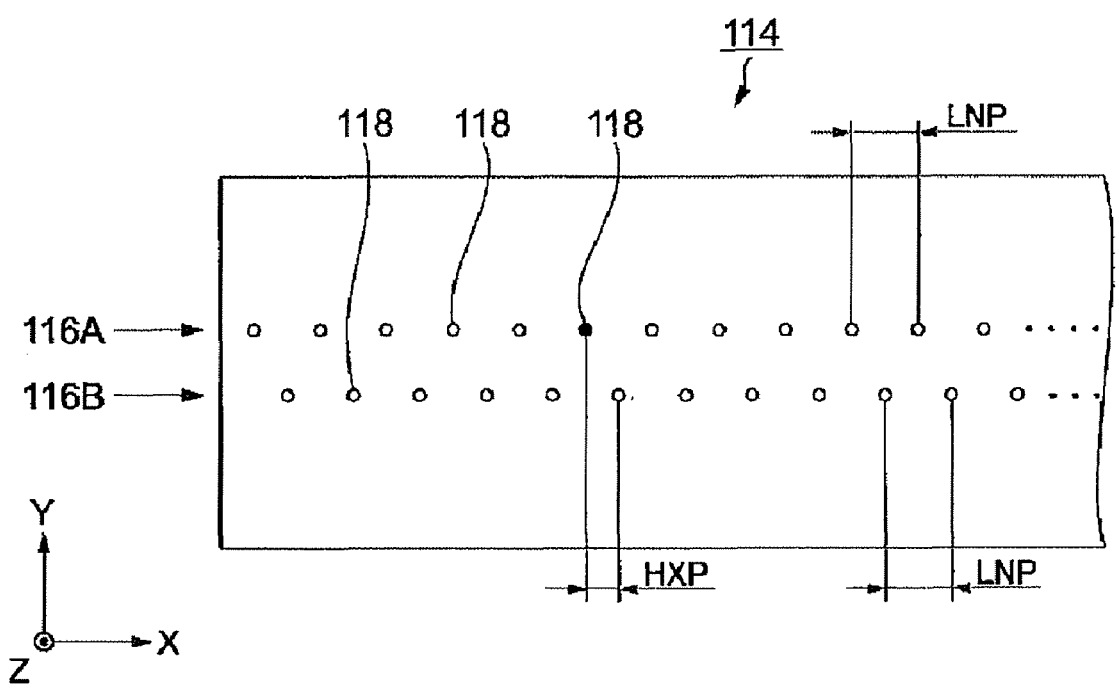
F I G. 5

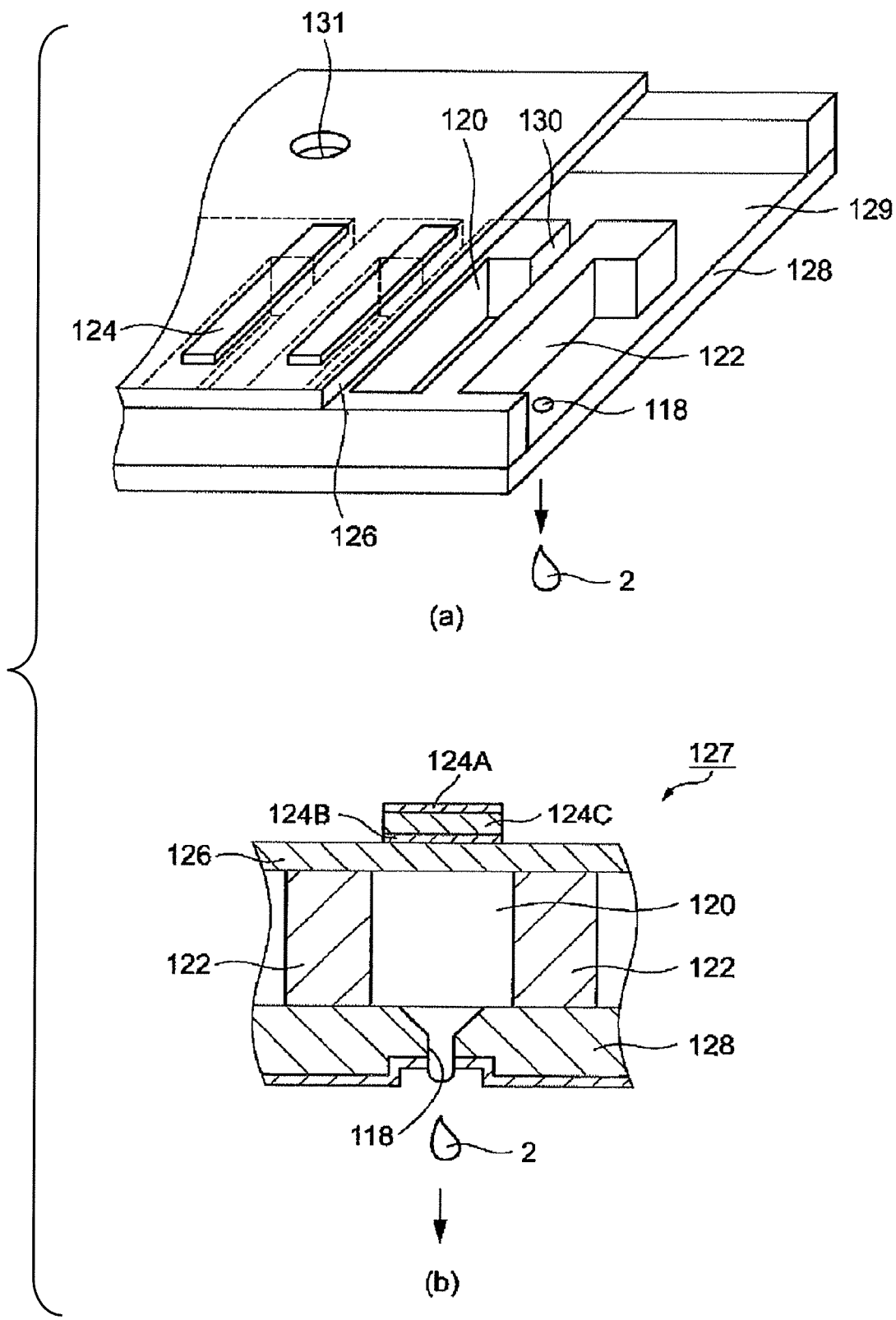
F I G. 6

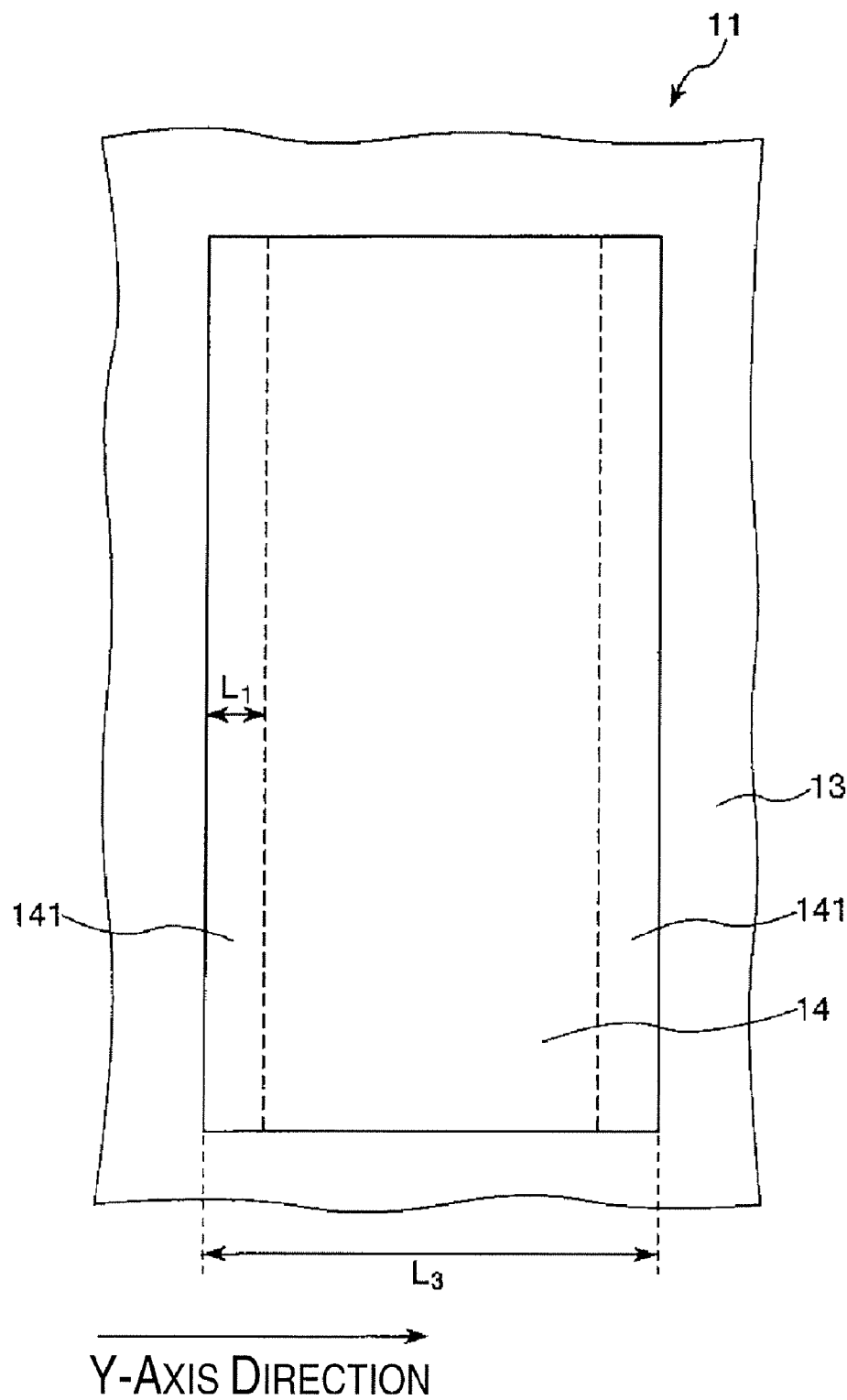
F I G. 7

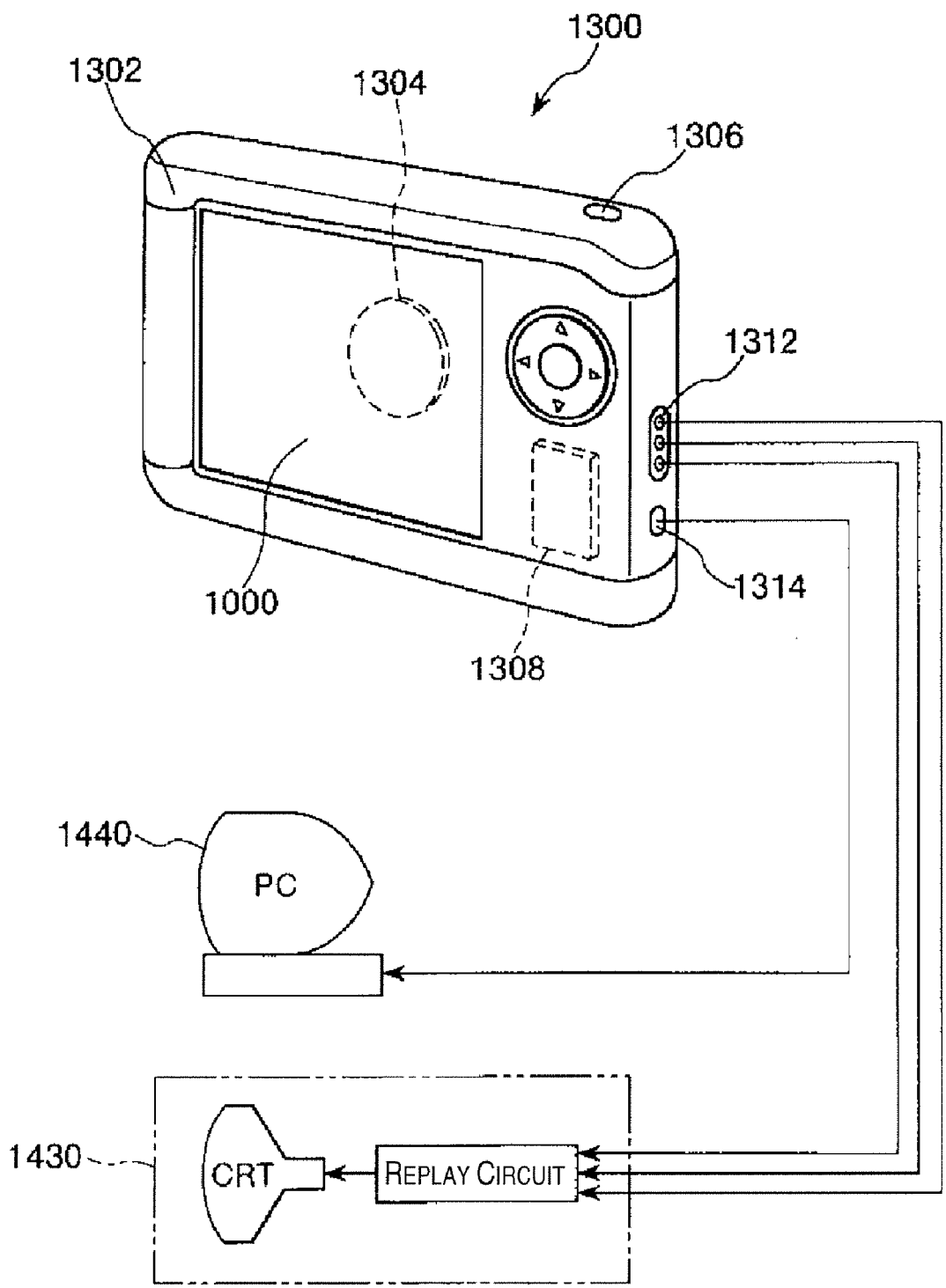
F I G. 11

COLOR FILTER MANUFACTURING METHOD, COLOR FILTER, IMAGE DISPLAY DEVICE, AND ELECTRONIC DEVICE

CROSS-REFERENCE TO RELATED APPLICATIONS

This application claims priority to Japanese Patent Application No. 2008-008816 filed on Jan. 18, 2008. The entire disclosure of Japanese Patent Application No. 2008-008816 is hereby incorporated herein by reference.

BACKGROUND

1. Technical Field

The present invention relates to a color filter manufacturing method, a color filter, an image display device, and an electronic device.

2. Related Art

Color filters are generally used in liquid crystal display devices (LCD) and the like that display color.

Color filters have conventionally been manufactured using a so-called photolithography method in which a coating film composed of a material (color layer formation composition) that includes a colorant, a photosensitive resin, a functional monomer, a polymerization initiator, and other components is formed on a substrate, and then photosensitive processing for radiating light via a photomask, development processing, and the like are performed. In such a method, the color filters are usually manufactured by repeating a process in which a coating film corresponding to each color is formed on substantially the entire surface of the substrate, only a portion of the coating film is cured, and most of the film other than the cured portion is removed, so that there is no color overlap. Therefore, only a portion of the coating film formed in color filter manufacturing remains as a color layer in the finished color filter, and most of the coating film is removed in the manufacturing process. Therefore, not only does the manufacturing cost of the color filter increase, but the process is also undesirable from the perspective of resource saving.

Methods have recently been proposed for forming the color layer of a color filter by using an inkjet head (droplet discharge head) to discharge a material (color layer formation ink; hereinafter referred to as ink) for forming a color layer in a plurality of cells provided on a substrate (see Japanese Laid-Open Patent Application No. 2002-372613, for example). In such a method, because the discharge position and the like of the ink droplets are easily controlled, and waste of the color layer formation composition can be reduced, the environmental impact can be reduced, and manufacturing cost can also be minimized.

The ink used to manufacture the color filter includes a colorant, a resin material, and other components. Therefore, such an ink usually has a high viscosity. In manufacturing the color filter, the ink is usually discharged while the substrate is moved relative to the inkjet head for the sake of productivity.

When an ink having such a relatively high viscosity is discharged, trailing can sometimes occur. Depending on the landing position of the ink, the trail portion (hereinafter referred to as the satellite) is recovered within the same cell when the trailing breaks off, but the satellite sometimes enters an adjacent cell in conjunction with the relative movement of the substrate, and the problem of mixing between adjacent cells thereby occurs. As a result, a color layer having the desired coloration cannot be formed, and the color reproduction properties of the manufactured color filter are adversely affected. The cell height and shape may be designed so as to prevent such mixing, but when the height of the cells is increased, a large amount of ink must be discharged, the thickness of the color layer increases, and the productivity and light usage efficiency are reduced. The problem of color mixing such as described above is severe when the frequency of discharge from the inkjet head is increased, and the speed of relative movement of the substrate is increased in order to enhance productivity.

SUMMARY

An object of the present invention is to provide a method for manufacturing a color filter which has excellent color reproduction properties and in which color mixing is prevented, to provide a color filter having excellent color reproduction properties, and to provide an image display device and electronic device that are provided with the color filter.

Such objects are achieved by the present invention described hereinafter.

A color filter manufacturing method according to a first aspect includes discharging droplets of an ink from a droplet discharge head into a plurality of cells formed on a substrate while moving the substrate with respect to the droplet discharge head, and curing the ink discharged in the cells to form a colored portion within each of the cells. The discharging of the droplets includes prohibiting landing of the droplets in a landing prohibition region formed at a predetermined width from edges of each of the cells in a movement direction of the substrate with respect to the droplet discharge head. The landing prohibition region being arranged so that a relationship $0.5 \leq L_1/L_2 \leq 4.5$ is satisfied, wherein a value $L_1$ (μm) indicates a width of the landing prohibition region and a value $L_2$ (μm) indicates an average diameter of the droplets of the ink.

It is thereby possible to provide a method for manufacturing a color filter which has excellent color reproduction properties and in which color mixing is prevented.

In the color filter manufacturing method as described above, the landing prohibition region is preferably arranged such that a relationship $0.025 \leq L_1/L_3 \leq 0.5$ is satisfied, wherein a value $L_3$ (μm) indicates a width of each of the cells in the movement direction of the substrate with respect to the droplet discharge head.

Color mixing of the colored portions (inks) between adjacent cells can thereby be more effectively prevented.

In the color filter manufacturing method as described above, the width $L_1$ of the landing prohibition region is preferably 3.0 to 50.0 μm.

Color mixing of the colored portions (inks) between adjacent cells can thereby be more effectively prevented.

In the color filter manufacturing method as described above, the ink preferably has a viscosity of 13 mPa·s or less at 25° C.

The ink can thereby be more reliably spread into the cells, while color mixing of the colored portions (inks) between adjacent cells is effectively prevented.

In the color filter manufacturing method as described above, the droplets preferably have a contact angle of 60° or less with respect to the substrate.

The ink can thereby be more reliably spread into the cells, while color mixing of the colored portions (inks) between adjacent cells is effectively prevented.

In the color filter manufacturing method as described above, the discharging of the droplets preferably includes moving the substrate with respect to the droplet discharge head at a speed of 30 to 400 mm/second.

Color mixing of the colored portions (inks) between adjacent cells can thereby be more effectively prevented.

In the color filter manufacturing method as described above, the substrate preferably includes a partition wall provided between an adjacent pair of the cells with the partition wall having a height of 1.4 to 2.6 μm.

Color mixing of the colored portions (inks) between adjacent cells can thereby be more effectively prevented.

In the color filter manufacturing method as described above, the ink preferably includes at least a colorant, a resin material, and a solvent with the resin material including a first polymer containing at least a first epoxy-containing vinyl monomer as a monomer component.

The discharge stability of the ink can thereby be enhanced, and color mixing of the colored portions (inks) between adjacent cells can be more effectively prevented.

In the color filter manufacturing method as described above, the first polymer is preferably a copolymer having the first epoxy-containing vinyl monomer and a second vinyl monomer as monomer components, the second vinyl monomer having an isocyanate group or a block isocyanate group in which an isocyanate group is protected by a protective group.

The discharge stability of the ink can thereby be enhanced, and color mixing of the colored portions (inks) between adjacent cells can be more effectively prevented.

In the color filter manufacturing method as described above, the first polymer is preferably a copolymer having the first epoxy-containing vinyl monomer and a third vinyl monomer as monomer components, the third vinyl monomer having a hydroxyl group.

The discharge stability of the ink can thereby be enhanced, and color mixing of the colored portions (inks) between adjacent cells can be more effectively prevented.

In the color filter manufacturing method as described above, the resin material preferably further includes a second polymer containing at least an alkoxysilyl-containing vinyl monomer represented by Formula (1) below as a monomer component.

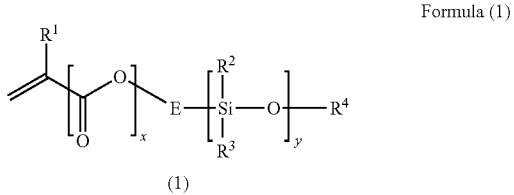

Formula (1)

(1)

In Formula (1), $R^1$ represents a hydrogen atom or a $C_{1-7}$ alkyl group, E represents a single bond hydrocarbon group or a bivalent hydrocarbon group, $R^2$ represents a $C_{1-6}$ alkyl group or a $C_{1-6}$ alkoxyl group, $R^3$ represents a $C_{1-6}$ alkyl group or a $C_{1-6}$ alkoxyl group, $R^4$ represents a $C_{1-6}$ alkyl group, a value x is 0 or 1, and a value y is an integer from 1 to 10.

The ink can thereby be provided with a satisfactory viscosity, and the ink can be more reliably spread into the entire area of the cells, while color mixing of the colored portions (inks) between adjacent cells is effectively prevented. Adhesion between the substrate and the colored portion is also enhanced.

In the color filter manufacturing method as described above, the resin material when uncured preferably further includes a third polymer containing at least a fluoroalkyl- or fluoroaryl-containing vinyl monomer represented by a chemical formula (2) below as a monomer component.

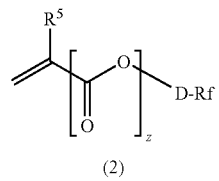

Formula (2)

(2)

In Formula (2), $R^5$ represents a hydrogen atom or a $C_{1-7}$ alkyl group, D represents a single bond hydrocarbon group, a bivalent hydrocarbon group, or a bivalent hydrocarbon group containing a hetero atom, Rf represents a $C_{1-20}$ fluoroalkyl group or fluoroaryl group, and a value z is 0 or 1.

The discharge stability of the ink can thereby be enhanced, and color mixing of the colored portions (inks) between adjacent cells can be more effectively prevented.

A color filter according to a second aspect is manufactured using the color filter manufacturing method as described above.

It is thereby possible to provide a color filter which has excellent color reproduction properties and in which color mixing is prevented.

An image display device according to a third aspect has the color filter as described above.

An image display device can thereby be provided that is capable of image display having excellent color reproduction properties.

An electronic device according to a fourth aspect has the image display device as described above.

An electronic device can thereby be provided that is capable of image display having excellent color reproduction properties.

BRIEF DESCRIPTION OF THE DRAWINGS

Referring now to the attached drawings which form a part of this original disclosure:

FIG. 1 is a cross-sectional view showing a preferred embodiment of a color filter according to the present invention.

FIG. 2 includes a series of cross-sectional views (1a) to (1e) showing a method for manufacturing a color filter.

FIG. 5 is a view showing the bottom surface of the droplet discharge head of the droplet discharge device shown in FIG. 3.

FIG. 6 includes a pair of diagrams (a) and (b) showing a droplet discharge head of the droplet discharge device shown in FIG. 3, wherein FIG. 6(a) is a cross-sectional perspective view and FIG. 6(b) is a cross-sectional view.

FIG. 7 is an enlarged plan view of a cell formed on the substrate.

FIG. 11 is a perspective view showing a digital still camera exemplifying an electronic device in accordance with the present invention.

DETAILED DESCRIPTION OF EXEMPLARY EMBODIMENTS

Figure 3:
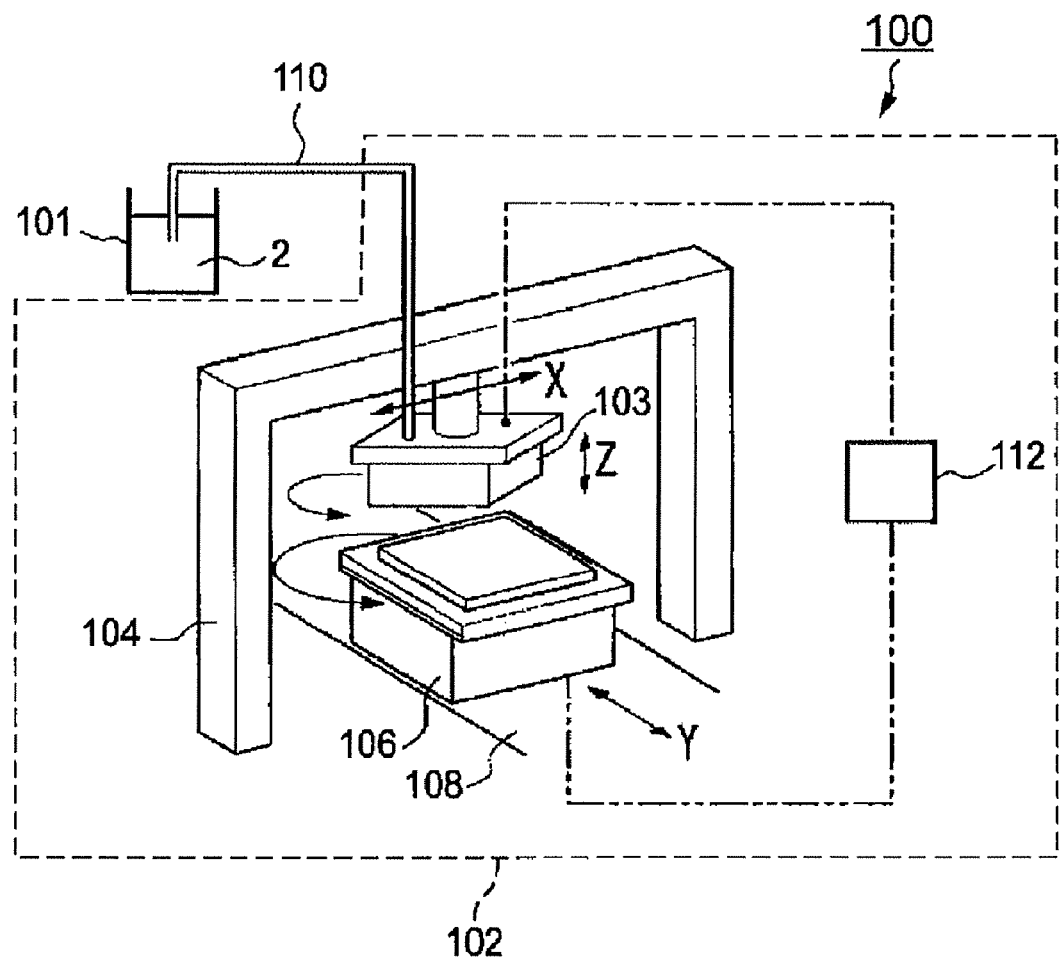
FIG. 3 is perspective view showing a droplet discharge device used in the manufacture of the color filter.

Preferred embodiments of the present invention will be described in detail hereinafter.

Color Filter

An example of the color filter of the present invention will first be described.

FIG. 1 is a sectional view showing a preferred embodiment of the color filter of the present invention.

A color filter 1 is provided with a substrate 11 and colored portions 12 formed using the color filter ink described above, as shown in FIG. 1. The colored portions 12 are provided with a first colored portion 12A, a second colored portion 12B, and a third colored portion 12C, having mutually different colors. A partition wall 13 is disposed between adjacent colored portions 12.

Substrate

The substrate 11 is a plate-shaped member having optical transparency, and has a function for holding the colored portions 12 and the partition wall 13.

It is preferred that the substrate 11 be essentially composed of a transparent material. A clearer image can thereby be formed by light transmitted through the color filter 1.

The substrate 11 is preferably one having excellent heat resistance and mechanical strength. Deformations or the like caused by, e.g., heat applied during the manufacture of the color filter 1 can thereby be reliably prevented. Examples of a constituent material of the substrate 11 that satisfies such conditions include glass, silicon, polycarbonate, polyester, aromatic polyamide, polyamidoimide, polyimide, norbornene-based ring-opening polymers, and hydrogenated substances.

Colored Portions

The colored portions 12 are formed using a color filter ink set such as that described above.

The colored portions 12 are formed using a color filter ink set such as that described above, and therefore have little variation in characteristics between pixels, and unintentional color mixing (mixing of a plurality of color filter inks) and the like is reliably prevented. For this reason, the color filter 1 is highly reliable in that the occurrence of unevenness of color and saturation, and the like is reduced. The color filter 1 also has excellent contrast and excellent coloration properties of the colored portions 12.

Each colored portion 12 is disposed inside a cell 14, which is an area enclosed by a later-described partition wall 13.

The first colored portion 12A, the second colored portion 12B, and the third colored portion 12C have mutually different colors. For example, the first colored portion 12A can be a red filter area (R), second colored portion 12B can be a green filter area (G), and the third colored portion 12C can be a blue filter area (B). The colored portions 12A, 12B, 12C as a single set of different colors constitute a single pixel. A prescribed number of the colored portions 12 are disposed in the lateral and longitudinal directions in the color filter 1. For example, when the color filter 1 is a color filter for high definition, 1366×768 pixels are disposed; when the color filter is a color filter for full high definition, 1920×1080 pixels are disposed; and when the color filter is a color filter for super high definition, 7680×4320 pixels are disposed. The color filter 1 may be provided with, e.g., spare pixels outside of the effective area.

Partition Wall

A partition wall (bank) 13 is disposed between adjacent colored portions 12. Adjacent colored portions 12 can thereby be reliably prevented from color mixing, and as a result, a sharp image can be reliably displayed.

The partition wall 13 may be composed of a transparent material, but is preferably composed of material having light-blocking properties. An image with excellent contrast can thereby be displayed. The color of the partition wall (light-blocking portion) 13 is not particularly limited, but black is preferred. Accordingly, the contrast of a displayed image is particularly good.

The height of the partition wall 13 is preferably 1.4 to 2.6 μm, and more preferably 1.6 to 2.5 μm. Color mixing (ink color mixing) between adjacent colored portions 12 can thereby be reliably prevented. Image display devices and electronic devices provided with the color filter 1 can also be provided with excellent visual angle characteristics. The height of a partition wall 13 is the height from the bottom of the inside of a cell 14 to the top of the partition wall 13.

The partition wall 13 may be composed of any material, but is preferably composed principally of a resin material, for example. Accordingly, a partition wall 13 having a desired shape can be easily formed using a method described hereinafter. In the case that the partition wall 13 functions as a light-blocking portion, carbon black or another light-absorbing material may be included as a constituent element of the partition wall.

Method for Manufacturing Color Filter

Next, an example of the method for manufacturing the color filter will be described.

Figure 4:
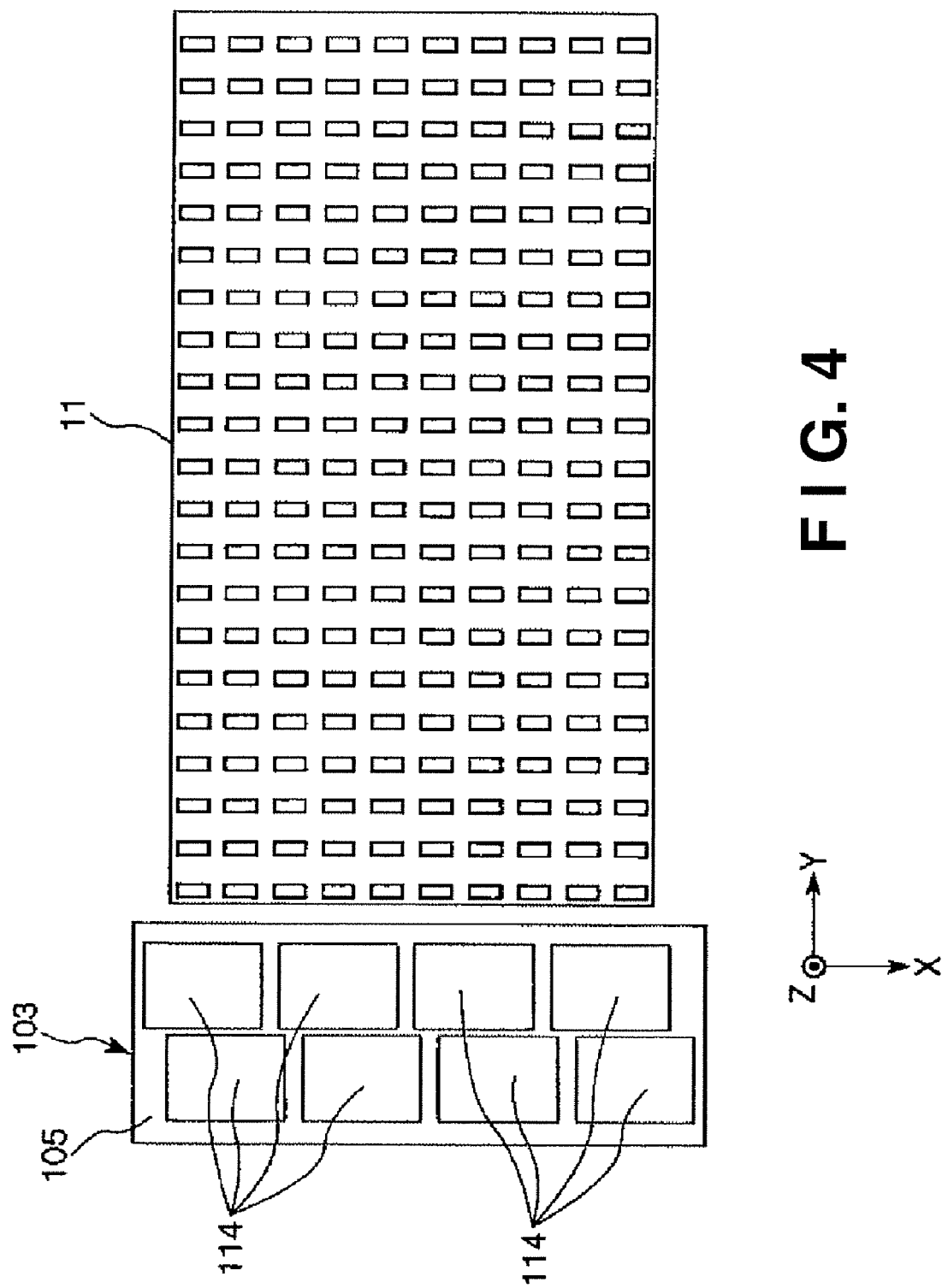
FIG. 4 is a view of the droplet discharge means of the droplet discharge device shown in FIG. 3 as seen from the stage.

FIG. 2 is a cross-sectional view showing a method for manufacturing a color filter; FIG. 3 is a perspective view showing the droplet discharge device used in the manufacture of the color filter; FIG. 4 is a view of droplet discharge means in the droplet discharge device shown in FIG. 3, as seen from the stage side; FIG. 5 is a view showing the bottom surface of the droplet discharge head in the droplet discharge device shown in FIG. 3; FIG. 6 is a view showing the droplet discharge head in the droplet discharge device shown in FIG. 3, wherein FIG. 6(a) is a cross-sectional perspective view and FIG. 6(b) is a cross-sectional view; and FIG. 7 is an enlarged plan view showing a cell formed on the substrate.

The color filter manufacturing method of the present invention has an ink application step of applying droplets of ink used to form colored portions (hereinafter referred to simply as "ink") from a droplet discharge head in a cell while moving a substrate, to which numerous cells are provided, in relation to the droplet discharge head; and a colored portion formation step of curing the ink applied in the cell to form a colored portion.

As shown in FIG. 2, the color filter manufacturing method in the present embodiment has a substrate preparation step (1a) of preparing the substrate 11, a partition wall formation step (1b, 1c) of forming a partition wall 13 on the substrate 11, an ink application step (1d) of moving the substrate 11 in relation to the droplet discharge head and applying the ink 2 by an inkjet method in a region (cell) 14 surrounded by the partition wall 13, and a colored portion formation step (1e) of removing the solvent from the ink 2 and then curing to form a colored portion 12.

Each step will be described in detail below.

Substrate Preparation Step

First, a substrate 11 is prepared (1a). It is preferred that the substrate 11 to be prepared in the present step undergo a washing treatment. The substrate 11 to be prepared in the present step may be washed by chemical treatment using a silane-coupling agent or the like, a plasma treatment, ion plating, sputtering, gas phase reaction, vacuum deposition, or another suitable washing treatment.

Partition Wall Formation Step

Next, a radiation-sensitive composition for forming the partition wall of the substrate 11 is applied to substantially the entire surface of one of the surfaces of the substrate 11 to form (1b) a coated film 3. A prebaking treatment may be performed as required after the radiation-sensitive composition has been applied to the substrate 11. The prebaking treatment may be carried out under the conditions of, e.g., a heating temperature of 50 to 150° C. and a heating time of 30 to 600 seconds.

Next, a partition wall 13 is formed (1c) by irradiating the surface via a photomask, performing a post exposure bake (PEB), and carrying out a development treatment using an alkali development fluid. PEB can be carried out under the following example conditions: a heating temperature of 50 to 150° C., a heating time of 30 to 600 seconds, and a radiation intensity of 1 to 500 mJ/cm$^2$. The development treatment can be performed using, e.g., fluid overflow, dipping, vibration soaking, or another method, and the development treatment time can be set to 10 to 300 seconds, for example. After the development treatment, a post baking treatment may be performed as required. The post baking treatment can be carried out under the following example conditions: a heating temperature of 150 to 280° C. and a heating time of 3 to 120 minutes.

Ink Application Step

Next, the ink 2 is applied (1d) to the cells 14 surrounded by the partition wall 13 using the inkjet method.

The present step is carried out using a color filter ink set provided with a plurality of types of inks 2 that correspond to the plurality of colors of the colored portions 12 to be formed.

In the present embodiment, discharge of the ink 2 is performed using a droplet discharge device such as that shown in FIGS. 3 through 6.

The droplet discharge device 100 used in the present step is provided with a tank 101 for holding the ink 2, a tube 110, and a discharge scan unit 102 to which the ink 2 is fed from the tank 101 via the tube 110, as shown in FIG. 3. The discharge scan unit 102 is provided with droplet discharge means 103 in which a plurality of droplet discharge heads (inkjet heads) 114 is mounted on a carriage 105, a first position controller 104 (movement means) for controlling the position of the droplet discharge means 103, a stage 106 for holding the substrate 11 (hereinafter simply referred to as "substrate 11") on which the partition wall 13 is formed in an aforementioned step, a second position controller 108 (movement means) for controlling the position of the stage 106, and control means 112. The tank 101 and the plurality of droplet discharge heads 114 in the droplet discharge means 103 are connected by the tube 110, and the ink 2 is fed by compressed air from the tank 101 to each of the plurality of droplet discharge heads 114.

The first position controller 104 moves the droplet discharge means 103 along the X-axis direction and Z-axis direction orthogonal to the X-axis direction, in accordance with a signal from the control means 112. The first position controller 104 also has a function for rotating the droplet discharge means 103 about the axis parallel to the Z-axis. In the present embodiment, the Z-axis direction is the direction parallel to the perpendicular direction (i.e., the direction of gravitational acceleration). The second position controller 108 moves the stage 106 along the Y-axis direction, which is orthogonal to both the X-axis direction and the Z-axis direction, in accordance with a signal from the control means 112. The second position controller 108 also has a function for rotating the stage 106 about the axis parallel to the Z-axis.

The stage 106 has a surface parallel to both the X-axis direction and the Y-axis direction. The stage 106 is configured so as to be capable of securing or holding the substrate 11 on the planar surface thereof, the substrate having the cells 14 in which the ink 2 is to be applied.

As described above, the droplet discharge means 103 is moved in the X-axis direction by the first position controller 104. On the other hand, the stage 106 is moved in the Y-axis direction by the second position controller 108. In other words, the relative position of the droplet discharge heads 114 in relation to the stage 106 is changed by the first position controller 104 and the second position controller 108. In other words, the substrate 11 held on the stage 106 and the droplet discharge means 103 move in a relative fashion. In the present invention, the ink is applied to the substrate while the substrate is moved in this manner in relation to the droplet discharge means (droplet discharge head).

The control means 112 is configured so as to receive from an external information processor discharge data that express the relative position in which the ink 2 is to be discharged.

The droplet discharge means 103 has a plurality of droplet discharge heads 114, which have substantially the same structure as each other, and a carriage 105 for holding the droplet discharge heads 114, as shown in FIG. 4. In the present embodiment, the number of droplet discharge heads 114 held in the droplet discharge means 103 is eight. Each of the droplet discharge heads 114 has a bottom surface on which a plurality of later-described nozzles 118 is disposed. The shape of the bottom surface of each of the droplet discharge heads 114 is a polygon having two short sides and two long sides. The bottom surface of the droplet discharge heads 114 held in the droplet discharge means 103 faces the stage 106 side, and the long-side direction and the short-side direction of the droplet discharge heads 114 are parallel to the X-axis direction and the Y-axis direction, respectively.

The droplet discharge heads 114 have a plurality of nozzles 118 aligned in the X-axis direction, as shown in FIG. 5. The plurality of nozzles 118 is disposed so that a nozzle pitch HXP in the X-axis direction in the droplet discharge heads 114 has a prescribed value. The specific value of the nozzle pitch HXP is not particularly limited, but may be 50 to 90 μm, for example. In this case, "the nozzle pitch HXP in the X-axis direction in the droplet discharge heads 114" corresponds to the pitch between a plurality of nozzle images obtained by projecting all of the nozzles 118 in the droplet discharge heads 114 on the X axis along the Y-axis direction.

In the present embodiment, the plurality of nozzles 118 in the droplet discharge heads 114 forms a nozzle row 116A and a nozzle row 116B, both of which extend in the X-axis direction. The nozzle row 116A and the nozzle row 116B are disposed in parallel across an interval. In the present embodiment, 90 nozzles 118 are aligned in a row in the X-axis direction with a fixed interval LNP in each nozzle row 116A and nozzle row 116B. The specific value of LNP is not particularly limited, but may be 100 to 180 μm, for example.

The position of the nozzle row 116B is offset in the positive direction of the X-axis direction (the right-hand direction of FIG. 5) by half the length of the nozzle pitch LNP in relation to the position of the nozzle row 116A. For this reason, the nozzle pitch HXP in the X-axis direction of the droplet discharge heads 114 is half the length of the nozzle pitch LNP of the nozzle row 116A (or the nozzle row 116B).

Therefore, the nozzle line density in the X-axis direction of the droplet discharge heads 114 is twice the nozzle line density of the nozzle row 116A (or the nozzle row 116B). In the present specification, "the nozzle line density in the X-axis direction" corresponds to the number per unit length of the plurality of nozzle images obtained by projecting a plurality of nozzles on the X-axis along the Y-axis direction. Naturally, the number of nozzle rows included in the droplet discharge heads 114 is not limited to two rows. The droplet discharge heads 114 may include M number of nozzle rows. In this case, M is a natural number of 1 or higher. In this case, the plurality of nozzles 118 in each of the M number of nozzle rows is aligned at a pitch having a length that is M times that of the nozzle pitch HXP. In the case that M is a natural number of 2 or higher, another (M−1) number of nozzle rows are offset in the X-axis direction without overlapping, by a length i times that of the nozzle pitch HXP, in relation to a single nozzle row among the M number of nozzle rows. Here, i is a natural number from 1 to (M−1).

In the present embodiment, since the nozzle row 116A and the nozzle row 116B are each composed of 90 nozzles 118, a single droplet discharge head 114 has 180 nozzles 118. However, five nozzles at each end of the nozzle row 116A are set as "reserve nozzles." Similarly, five nozzles at each end of the nozzle row 116B are set as "reserve nozzles." The ink 2 is not discharged from these 20 "reserve nozzles." For this reason, 160 nozzles 118 among the 180 nozzles 118 in the droplet discharge heads 114 function as nozzles for discharging the ink 2.

In the droplet discharge means 103, the plurality of droplet discharge heads 114 is disposed in two rows along the X-axis direction, as shown in FIG. 4. One of the rows of droplet discharge heads 114 and the other row of droplet discharge heads 114 are disposed so that a portion of the droplet discharge heads overlap as viewed from the Y-axis direction, with consideration given to the reserve nozzles. The nozzles 118 for discharging the ink 2 are thereby configured so as to be continuous in the X-axis direction at the nozzle pitch HXP across the length of the dimension in the X-axis direction of the substrate 11 in the droplet discharge means 103.

In the droplet discharge means 103 of the present embodiment, the droplet discharge heads 114 are disposed so as to cover the entire length of the dimension in the X-axis direction of the substrate 11. However, the droplet discharge means in the present invention may cover a portion of the length of the dimension in the X-axis direction of the substrate 11.

Each of the droplet discharge heads 114 is an inkjet head, as shown in FIGS. 6A and 6B. More specifically, each of the droplet discharge heads 114 is provided with a vibration plate 126 and a nozzle plate 128. A fluid reservoir 129 in which the ink 2 fed from the tank 101 via a hole 131 is constantly filled is positioned between the vibration plate 126 and the nozzle plate 128.

A plurality of partition walls 122 is disposed between the vibration plate 126 and the nozzle plate 128. The portions enclosed by the vibration plate 126, the nozzle plate 128, and a pair of partition walls 122 are cavities 120. Since the cavities 120 are disposed in correspondence with the nozzles 118, the number of cavities 120 and the number of nozzles 118 is the same. The ink 2 is fed to the cavities 120 from the fluid reservoir 129 via supply ports 130 positioned between pairs of partition walls 122.

An oscillator 124 is positioned on the vibration plate 126 in correspondence with each of the cavities 120. The oscillator 124 includes a piezoelement 124C, and a pair of electrodes 124A, 124B that sandwich the piezoelement 124C. The ink 2 is discharged from the corresponding nozzle 118 by applying a drive voltage between the pair of electrodes 124A, 124B. The shape of the nozzles 118 is adjusted so that the ink 2 is discharged in the Z-axis direction from the nozzles 118.

The control means 112 (see FIG. 3) may be configured so as to independently apply signals to each of the plurality of oscillators 124. In other words, the volume of the ink 2 discharged from the nozzles 118 can be controlled for each nozzle 118 in accordance with a signal from the control means 112. The control means 112 can also set the nozzles 118 that will perform a discharge operation during a coating scan, as well as the nozzles 118 that will not perform a discharge operation.

In the present specification, the portion that includes a single nozzle 118, a cavity 120 that corresponds to the nozzle 118, and the oscillator 124 that corresponds to the cavity 120 will be referred to as a "discharge portion 127". In accordance with this is designation, a single droplet discharge head 114 has the same number of discharge portions 127 as the number of nozzles 118.

The ink 2 corresponding to the plurality of colored portions 12 of the color filter 1 is applied to the cells 14 using such a droplet discharge device 100. The ink 2 can be selectively applied with good efficiency in the cells 14 by using such a device. In the configuration shown in the drawings, the droplet discharge device 100 has a tank 101 for holding the ink 2, a tube 110, and other components for only one color, but these members may have a plurality of colors the correspond to the plurality of colored portions 12 of the color filter 1. Also, in the manufacture of the color filter 1, a plurality of droplet discharge devices 100 corresponding to a plurality of inks 2 may be used.

In the present embodiment as described above, the ink 2 is applied in the cells 14 while the substrate 11 is moved in relation to the droplet discharge head. Applying the ink 2 in this manner makes it possible to increase the production properties of the color filter 1.

The ink used to manufacture a color filter includes a colorant, a resin material, and other components, and therefore generally has high viscosity. In manufacturing the color filter, the ink is usually discharged while the substrate is moved relative to the inkjet head for the sake of productivity. When an ink having such a relatively high viscosity is discharged, trailing can sometimes occur. Depending on the landing position of the ink, the trail portion is recovered within the same cell when the trailing breaks off, but the trail portion sometimes enters an adjacent cell in conjunction with the relative movement of the substrate, and the problem of mixing between adjacent cells thereby occurs. As a result, a color layer having the desired coloration cannot be formed, and the color reproduction properties of the manufactured color filter are adversely affected. The cell height may be increased so as to prevent such mixing, but when the height of the cells is increased, a large amount of ink must be discharged, the thickness of the color layer increases, and the productivity and light usage efficiency are reduced. The problem of color mixing such as described above is severe when the frequency of discharge from the inkjet head is increased, and the speed of relative movement of the substrate is increased in order to enhance productivity.

Therefore, as a result of concentrated investigation, the inventors discovered that the problems described above can be overcome by providing a landing prohibition region in which the landing of ink is prohibited at a predetermined width from the edge of the cells in the direction in which the substrate moves in relation to the droplet discharge head. Specifically, the trailing portion of the ink can be prevented from entering an adjacent cell by providing a landing prohibition region that satisfies the relationship $0.5 \leq L_1/L_2 \leq 0.45$, wherein $L_1$ (μm) is the width of the landing prohibition region, and $L_2$ (μm) is the average diameter of the ink droplets. As a result, color mixing between adjacent colored portions is prevented, and a color filter having excellent color reproduction properties can be provided.

In contrast, when $L_1/L_2$ is less than the lower limit, it is impossible to prevent the trailing portion of the ink from entering an adjacent cell, and color mixing between adjacent colored portions occurs. When $L_1/L_2$ exceeds the upper limit, it is difficult to cause the ink to spread into the cells, and light leakage (white spots, bright points) results in the color filter.

The present invention is thus characterized in that a landing prohibition region is provided that satisfies the relationship $0.5 \leq L_1/L_2 \leq 4.5$, wherein $L_1$ (μm) is the width of the landing prohibition region, and $L_2$ (μm) is the average diameter of the ink droplets, but the relationship $0.6 \leq L_1/L_2 \leq 4.3$ is more preferably satisfied. Satisfying such a relationship makes it possible to more significantly demonstrate the effects of the present invention.

In the present invention, the landing prohibition region is a region based on the center of a droplet, and is a region into which the center of a droplet is not allowed to enter when landing occurs.

In the present invention, the average diameter of the ink droplets is the average of the diameters in a case in which droplets discharged from a volume of ink discharged in one cycle are spheres having a density of 1.0 g/cm$^3$.

In the present invention, the term "direction in which the substrate moves in relation to the droplet discharge head" refers to the primary direction in which the substrate moves in relation to the droplet discharge head, and is the Y-axis direction of the drawings in the present embodiment.

In the present embodiment, landing prohibition regions 141 in which landing of the ink 2 is prohibited are provided at a predetermined width X from the edges on both sides of the cell 14 in the Y-axis direction (the direction in which the substrate 11 moves in relation to the droplet discharge head 114), as shown in FIG. 7.

The landing prohibition regions 141 provided to both edges in this manner are configured so that droplets are prevented from landing within the landing prohibition region 141 on the left side in FIG. 7 when the substrate 11 is moved to the right in FIG. 7 with respect to the droplet discharge head 114, and so that droplets are prevented from landing within the landing prohibition region 141 on the right side in FIG. 7 when the substrate 11 is moved to the left in FIG. 7 with respect to the droplet discharge head 114. The degree of freedom of the movement direction of the substrate 11 relative to the droplet discharge head 114 can thereby be enhanced, and the production properties of the color filter 1 can be effectively enhanced.

The relationship $0.025 \leq L_1/L_3 \leq 0.5$ is preferably satisfied, and the relationship $0.033 \leq L_1/L_3 \leq 0.4$ is more preferably satisfied, wherein $L_1$ (μm) is the width of the landing prohibition region 141, and $L_3$ (μm) is the width of the cell 14 in the Y-axis direction. The colors of ink 2 can thereby be more effectively prevented from mixing between adjacent cells 14.

The specific width of the landing prohibition region 141 is preferably 3.0 to 50.0 μm, and more preferably 5.0 to 45.0 μm. The colors of ink 2 can thereby be even more effectively prevented from mixing between adjacent cells 14.

The movement speed of the substrate 11 in relation to the droplet discharge head 114 is preferably 30 to 400 mm/second, and more preferably 50 to 380 mm/second. The colors of ink 2 can thereby be more effectively prevented from mixing between adjacent cells 14.

In the present invention, the droplet discharge heads 114 may use an electrostatic actuator in place of the piezoelement as the drive element. The droplet discharge heads 114 may have a configuration in which an electrothermal converter is used and colored ink is discharged using the thermal expansion of material produced by an electrothermal converter.

Colored Portion Formation Step

Curing Step

Next, the solvent (dispersion medium) is removed from the ink 2 in the cells 14, and solid colored portions 12 are formed by curing the resin material included in the ink 2 (1e). The color filter 1 is obtained in this manner.

The present step is ordinarily carried out by heating, but in the present step, depending on the type of solvent or resin material constituting the ink 2, treatments involving irradiation with active energy rays, treatments in which the substrate 11 to which the ink 2 has been applied is placed in a reduced-pressure environment, and other treatments may also be performed, for example. The curing reaction of the resin material can be made to proceed with good efficiency by radiating active energy rays; the curing reaction of the resin material can be reliably promoted even when the heating temperature is relatively low; the occurrence of adverse effects on the substrate 11 and other components can reliably prevented; and other effects can be obtained. Examples of the active energy rays that may be used include light rays of various wavelengths, e.g., UV rays, X-rays, g-rays, i-rays, and excimer laser light. The substrate 11 on which the ink 2 has been applied can be placed in a reduced-pressure environment, whereby the solvent (dispersion medium) can be removed with good efficiency, the shape of the colored portions in the pixels (cells) can be reliably made into good preferred shapes, the solvent (dispersion medium) can be reliably removed even when the heating temperature is relatively low, the occurrence of adverse effects on the substrate 11 and the like can be reliably prevented, and other effects can be obtained.

The heating temperature in the present step is not particularly limited, but 50 to 260° C. is preferred, and 80 to 240° C. is even more preferred.

Ink

Color Filter Ink

The ink (color filter ink) used to manufacture the color filter of the present invention will next be described in detail.

The color filter ink (also referred to hereinafter as "ink") includes a pigment, a solvent, a dispersing agent, and a curable resin material.

Curable Resin Material

The color ink constituting the color filter ink set includes a curable resin material. The adhesion of the colored portion formed using the color filter ink to the substrate can thereby be enhanced. Adverse effects on the colored portion can also be prevented when chemical application or washing is performed in a step subsequent to the ink application step by the inkjet method.

Such curable resin materials are not particularly limited, but the curable resin material preferably includes an epoxy-based resin. The adhesion of the formed colored portion to the substrate can thereby be even further enhanced. The colored portion can also be provided with higher chemical resistance (solvent resistance).

The epoxy-based resin preferably includes a polymer A (first polymer) that contains at least an epoxy-containing vinyl monomer a1 (first epoxy-containing vinyl monomer) as a monomer component. The formed colored portion can thereby be provided with particularly excellent adhesion to the substrate, chemical resistance (solvent resistance), and other characteristics, and the ink can be provided with particularly excellent discharge stability. As a result, it is possible to more reliably prevent problems such as variation of the trajectory of the discharged droplets (so-called flight deflection), inability to land the droplets in the desired position, instability of the droplet discharge quantity, and other problems even when droplets of the ink are discharged over long periods, or droplet discharge is performed continuously.

Polymer A

The polymer A will be described in detail below.

The polymer A contains at least the epoxy-containing vinyl monomer a1 as a monomer component. The polymer A may be composed of essentially a single compound, or may be a mixture of a plurality of types of compounds. However, when the polymer A is a mixture of a plurality of types of compounds, each of the compounds contains at least the epoxy-containing vinyl monomer a1 as a monomer component.

Epoxy-Containing Vinyl Monomer a1

The polymer A contains at least the epoxy-containing vinyl monomer a1 as a monomer component. Including such an epoxy-containing vinyl monomer a1 as a monomer component makes it possible to easily and reliably introduce an epoxy group into the polymer A. By including the epoxy-containing vinyl monomer a1 as a monomer component, the discharge stability of the ink can be enhanced, and color mixing of the colored portions (inks) between adjacent cells can be more effectively prevented. By including the epoxy-containing vinyl monomer a1 as a monomer component, excellent dispersion stability of the pigment such as described above in the ink can be obtained, and the ink can be provided with excellent storage stability (long-term storage properties). Including the epoxy-containing vinyl monomer a1 as a monomer component also enables the colored portion formed using the ink to have excellent chemical resistance (solvent resistance). Including the epoxy-containing vinyl monomer a1 as a monomer component also causes the curing reaction to proceed relatively gradually when the colored portion is formed, and makes it possible to effectively prevent uneven color and other effects due to rapid curing. Including the epoxy-containing vinyl monomer a1 is also advantageous because the formed colored portion can be provided with excellent hardness and other characteristics. When the polymer A includes a vinyl monomer a2 (second vinyl monomer), a vinyl monomer a3 (third vinyl monomer), and other components such as described hereinafter, the polymer can be suitably synthesized, and a polymer A having the desired characteristics can be easily and reliably obtained.

The epoxy-containing vinyl monomer a1 used may have the structure indicated by Formula (3) below, for example. When the epoxy-containing vinyl monomer a1 has such a structure, the dispersion stability of the pigment such as described above in the ink can be made particularly excellent, and the ink can be provided with particularly excellent storage stability and discharge stability. As a result, color mixing of the colored portions (inks) between adjacent cells can be more effectively prevented. When the epoxy-containing vinyl monomer a1 has the structure indicated by Formula (3) below, the formed colored portion can be provided with more superior solvent resistance. When the epoxy-containing vinyl monomer a1 has the structure indicated by Formula (3) below, the curing reaction proceeds relatively gradually when the colored portion is formed, and uneven color and other effects due to rapid curing can be effectively prevented. This is advantageous because the formed colored portion is also provided with excellent hardness and other characteristics. When the epoxy-containing vinyl monomer a1 has such a structure, the polymer A can be provided with particularly excellent compatibility with the polymer B (second polymer) described hereinafter, and the formed colored portion can be provided with particularly high transparency.

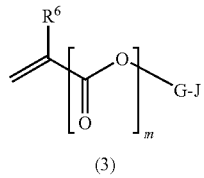

Formula (3)

(3)

In Formula (3), $R^6$ is a hydrogen atom or a $C_{1-7}$ alkyl group; G is a single bond hydrocarbon group or a bivalent hydrocarbon group which may contain a hetero atom; J is an epoxy group or an alicyclic epoxy group which may have a ring-structured $C_{3-10}$ substituted group; and m is 0 or 1.

In Formula (3), examples of the $C_{1-7}$ alkyl group indicated by $R^6$ include methyl, ethyl, propyl, isopropyl, butyl, isobutyl, s-butyl, pentyl, hexyl, heptyl, and other alkyl groups, but a hydrogen atom or a $C_{1-2}$ alkyl group is preferred, and a hydrogen atom or a methyl group is more preferred. The dispersion stability of the colorant in the ink can thereby be made particularly excellent, and the ink can be provided with particularly excellent long-term storage properties and discharge stability. As a result, color mixing of the colored portions (inks) between adjacent cells can be more effectively prevented. The contrast of the displayed image can also be made particularly excellent in the manufactured color filter. The formed colored portion can also be provided with excellent hardness and other characteristics. The polymer A can also be provided with particularly excellent compatibility with the polymer B described hereinafter, and the formed colored portion can be provided with extremely high transparency.

Typical examples of bivalent hydrocarbon groups which may contain a hetero atom indicated by G in Formula (3) include straight-chain or branched alkylene groups, or more specifically, methylenes, ethylenes, propylenes, tetramethylenes, ethyl ethylenes, pentamethylenes, hexamethylenes, oxymethylenes, oxyethylenes, oxypropylenes, and the like.

Specific examples of the epoxy-containing vinyl monomer a1 include glycidyl(meth)acrylate, methylglycidyl(meth)acrylate, ethylglycidyl(meth)acrylate, glycidyl vinylbenzyl ether (product name: VBGE; manufactured by Seimi Chemical), the alicyclic epoxy-containing unsaturated compounds indicated by Formulas (3-1) through (3-31) below, and the like; and one or more types of these compounds may be selected and used, but(3,4-epoxycyclohexyl)methyl(meth)acrylate is particularly preferred as the epoxy-containing vinyl monomer a1. The dispersion stability of the colorant in the ink can thereby be made particularly excellent, and the color filter ink can be provided with particularly excellent long-term storage properties and discharge stability. As a result, color mixing of the colored portions (inks) between adjacent cells can be more effectively prevented. The formed colored portion can also be provided with particularly excellent hardness, solvent resistance, and other characteristics. The polymer A can be provided with particularly excellent compatibility with the polymer B described hereinafter, and the colored portion formed using the ink can be provided with extremely high transparency.

Formulas (3-1) through (3-31

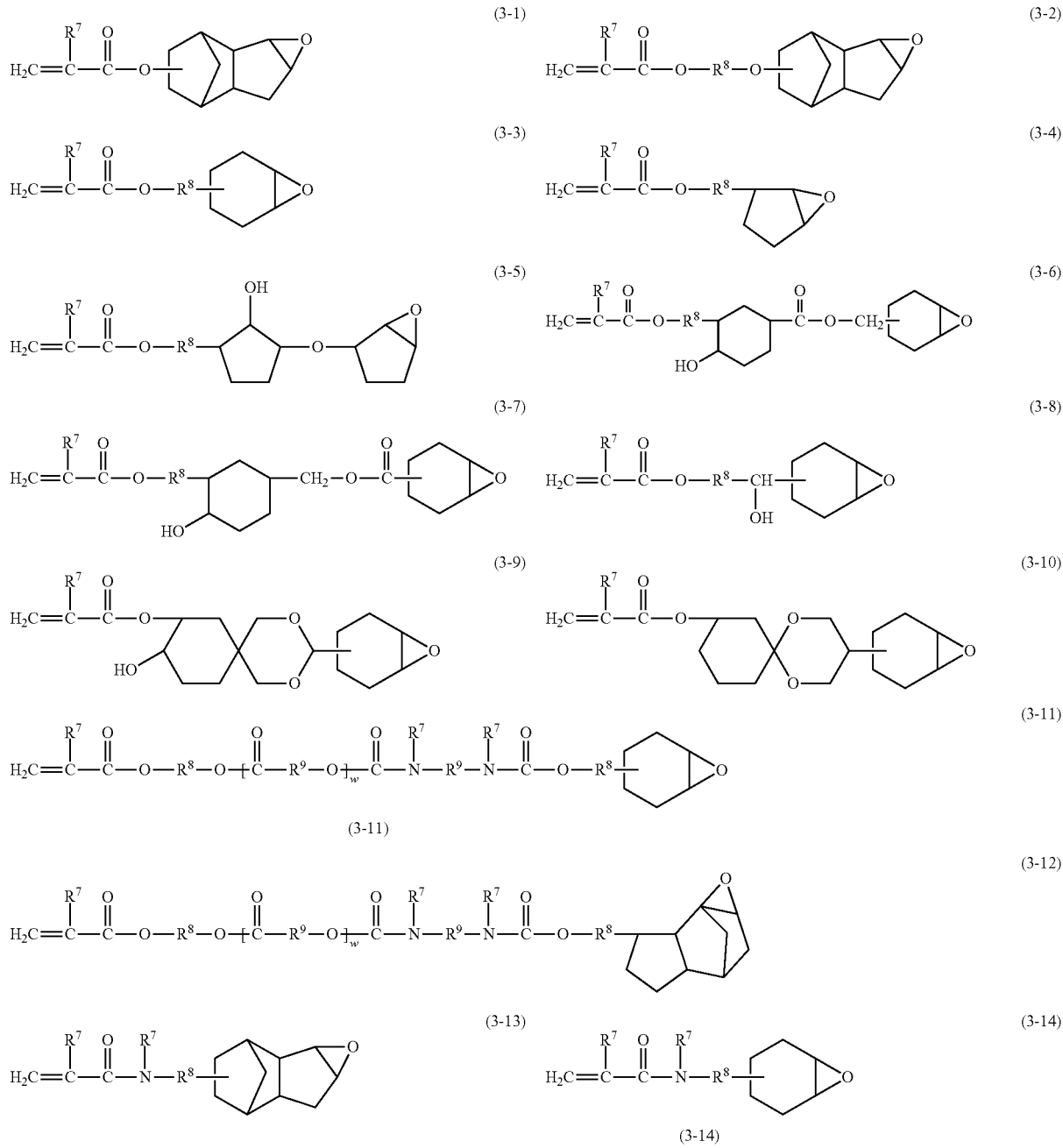

-continued (3-15) 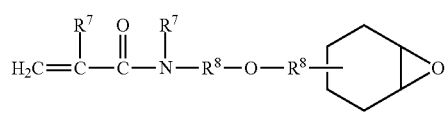

(3-16) 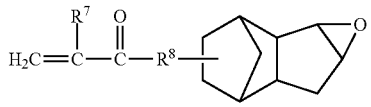

(3-17) 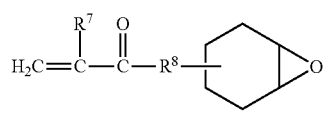

(3-18) 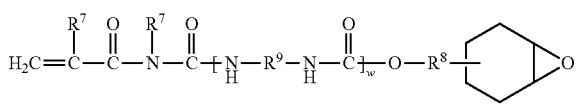

(3-19) 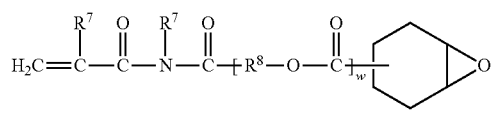

(3-20) 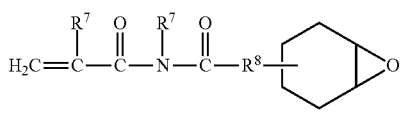

(3-21) 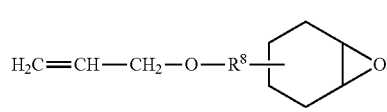

(3-22) 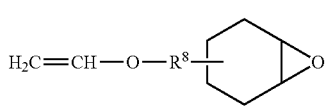

(3-23) 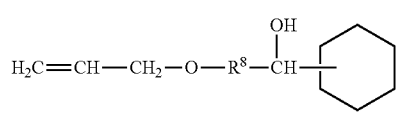

(3-24) 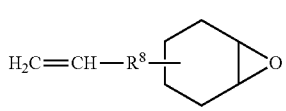

(3-25) 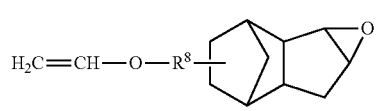

(3-26) 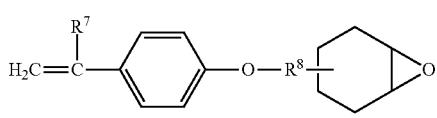

(3-27) 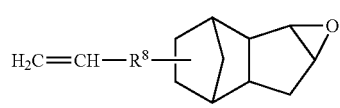

(3-28) 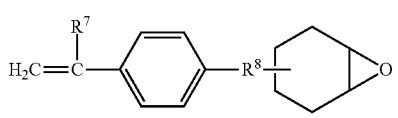

(3-29) 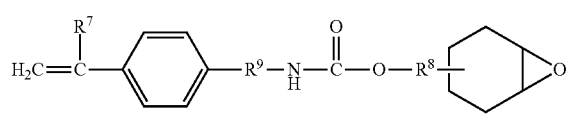

(3-30) 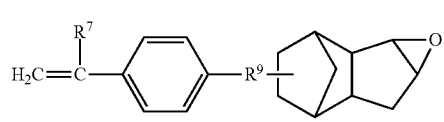

(3-31)

In Formulas (3-1) through (3-31), $R^7$ is a hydrogen atom or a methyl group; $R^8$ is a $C_{1-8}$ bivalent hydrocarbon group; and $R^9$ is a $C_{1-20}$ bivalent hydrocarbon group. $R^7$, $R^8$, and $R^9$ may be mutually the same or different, and w is 0 to 10.

The content ratio (which is a value obtained by substitution with the weight of the monomer used to synthesize the polymer) of the epoxy-containing vinyl monomer a1 in the polymer A is preferably 50 to 99 wt %, and more preferably 70 to 94 wt %. When the content ratio of the epoxy-containing vinyl monomer a1 in the polymer A is within the aforementioned range, the dispersion stability of the colorant in the ink can be made excellent, and the ink can be provided with excellent long-term storage properties and excellent discharge stability. As a result, color mixing of the colored portions (inks) between adjacent cells can be more effectively prevented. When the content ratio of the epoxy-containing vinyl monomer a1 in the polymer A is within the aforementioned range, the curing reaction proceeds relatively gradually when the colored portion is formed, uneven color and other effects due to rapid curing can be effectively prevented, and the formed colored portion can be provided with particularly excellent hardness, solvent resistance, and other characteristics. When the polymer A is a mixture of a plurality of types of compounds, the weighted average value (weighted average value based on weight ratio) of the mixed compounds may be used as the content ratio of the epoxy-containing vinyl monomer a1. When the polymer A is a mixture of a plurality of types of compounds, the compounds all preferably contain the epoxy-containing vinyl monomer a1 in such a content ratio as described above.

Vinyl Monomer a2

The polymer A may contain at least the epoxy-containing vinyl monomer a1 as a monomer component, but the polymer A is preferably one (a copolymer) containing the epoxy-containing vinyl monomer a1, as well as a vinyl monomer a2 as a monomer group provided with an isocyanate group or a blocked isocyanate group in which the isocyanate group is protected by a protective group. The content ratio of gas (dissolved gas, bubbles present as microbubbles, or the like) in the ink can thereby be reduced more effectively, and particularly excellent stability of droplet discharge by the inkjet method can be obtained. As a result, color mixing of the colored portions (inks) between adjacent cells can be more effectively prevented, and it is possible to more effectively prevent the occurrence of uneven color, uneven saturation, and the like between different regions of the manufactured color filter, and fluctuation of characteristics between individual units.

Examples of polymerizable vinyl monomers a2 include 2-acryloyloxyethyl isocyanate (product name: Karenz MOI; manufactured by Showa Denko), 2-methacryloyloxyethyl isocyanate, and other (meth)acryloyl isocyanates and the like in which (meth)acryloyl is bonded with an isocyanate group via a $C_{2-6}$ alkylene group.

The isocyanate group of the abovementioned (meth)acryloyl isocyanate is preferably a blocked isocyanate group. The term "blocked isocyanate group" refers to an isocyanate group in which the terminal ends are masked by a blocking agent. Examples of monomers having a blocked isocyanate group include 2-(0-[1'-methylpropylideneamino]carboxyamino)ethyl methacrylate and the like, and are commercially available under the trade name Karenz MOI-BM, manufactured by Showa Denko. A combination of one or more types of these polymerizable vinyl monomers may be used.

The content ratio (which is a value obtained by substitution with the weight of the monomer used to synthesize the polymer) of the vinyl monomer a2 in the polymer A is preferably 2 to 20 parts by weight, and more preferably 3 to 15 parts by weight, with respect to 100 parts by weight of the epoxy-containing vinyl monomer a1. When the content ratio of the vinyl monomer a2 in the polymer A is within the aforementioned range, the content ratio of gas (dissolved gas, bubbles present as microbubbles, or the like) in the ink can be reduced more effectively, and particularly excellent stability of droplet discharge by the inkjet method can be obtained while the ink is provided with adequately excellent storage stability and other characteristics. As a result, color mixing of the colored portions (inks) between adjacent cells can be more effectively prevented. The formed colored portion can also be provided with adequately high transparency. In contrast, when the content ratio of the vinyl monomer a2 in the polymer A is less than the lower limit of the aforementioned range, the effects of including a vinyl monomer a2 such as those described above may not be adequately demonstrated. When the content ratio of the vinyl monomer a2 in the polymer A exceeds the upper limit of the aforementioned range, the compatibility of the polymer A with the polymer B described hereinafter decreases, and the formed colored portion may be difficult to provide with adequate transparency. When the polymer A is a mixture of a plurality of types of compounds, the weighted average value (weighted average value based on weight ratio) of the mixed compounds may be used as the content ratio of the vinyl monomer a2. When the polymer A is a mixture of a plurality of types of compounds, the compounds all preferably contain the vinyl monomer a2 in such a content ratio as described above.

Vinyl Monomer a3

The polymer A may contain at least the epoxy-containing vinyl monomer a1 as a monomer component, but the polymer A is preferably one (a copolymer) containing the epoxy-containing vinyl monomer a1, as well as a vinyl monomer a3 provided with a hydroxyl group. The formed colored portion can thereby be provided with particularly excellent adhesion to the substrate, particularly adhesion under repeated exposure to sudden temperature changes that accompany image display. As a result, the occurrence of light leakage (white spots, bright points) and other problems can be reliably prevented even when the color filter is used for a long time, for example. Specifically, the color filter can be provided with particularly excellent durability. When the polymer A contains the vinyl monomer a3 as a monomer component, the polymer A can be provided with particularly excellent compatibility with the polymer B described hereinafter, and the formed colored portion can be provided with extremely high transparency.

Examples of the vinyl monomer a3 include monoester compounds of a acrylic acid or methacrylic acid with 2-hydroxyethyl(meth)acrylate, hydroxypropyl(meth)acrylate, 2,3-dihydroxybutyl(meth)acrylate, 4-hydroxybutyl(meth)acrylate, 6-hydroxyhexyl(meth)acrylate, 8-hydroxyoctyl(meth)acrylate, 4-hydroxymethyl cyclohexyl(meth)acrylate, polyalkylene glycol mono(meth)acrylate, and other polyalcohols; compounds in which ε-caprolactone is ring-open polymerized with the abovementioned monoester compounds of a polyalcohol and acrylic acid or methacrylic acid (PLACCEL FA series, PLACCEL FM series, and the like manufactured by Daicel Chemical Industries); compounds in which ethylene oxide and propylene oxide is ring-open polymerized; and the like, and one or more types of compounds selected from the above examples may be used.

The content ratio (which is a value obtained by substitution with the weight of the monomer used to synthesize the polymer) of the vinyl monomer a3 in the polymer A is preferably 2 to 20 parts by weight, and more preferably 3 to 15 parts by weight, with respect to 100 parts by weight of the epoxy-containing vinyl monomer a1. When the content ratio of the vinyl monomer a3 in the polymer A is within the aforementioned range, the color filter manufactured using the ink can be provided with particularly excellent durability while the ink is provided with adequately excellent storage stability and other characteristics. The formed colored portion can also be provided with high transparency. In contrast, when the content ratio of the vinyl monomer a3 in the polymer A is less than the lower limit of the aforementioned range, the effects of including a vinyl monomer a3 such as those described above may not be adequately demonstrated. When the content ratio of the vinyl monomer a3 in the polymer A exceeds the upper limit of the aforementioned range, it may be difficult to make the content ratio of gas in the ink adequately low. When the polymer A is a mixture of a plurality of types of compounds, the weighted average value (weighted average value based on weight ratio) of the mixed compounds may be used as the content ratio of the vinyl monomer a3. When the polymer A is a mixture of a plurality of types of compounds, the compounds all preferably contain the vinyl monomer a3 in such a content ratio as described above.

Other Polymerizable Vinyl Monomer a4

The polymer A may contain as a monomer component a polymerizable vinyl monomer a4 other than the epoxy-containing vinyl monomer a1, the vinyl monomer a2, and the vinyl monomer a3 described above. A vinyl monomer that can be copolymerized with the epoxy-containing vinyl monomer a1 may be used as the polymerizable vinyl monomer a4, and specific examples thereof include methyl(meth)acrylate, ethyl(meth)acrylate, butyl(meth)acrylate, 2-ethylhexyl(meth)acrylate, phenyl(meth)acrylate, cyclohexyl(meth)acrylate, dicyclopentanyl(meth)acrylate, dicyclopentanyloxyethyl(meth)acrylate, isobornyl(meth)acrylate, benzyl (meth)acrylate, phenyl ethyl(meth)acrylate, and other $C_{1-12}$ alkyl and aralkyl(meth)acrylates; styrene, α-methylstyrene, and other vinyl aromatic compounds; $CF_3(CF_2)_3CH_2CH=CH_2$, $CF_3(CF_2)_3CH=CH_2$, $CF_3(CF_2)_5CH_2CH=CH_2$, $CF_3(CF_2)_5CH=CH_2$, $CF_3(CF_2)_7CH=CH_2$, $CF_3(CF_2)_9CH_2CH=CH_2$, $CF_3(CF_2)_9CH=CH_2$, $(CF_3)_2CF(CF_2)_2CH_2CH=CH_2$, $(CF_3)_2CF(CF_2)_2CH=CH_2$, $(CF_3)_2CF(CF_2)_4CH_2CH=CH_2$, $(CF_3)_2CF(CF_2)_4CH=CH_2$, $(CF_3)_2CF(CH_2)_6CH_2CH=CH_2$, $(CF_3)_2CF(CF_2)_6CH=CH_2$, $F_5C_6CH=CH_2$, $CF_3(CF_2)_5CH_2CH_2OCH_2CH=CH_2$, $CF_3(CF_2)_5CH_2CH_2CH_2OCH_2CH=CH_2$, $CF_3(CF_2)_7CH_2CH_2OCH_2CH=CH_2$, $CF_3(CF_2)_7CH_2CH_2CH_2OCH_2CH=CH_2$, $CF_3(CF_2)_9CH_2CH_2OCH_2CH=CH_2$, $CF_3(CF_2)_9CH_2CH_2CH_2OCH_2CH=CH_2$, $H(CF_2)_6CH_2OCH_2CH=CH_2$, $H(CF_2)_8CH_2OCH_2CH=CH_2$, $(CF_3)_2CF(CF_2)_2CH_2CH_2OCOCH=CH_2$, $(CF_3)_2CF(CF_2)_2CH_2CH_2OCOC(CH_3)=CH_2$, $(CF_3)_2CF(CF_2)_4CH_2CH_2OCOCH=CH_2$, $(CF_3)_2CF(CF_2)_4CH_2CH_2OCOC(CH_3)=CH_2$, $(CF_3)_2CF(CF_2)_6CH_2CH_2OCOCH=CH_2$, $(CF_3)_2CF(CF_2)_6CH_2CH_2OCOC(CH_3)=CH_2$, $CF_3(CF_2)_5CH_2CH_2OCOCH=CH_2$, $CF_3(CF_2)_5CH_2CH_2OCOC(CH_3)=CH_2$, $CF_3(CF_2)_7CH_2CH_2OCOCH=CH_2$, $CF_3(CF_2)_7CH_2CH_2OCOC(CH_3)=CH_2$, $CF_3(CF_2)_9CH_2CH_2OCOCH=CH_2$, $CF_3(CF_2)_9CH_2CH_2OCOC(CH_3)=CH_2$, $H(CF_2)_6CH_2CH_2OCOCH=CH_2$, $H(CF_2)_8CH_2CH_2OCOC(CH_3)=CH_2$, $F(CF_2)_8CH_2CH_2OCOCH=CH_2$, $F(CF_2)_8CH_2CH_2OCOC(CH_3)=CH_2$, $H(CF_2)_4CH_2OCOC(CH_3)=CH_2$, $H(CF_2)_4CH_2OCOCH=CH_2$, and other fluoroalkyl- or fluoroaryl-containing vinyl compounds and the like, and one or more types of compounds selected from the above examples may be combined and used. However, the polymer A does not contain as a monomer component an alkoxysilyl-containing vinyl monomer b1 such as described hereinafter.

The content ratio (which is a value obtained by substitution with the weight of the monomer used to synthesize the polymer) of the polymerizable vinyl monomer a4 in the polymer A is preferably 20 parts by weight or less, and more preferably 10 parts by weight or less with respect to 100 parts by weight of the epoxy-containing vinyl monomer a1. When the polymer A is a mixture of a plurality of types of compounds, the weighted average value (weighted average value based on weight ratio) of the mixed compounds may be used as the content ratio of the polymerizable vinyl monomer a4. When the polymer A is a mixture of a plurality of types of compounds, the content ratio of the polymerizable vinyl monomer a4 with respect to the mixture of compounds preferably satisfies such conditions as those described above.

As described above, the polymer A may contain at least the epoxy-containing vinyl monomer a1 as a monomer component, but preferably contains the epoxy-containing vinyl monomer a1 as well as the vinyl monomer a2 and the vinyl monomer a3. The effects of including a vinyl monomer a2 such as the ones described above, and the effects of including a vinyl monomer a3 such as the ones described above can be obtained at the same time.

The ratio (content ratio) accounted for by the polymer A in the curable resin material (binder resin) is not particularly limited, but is preferably 25 to 80 wt %, and more preferably 33 to 70 wt %. When the polymer A is a mixture of a plurality of types of compounds, the sum of the content ratios of the mixed compounds may be used as the content ratio of the polymer A.

Polymer B

Besides the abovementioned components, the curable resin material may include a polymer B that contains at least the alkoxysilyl-containing vinyl monomer b1 indicated by Formula (1) below as a monomer component.

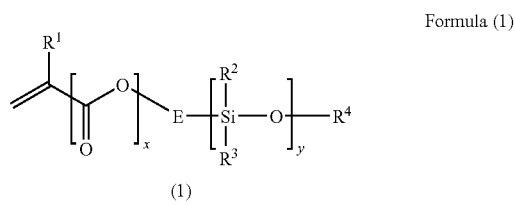

Formula (1)

In Formula (1), $R^1$ is a hydrogen atom or a $C_{1-7}$ alkyl group; E is a single bond hydrocarbon group or a bivalent hydrocarbon group; $R^2$ and $R^3$ are the same or different $C_{1-6}$ alkyl groups or $C_{1-6}$ alkoxyl groups; $R^4$ is a $C_{1-6}$ alkyl group; x is 0 or 1; and y is an integer from 1 to 10.

Such a polymer B is preferably used together with the previously described polymer A. The content ratio of gas in the ink can thereby be reduced, and the ink can be provided with particularly excellent discharge stability. As a result, color mixing of the colored portions (inks) between adjacent cells can be more effectively prevented. Including the polymer B together with the polymer A in the curable resin material also makes it possible to provide the manufactured color filter with particularly excellent durability. Excellent mixing stability of the curable resin material and the colorant can also be obtained over a long period of time, and color filters having excellent contrast can be stably manufactured over a long period of time. Including the polymer B together with the polymer A in the curable resin material also makes it possible to provide the formed colored portion with excellent light fastness. Dyes generally have inferior light fastness in comparison to pigments, but the formed colored portion can be provided with adequately excellent light fastness even when the ink includes a dye as the colorant. Since the ink, once prepared, can be suitably used for a long time, the frequency of replacing the ink and replacing the ink in the droplet discharge device can be reduced. The color filter can therefore be manufactured with particularly excellent productivity, and the consistency of quality of the manufactured color filter is enhanced.

The polymer B may be composed of essentially a single compound, or may be a mixture of a plurality of types of compounds. However, when the polymer B is a mixture of a plurality of types of compounds, each of the compounds contains at least the alkoxysilyl-containing vinyl monomer b1 as a monomer component.

Alkoxysilyl-Containing Vinyl Monomer b1

The polymer B contains at least the alkoxysilyl-containing vinyl monomer b1 indicated by Formula (1) as a monomer component. Including such an alkoxysilyl-containing vinyl monomer b1 as a monomer component makes it possible to easily and reliably introduce an alkoxysilyl group into the polymer B. By including the alkoxysilyl-containing vinyl monomer b1 as a monomer component, the formed colored portion can be provided with adequately excellent hardness, adhesion to the substrate, light fastness, thermal resistance, and other characteristics. When the polymer B includes a vinyl monomer b2 or the like such as described hereinafter, the polymer can be suitably synthesized, and a polymer B having the desired characteristics can be easily and reliably obtained.

In Formula (1), examples of the $C_{1-7}$ alkyl group indicated by $R^1$ include methyl, ethyl, propyl, isopropyl, butyl, isobutyl, s-butyl, pentyl, hexyl, heptyl, and other alkyl groups, but a hydrogen atom or a $C_{1-2}$ alkyl group is preferred, and a hydrogen atom or a methyl group is more preferred. The color filter ink can thereby be provided with particularly excellent dispersion stability of the pigment in the color filter ink (ink), and discharge stability of the color filter ink, and the formed colored portion can be provided with particularly excellent hardness, adhesion to the substrate, light fastness, thermal resistance, and other characteristics. The polymer A can also be provided with particularly excellent compatibility with the polymer B, and the formed colored portion can be provided with particularly high transparency.

Typical examples of the bivalent hydrocarbon group indicated by E in Formula (1) include straight-chain or branched alkylene groups, or more specifically, methylenes, ethylenes, propylenes, tetramethylenes, ethyl ethylenes, pentamethylenes, hexamethylenes, and the like. Among these examples, a $C_{1-3}$ straight-chain alkylene group (e.g., methylene, ethylene, propylene) is particularly preferred.

Examples of the $C_{1-6}$ alkyl groups indicated by $R^2$, $R^3$, and $R^4$ in Formula (1) include straight-chain or branched alkyl groups, e.g., methyl, ethyl, propyl, isopropyl, butyl, isobutyl, s-butyl, pentyl, hexyl, and the like. Examples of the $C_{1-6}$ alkoxyl groups indicated by $R^2$ and $R^3$ include straight-chain or branched alkoxyl groups, e.g., methoxy, ethoxy, propoxy, isopropoxy, butoxy, isobutoxy, s-butoxy, pentoxy, hexyloxy, and the like.

Specific examples of monomers indicated by Formula (1) include vinyltrimethoxysilane, vinyltriethoxysilane, vinylmethyldimethoxysilane, vinylmethyldiethoxysilane, γ-(meth)acryloyloxypropyltrimethoxysilane, γ-(meth)acryloyloxypropylmethyldimethoxysilane, γ-(meth)acryloyloxypropylmethyldiethoxysilane, γ-(meth)acryloyloxypropyltriethoxysilane, β-(meth)acryloyloxyethyltrimethoxysilane, γ-(meth)acryloyloxybutylphenyldimethoxysilane, and other alkoxysilyl-containing polymerizable unsaturated compounds and the like, and one or more types of compounds selected from the above examples may be combined and used.

The content ratio (which is a value obtained by substitution with the weight of the monomer used to synthesize the polymer) of the alkoxysilyl-containing vinyl monomer b1 in the polymer B is preferably 70 to 100 wt %, and more preferably 80 to 100 wt %. When the content ratio of the alkoxysilyl-containing vinyl monomer b1 in the polymer B is within the aforementioned range, the ink can be provided with particularly excellent dispersion stability of the pigment in the ink, and discharge stability of the ink. The formed colored portion can also be provided with particularly excellent hardness, adhesion to the substrate, light fastness, thermal resistance, and other characteristics. When the polymer B is a mixture of a plurality of types of compounds, the weighted average value (weighted average value based on weight ratio) of the mixed compounds may be used as the content ratio of the alkoxysilyl-containing vinyl monomer b1. When the polymer B is a mixture of a plurality of types of compounds, the compounds all preferably contain the alkoxysilyl-containing vinyl monomer b1 in such a content ratio as described above.

Other Polymerizable Vinyl Monomer b2

The polymer B may contain at least the alkoxysilyl-containing vinyl monomer b1 as a monomer component, but may also contain as a monomer component a polymerizable vinyl monomer b2 other than the alkoxysilyl-containing vinyl monomer b1, in addition to the alkoxysilyl-containing vinyl monomer b1. A vinyl monomer that can be copolymerized with the alkoxysilyl-containing vinyl monomer b1 may be used as the polymerizable vinyl monomer b2, and specific examples thereof include 2-hydroxyethyl(meth)acrylate, hydroxypropyl(meth)acrylate, 2,3-dihydroxybutyl(meth)acrylate, 4-hydroxybutyl(meth)acrylate, 6-hydroxyhexyl(meth)acrylate, 8-hydroxyoctyl(meth)acrylate, 4-hydroxymethyl cyclohexyl(meth)acrylate, polyalkylene glycol mono(meth)acrylate, and other monoester compounds of a polyalcohol and acrylic acid or methacrylic acid; compounds in which ε-caprolactone is ring-open polymerized with the abovementioned monoester compounds of a polyalcohol and acrylic acid or methacrylic acid (PLACCEL FA series, PLACCEL FM series, and the like manufactured by Daicel Chemical Industries); compounds in which ethylene oxide and propylene oxide is ring-open polymerized, and other polymerizable vinyl monomers provided with a hydroxyl group; methyl(meth)acrylate, ethyl(meth)acrylate, butyl(meth)acrylate, 2-ethylhexyl(meth)acrylate, phenyl(meth)acrylate, cyclohexyl(meth)acrylate, dicyclopentanyl(meth)acrylate, dicyclopentanyloxyethyl(meth)acrylate, isobornyl(meth)acrylate, benzyl(meth)acrylate, phenyl ethyl(meth)acrylate, and other $C_{1-12}$ alkyl and aralkyl(meth)acrylates; styrene, α-methylstyrene, and other vinyl aromatic compounds; $CF_3(CF_2)_3CH_2CH=CH_2$, $CF_3(CF_2)_3CH=CH_2$, $CF_3(CF_2)_5CH_2CH=CH_2$, $CF_3(CF_2)_5CH=CH_2$, $CF_3(CF_2)_7CH=CH_2$, $CF_3(CF_2)_9CH_2CH=CH_2$, $CF_3(CF_2)_9CH=CH_2$, $(CF_3)_2CF(CF_2)_2CH_2CH=CH_2$, $(CF_3)_2CF(CF_2)_2CH=CH_2$, $(CF_3)_2CF(CF_2)_4CH_2CH=CH_2$, $(CF_3)_2CF(CF_2)_4CH=CH_2$, $(CF_3)_2CF(CF_2)_6CH_2CH=CH_2$, $(CF_3)_2F(CF_2)_6CH=CH_2$, $F_5C_6CH=CH_2$, $CF_3(CF_2)_5CH_2CH_2OCH_2CH=CH_2$, $CF_3(CF_2)_5CH_2CH_2CH_2OCH_2CH=CH_2$, $CF_3(CF_2)_7CH_2CH_2OCH_2CH=CH_2$, $CF_3(CF_2)_7CH_2CH_2CH_2OCH_2CH=CH_2$, $CF_3(CF_2)_9CH_2CH_2OCH_2CH=CH_2$, $CF_3(CF_2)_9CH_2CH_2CH_2OCH_2CH=CH_2$, $H(CF_2)_6CH_2OCH_2CH=CH_2$, $H(CF_2)_8CH_2OCH_2CH=CH_2$, $(CF_3)_2CF(CF_2)_2CH_2CH_2OCOCH=CH_2$, $(CF_3)_2CF(CF_2)_2CH_2CH_2OCOC(CH_3)=CH_2$, $(CF_3)_2CF(CF_2)_4CH_2CH_2OCOCH=CH_2$, $(CF_3)_2CF(CF_2)_4CH_2CH_2OCOC(CH_3)=CH_2$, $(CF_3)_2CF(CF_2)_6CH_2CH_2OCOCH=CH_2$, $(CF_3)_2CF(CF_2)_6CH_2CH_2OCOC(CH_3)=CH_2$, $CF_3(CF_2)_5CH_2CH_2OCOCH=CH_2$, $CF_3(CF_2)_5CH_2CH_2OCOC(CH_3)=CH_2$, $CF_3(CF_2)_7CH_2CH_2OCOCH=CH_2$, $CF_3(CF_2)_7CH_2CH_2OCOC(CH_3)=CH_2$, $CF_3(CF_2)_9CH_2CH_2OCOCH=CH_2$, $CF_3(CF_2)_9CH_2CH_2OCOC(CH_3)=CH_2$, $H(CF_2)_6CH_2CH_2OCOCH=CH_2$, $H(CF_2)_8CH_2CH_2OCOC(CH_3)=CH_2$, $F(CF_2)_8CH_2CH_2OCOCH=CH_2$, $F(CF_2)_8CH_2CH_2OCOC(CH_3)=CH_2$, $H(CF_2)_4CH_2OCOC(CH_3)=CH_2$, $H(CF_2)_4CH_2OCOCH=CH_2$, and other fluoroalkyl- or fluoroaryl-containing vinyl monomers and the like, and one or more types of compounds selected from the above examples may be combined and used. However, the polymer B does not contain as a monomer component an epoxy-containing vinyl monomer a1 such as previously described. The polymer B also preferably does not contain a fluoroalkyl- or fluoroaryl-containing vinyl monomer such as described above as a monomer component.

The content ratio (which is a value obtained by substitution with the weight of the monomer used to synthesize the polymer) of the polymerizable vinyl monomer b2 in the polymer B is preferably 30 wt % or less, and more preferably 20 wt % or less. When the polymer B is a mixture of a plurality of types of compounds, the weighted average value (weighted average value based on weight ratio) of the mixed compounds may be used as the content ratio of the polymerizable vinyl monomer b2. When the polymer B is a mixture of a plurality of types of compounds, the content ratio of the polymerizable vinyl monomer b2 with respect to the mixture of compounds preferably satisfies such conditions as those described above.

As described above, the polymer B may contain at least the alkoxysilyl-containing vinyl monomer b1 as a monomer component, and may contain a monomer component other than the alkoxysilyl-containing vinyl monomer b1, but is preferably a homopolymer of the alkoxysilyl-containing vinyl monomer b1. Specifically, the polymer B preferably does not contain components other than the alkoxysilyl-containing vinyl monomer b1 as monomer components. The dispersion stability of the pigment in the ink, the discharge stability of the ink, and the durability of the manufactured color filter can thereby be made particularly excellent.

The ratio (content ratio) accounted for by the polymer B in the curable resin material is not particularly limited, but is preferably 20 to 60 wt %, and more preferably 25 to 55 wt %. When the polymer B is a mixture of a plurality of types of compounds, the sum of the content ratios of the mixed compounds may be used as the content ratio of the polymer B.

The ratio of the polymer A content and the polymer B content in terms of weight is preferably 25:75 to 75:25, and more preferably 45:55 to 55:45. Satisfying such conditions enables the ink to be provided with particularly excellent dispersion stability of the colorant in the ink, and discharge stability of the ink. The manufactured color filter can be provided with excellent uniformity of characteristics between individual units, and unevenness of color and saturation between different regions can be more reliably prevented. The color filter can also be provided with excellent durability.

Polymer C

Besides the abovementioned components, the curable resin material may furthermore include a polymer C (third polymer) that contains as a monomer component the fluoroalkyl- or fluoroaryl-containing vinyl monomer c1 indicated by Formula (2) below.

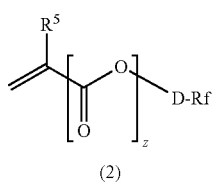

Formula (2)

In Formula (2), $R^5$ is a hydrogen atom or a $C_{1-7}$ alkyl group; D is a single bond hydrocarbon group or a bivalent hydrocarbon group which may contain a hetero atom; Rf is a $C_{1-20}$ fluoroalkyl group or fluoroaryl group; and z is 0 or 1.

Such a polymer C is preferably used together with the polymer A and the polymer B. the ink can thereby be provided with particularly excellent discharge stability. In particular, fluid depletion from the nozzles of the droplet discharge head can be improved, and such problems as solid components of the color filter ink adhering to the nozzles can be more effectively prevented. As a result, color mixing of the colored portions (inks) between adjacent cells can be more effectively prevented. The colored portion formed using the color filter ink can also be provided with particularly excellent thermal resistance.

The polymer C may be composed of essentially a single compound, or may be a mixture of a plurality of types of compounds. However, when the polymer C is a mixture of a plurality of types of compounds, each of the compounds contains at least the fluoroalkyl- or fluoroaryl-containing vinyl monomer c1 as a monomer component.

Fluoroalkyl- or Fluoroaryl-Containing Vinyl Monomer c1

The polymer C contains at least the fluoroalkyl- or fluoroaryl-containing vinyl monomer c1 indicated by Formula (2) as a monomer component. Including such a fluoroalkyl- or fluoroaryl-containing vinyl monomer c1 as a monomer component makes it possible to easily and reliably introduce a fluoroalkyl group or a fluoroaryl group into the polymer C. Including the fluoroalkyl- or fluoroaryl-containing vinyl monomer c1 as a monomer component enables the ink to be provided with particularly excellent discharge stability. The formed colored portion can also be provided with particularly excellent thermal resistance. When the polymer C includes a vinyl monomer c2 or the like such as described hereinafter, the polymer can be suitably synthesized, and a polymer C having the desired characteristics can be easily and reliably obtained.

Examples of the $C_{1-7}$ alkyl group indicated by $R^5$ in Formula (2) include methyl, ethyl, propyl, isopropyl, butyl, isobutyl, s-butyl, pentyl, hexyl, heptyl, and other alkyl groups, but a hydrogen atom or a $C_{1-2}$ alkyl group is preferred, and a hydrogen atom or a methyl group is more preferred. The discharge stability of the ink and the thermal resistance of the formed colored portion can thereby be made particularly excellent.

Typical examples of the bivalent hydrocarbon group (hydrocarbon group which may contain a hetero atom) indicated by D in Formula (2) include straight-chain or branched alkylene groups, or more specifically, methylenes, ethylenes, propylenes, tetramethylenes, ethyl ethylenes, pentamethylenes, hexamethylenes, oxymethylenes, oxyethylenes, oxypropylenes, and the like.

Specific examples of monomers indicated by Formula (2) include $CF_3(CF_2)_3CH_2CH=CH_2$, $CF_3(CF_2)_3CH=CH_2$, $CF_3(CF_2)_5CH_2CH=CH_2$, $CF_3(CF_2)_5CH=CH_2$, $CF_3(CF_2)_7CH=CH_2$, $CF_3(CF_2)_9CH_2CH=CH_2$, $CF_3(CF_2)_9CH=CH_2$, $(CF_3)_2CF(CF_2)_2CH_2CH=CH_2$, $(CF_3)_2CF(CF_2)_2CH=CH_2$, $(CF_3)_2CF(CF_2)_4CH_2CH=CH_2$, $(CF_3)_2CF(CF_2)_4CH=CH_2$, $(CF_3)_2CF(CF_2)_6CH_2CH=CH_2$, $(CF_3)_2CF(CF_2)_6CH=CH_2$, $F_5C_6CH=CH_2$, $CF_3(CF_2)_5CH_2CH_2OCH_2CH=CH_2$, $CF_3(CF_2)_5CH_2CH_2CH_2OCH_2CH=CH_2$, $CF_3(CF_2)_7CH_2CH_2OCH_2CH=CH_2$, $CF_3(CF_2)_7CH_2CH_2CH_2OCH_2CH=CH_2$, $CF_3(CF_2)_9CH_2CH_2OCH_2CH=CH_2$, $CF_3(CF_2)_9CH_2CH_2CH_2OCH_2CH=CH_2$, $H(CF_2)_6CH_2OCH_2CH=CH_2$, $H(CF_2)_8CH_2OCH_2CH=CH_2$, $(CF_3)_2CF(CF_2)_2CH_2CH_2OCOCH=CH_2$, $(CF_3)_2CF(CF_2)_2CH_2CH_2OCOC(CH_3)=CH_2$, $(CF_3)_2CF(CF_2)_4CH_2CH_2OCOCH=CH_2$, $(CF_3)_2CF(CF_2)_4CH_2CH_2OCOC(CH_3)=CH_2$, $(CF_3)_2CF(CF_2)_6CH_2CH_2OCOCH=CH_2$, $(CF_3)_2CF(CF_2)_6CH_2CH_2OCOC(CH_3)=CH_2$, $CF_3(CF_2)_5CH_2CH_2OCOCH=CH_2$, $CF_3(CF_2)_5CH_2CH_2OCOC(CH_3)=CH_2$, $CF_3(CF_2)_7CH_2CH_2OCOCH=CH_2$, $CF_3(CF_2)_7CH_2CH_2OCOC(CH_3)=CH_2$, $CF_3(CF_2)_9CH_2CH_2OCOCH=CH_2$, $CF_3(CF_2)_9CH_2CH_2OCOC(CH_3)$ =$CH_2$, H($CF_2$)$_6$$CH_2$$CH_2$OCOCH=$CH_2$, H($CF_2$)$_8$$CH_2$$CH_2$OCOC($CH_3$)=$CH_2$, F($CF_2$)$_8$$CH_2$$CH_2$OCOCH=$CH_2$, F($CF_2$)$_8$$CH_2$$CH_2$OCOC($CH_3$)=$CH_2$, H($CF_2$)$_4$$CH_2$OCOC($CH_3$)=$CH_2$, H($CF_2$)$_4$$CH_2$OCOCH=$CH_2$, and the like, and one or more types of compounds selected from the above examples may be combined and used.

The content ratio (which is a value obtained by substitution with the weight of the monomer used to synthesize the polymer) of the fluoroalkyl- or fluoroaryl-containing vinyl monomer c1 in the polymer C is preferably 15 to 100 wt %, and more preferably 18 to 100 wt %. When the content ratio of the fluoroalkyl- or fluoroaryl-containing vinyl monomer c1 in the polymer C is within the aforementioned range, the dispersion stability of the pigment in the ink, the discharge stability of the ink, and the thermal resistance of the formed colored portion can be made particularly excellent. The polymer C can also be provided with particularly excellent compatibility with the polymer A or the polymer B, and the formed colored portion can be provided with particularly high transparency. In contrast, when the content ratio of the fluoroalkyl- or fluoroaryl-containing vinyl monomer c1 in the polymer C is less than the lower limit of the aforementioned range, the effects of including a fluoroalkyl- or fluoroaryl-containing vinyl monomer c1 such as those described above may not be adequately demonstrated. When the polymer C is a mixture of a plurality of types of compounds, the weighted average value (weighted average value based on weight ratio) of the mixed compounds may be used as the content ratio of the fluoroalkyl- or fluoroaryl-containing vinyl monomer c1. When the polymer C is a mixture of a plurality of types of compounds, the compounds all preferably contain the fluoroalkyl- or fluoroaryl-containing vinyl monomer c1 in such a content ratio as described above.

Other Polymerizable Vinyl Monomer c2

The polymer C may contain as a monomer component a polymerizable vinyl monomer c2 other than the fluoroalkyl- or fluoroaryl-containing vinyl monomer c1 such as described above. A vinyl monomer that can be copolymerized with the fluoroalkyl- or fluoroaryl-containing vinyl monomer c1 may be used as the polymerizable vinyl monomer c2, and specific examples thereof include 2-acryloyloxyethyl isocyanate (product name: Karenz MOI; manufactured by Showa Denko), 2-methacryloyloxyethyl isocyanate, and other (meth)acryloyl isocyanates and the like in which (meth)acryloyl is bonded with an isocyanate group via a $C_{2-6}$ alkylene group; 2-(0-[1'-methylpropylideneamino]carboxyamino) ethyl methacrylate (product name: Karenz MOI-BM; manufactured by Showa Denko) and other polymerizable vinyl monomers provided with an isocyanate group or a blocked isocyanate group in which the isocyanate group is protected by a protective group; 2-hydroxyethyl(meth)acrylate, hydroxypropyl(meth)acrylate, 2,3-dihydroxybutyl(meth)acrylate, 4-hydroxybutyl(meth)acrylate, 6-hydroxyhexyl (meth)acrylate, 8-hydroxyoctyl(meth)acrylate, 4-hydroxymethyl cyclohexyl(meth)acrylate, polyalkylene glycol mono (meth)acrylate, and other monoester compounds of a polyalcohol and acrylic acid or methacrylic acid; compounds in which ε-caprolactone is ring-open polymerized with the abovementioned monoester compounds of a polyalcohol and acrylic acid or methacrylic acid (PLACCEL FA series, PLACCEL FM series, and the like manufactured by Daicel Chemical Industries); compounds in which ethylene oxide and propylene oxide is ring-open polymerized, and other polymerizable vinyl monomers provided with a hydroxyl group; methyl(meth)acrylate, ethyl(meth)acrylate, butyl (meth)acrylate, 2-ethylhexyl(meth)acrylate, phenyl(meth)acrylate, cyclohexyl(meth)acrylate, dicyclopentanyl(meth) acrylate, dicyclopentanyloxyethyl(meth)acrylate, isobornyl (meth)acrylate, benzyl(meth)acrylate, phenyl ethyl(meth)acrylate, and other $C_{1-12}$ alkyl and aralkyl(meth)acrylates; styrene, α-methylstyrene, and other vinyl aromatic compounds; and one or more types of compounds selected from the above examples may be combined and used. However, the polymer C does not contain as a monomer component the epoxy-containing vinyl monomer a1 and the alkoxysilyl-containing vinyl monomer b1 such as previously described.

The content ratio (which is a value obtained by substitution with the weight of the monomer used to synthesize the polymer) of the polymerizable vinyl monomer c2 in the polymer C is preferably 85 wt % or less, and more preferably 82 wt % or less. When the polymer C is a mixture of a plurality of types of compounds, the weighted average value (weighted average value based on weight ratio) of the mixed compounds may be used as the content ratio of the polymerizable vinyl monomer c2. When the polymer C is a mixture of a plurality of types of compounds, the content ratio of the polymerizable vinyl monomer c2 with respect to the mixture of compounds preferably satisfies such conditions as those described above.

When the curable resin material includes the polymer C, the ratio (content ratio) accounted for by the polymer C in the curable resin material is not particularly limited, but is preferably 1 to 20 wt %, and more preferably 2 to 15 wt %. When the polymer C is a mixture of a plurality of types of compounds, the sum of the content ratios of the mixed compounds may be used as the content ratio of the polymer C.

When the curable resin material includes the polymer C, the ratio of the polymer A content and the polymer C content in terms of weight is preferably 50:50 to 99:1, and more preferably 60:40 to 98:2. Satisfying such conditions enables the ink to be provided with particularly excellent dispersion stability of the colorant in the ink, and discharge stability of the ink. The color filter can be provided with particularly excellent uniformity of characteristics between individual units, and unevenness of color and saturation between different regions can be more effectively prevented. The color filter can also be provided with particularly excellent durability. Color mixing of the colored portions (inks) between adjacent cells can also be more effectively prevented.

The weight-average molecular weight of each polymer (polymer A, polymer B, polymer C) such as described above is preferably 1000 to 50000, more preferably 1200 to 10000, and even more preferably 1500 to 5000. The degree of dispersion (weight-average molecular weight Mw/number-average molecular weight Mn) of each polymer (polymer A, polymer B, polymer C) such as described above is about 1 to 3.

The content ratio of the curable resin material in the color filter ink is preferably 0.5 to 25 wt %, and more preferably 1 to 18 wt %. When the content ratio of the curable resin material is within this range, the manufactured color filter can be provided with particularly excellent durability while the ink is provided with particularly excellent dispersion stability of the pigment in the ink, and particularly excellent discharge properties from the droplet discharge head. Adequate color saturation can also be maintained in the manufactured color filter.

When a pigment is included as the colorant, the content ratio of the curable resin material with respect to 100 parts by weight of the colorant is preferably 15 to 50 parts by weight, and more preferably 19 to 42 parts by weight. Satisfying such conditions enables the ink to be provided with particularly excellent dispersion stability of the pigment in the ink, and discharge stability of the ink, and enables the formed colored portion of the color filter to be provided with particularly excellent contrast and coloration properties. Particularly excellent adhesion of the colored portion to the substrate can also be obtained.

The curable resin material constituting the color filter ink may also include a polymer other than the polymer A, polymer B, and polymer C described above.

Colorant

The color filter has colored portions (usually three colors corresponding to RGB) in a plurality of different colors. The inks constituting the color filter ink set each include a colorant that corresponds to the hue of the colored portion to be formed.

Various organic pigments and various inorganic pigments may be used as the colorant, but an organic pigment is preferred. The use of an organic pigment enables the colored portion formed using the ink to be provided with particularly excellent coloration properties, for example. Examples of organic pigments include compounds classified as pigments in the Color Index (C. I.; issued by The Society of Dyers and Colorists), and more specifically, compounds such as those below numbered according to the Color Index (C. I.). Specifically, examples of organic pigments include C. I. Pigment Yellow 1, 3, 12, 13, 14, 15, 16, 17, 20, 24, 31, 34, 35, 35:1, 37, 37:1, 42, 43, 53, 55, 60, 61, 65, 71, 73, 74, 81, 83, 93, 94, 95, 97, 98, 100, 101, 104, 106, 108, 109, 110, 113, 114, 116, 117, 119, 120, 126, 127, 128, 129, 138, 139, 150, 151, 152, 153, 154, 155, 156, 157, 166, 168, 175, 180, 184, and 185; C. I. Pigment Orange 1, 5, 13, 14, 16, 17, 20, 20:1, 24, 34, 36, 38, 40, 43, 46, 49, 51, 61, 63, 64, 71, 73, and 104; C. I. Pigment Violet 1, 3, 14, 16, 19, 23, 29, 32, 36, 38, and 50; C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:1, 48:2, 48:3, 48:4, 49:1, 49:2, 50:1, 52:1, 53:1, 57, 57:1, 57:2, 58:2, 58:4, 60:1, 63:1, 63:2, 64:1, 81, 81:1, 83, 88, 90:1, 97, 101, 102, 104, 105, 106, 108, 108:1, 112, 113, 114, 122, 123, 144, 146, 149, 150, 151, 166, 168, 170, 171, 172, 174, 175, 176, 177, 178, 179, 180, 185, 187, 188, 190, 193, 194, 202, 206, 207, 208, 209, 215, 216, 220, 224, 226, 242, 243, 245, 254, 255, 264, and 265; C. I. Pigment Blue 1, 15, 15:1, 15:2, 15:3, 15:4, 15:6, 17:1, 18, 60, 27, 28, 29, 35, 36, 60, and 80; C. I. Pigment Green 7, 36, 15, 17, 18, 19, 26, 50, and 58; C. I. Pigment Brown 7, 11, 23, 25, and 33; C. I. Pigment Black 1 and 7; and derivatives of these pigments and the like, and one or more types of pigments selected from the above examples may be combined and used.

The ink (red ink) can be provided with particularly excellent coloration properties particularly when the ink includes C. I. Pigment Red 177 and a derivative thereof, and/or C. I. Pigment Red 254 and a derivative thereof as pigments (red pigments). The effects of joint use with a resin material and dispersing agent such as described in detail hereinafter can also be more significantly demonstrated, and particularly excellent ink discharge stability and long-term dispersion stability of the pigment particles in the ink can be obtained.

When a compound (derivative) indicated by Formula (4) or Formula (5) below is included as the derivative of C. I. Pigment Red 177 and the derivative of C. I. Pigment Red 254, such effects as those described above can be even more significantly demonstrated.

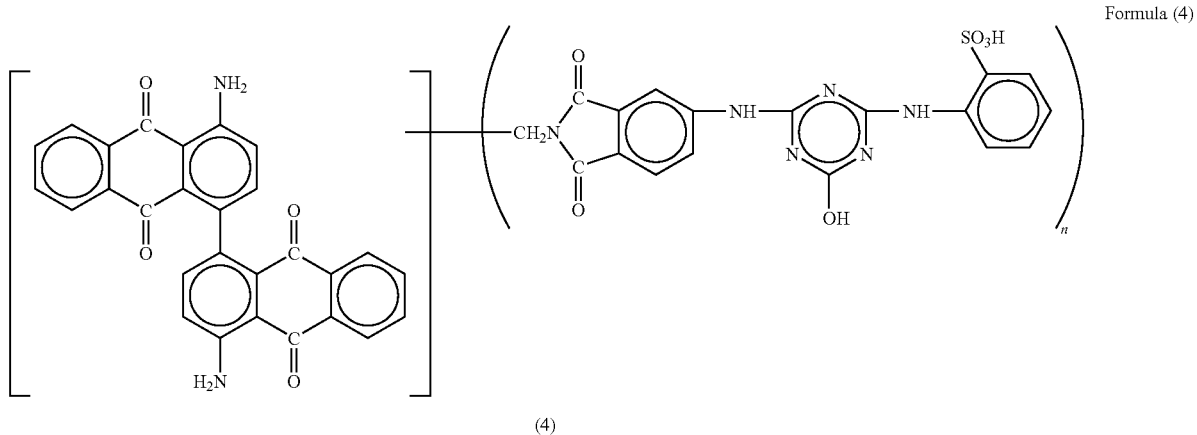

In Formula (4), n is an integer from 1 to 4.

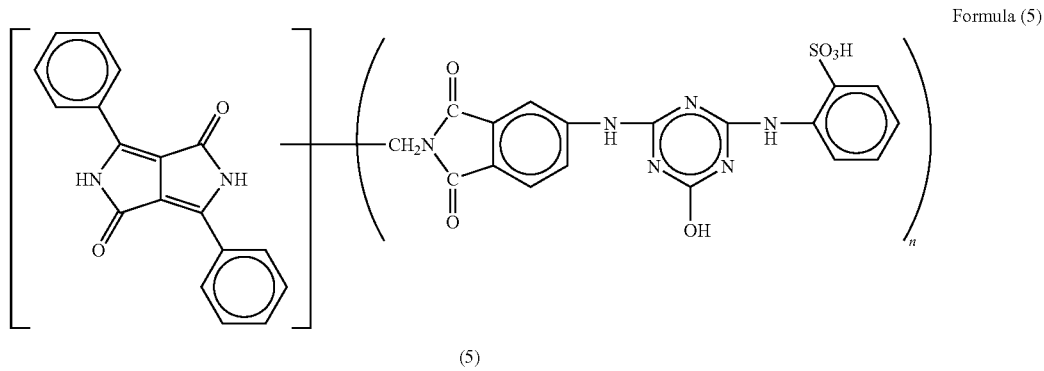

In Formula (5), n is an integer from 1 to 4.

The coloration properties of the ink (green ink) can be made particularly excellent particularly when the ink includes C. I. Pigment Green 58 (brominated zinc phthalocyanine pigment) as a pigment (green pigment). Although C. I. Pigment Green 58 has the characteristic of excellent brightness, the material is conventionally extremely difficult to stably disperse, but in the ink of the present embodiment, the long-term dispersion stability in the ink can be made particularly excellent even when C. I. Pigment Green 58 is included, which is conventionally extremely difficult to stably disperse. When the ink includes C. I. Pigment Green 58, the ink preferably also includes a sulfonated pigment derivative as a secondary pigment. Even more excellent coloration properties of the ink can thereby be obtained, and the ink can be provided with particularly excellent discharge stability.

When C. I. Pigment Green 58 and a sulfonated pigment derivative are included as pigments, the ink preferably contains a compound (derivative) indicated by Formula (6) below as the sulfonated pigment derivative. Particularly excellent droplet discharge stability and long-term dispersion stability of pigment particles in the ink can be obtained, and an image having more excellent contrast can be displayed in the manufactured color filter. In a method such as described hereinafter, the fine dispersion step can be performed with particularly excellent efficiency, and the ink can be manufactured in a short time using a relatively small amount of energy. The ink can therefore be provided with particularly excellent production properties, which can contribute to reduced production cost.

Formula (6)

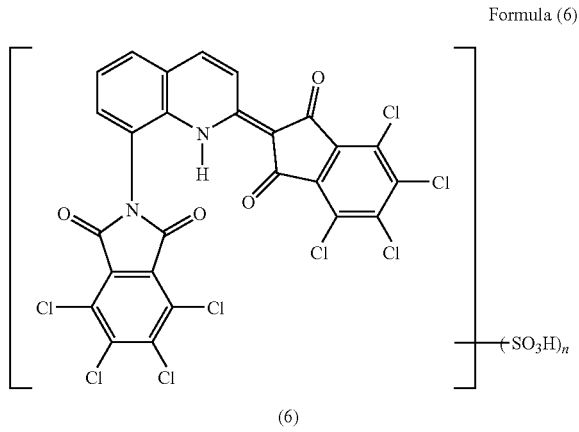

(6)

In Formula (6), n is an integer from 1 to 5.

The inventors discovered as a result of concentrated investigation that such excellent effects as described above are obtained through the use of a pigment derivative (secondary pigment) having a specific chemical structure together with C. I. Pigment Green 58 (main pigment), although the mechanism of these effects is not known in detail, the effects are considered to be obtained for such reasons as those described below.

A highly conjugated system is formed by the molecule as a whole in the brominated phthalocyanine that constitutes C. I. Pigment Green 58, and a planar structure is energetically stable. Planar molecules of the brominated phthalocyanine are in a layered (parallel to each other) arrangement, whereby a stable state occurs in which π electrons of conjugated systems between molecules are overlapped. The C. I. Pigment Green 58 is therefore easily aggregated, and difficult to stably disperse in a solvent.

In a pigment derivative such as described above, the hydrogen atom bonded to a nitrogen atom in Formula (6) forms a hydrogen bond between the oxygen atoms that form a phthalimide structure. For this reason, the hydrogen atom bonded to a nitrogen atom in Formula (6) substantially forms a strong bond with the nitrogen atom forming the quinoline structure, as well as the oxygen atom forming the phthalimide structure, and in a pigment derivative (sulfonated pigment derivative) such as described above, a stable ring structure (seven-member ring structure) is formed by the seven atoms that are labeled 1 through 7 in Formula (6). A non-parallel state with respect to the plane of the quinoline structure and the plane of the phthalimide structure occurs through the formation of such a seven-member ring structure.

The plane of the quinoline structure, and the plane of the phthalimide structure are thus non-parallel, whereby a pigment derivative (sulfonated pigment derivative) having the appropriate degree of affinity to C. I. Pigment Green 58 (a brominated phthalocyanine) is introduced between molecules of C. I. Pigment Green 58, and the C. I. Pigment Green 58, which is originally easily aggregated as described above, can be made less prone to aggregate. Furthermore, since a pigment derivative (sulfonated pigment derivative) such as described above has a sulfo group in the molecule thereof, the pigment derivative has excellent dispersion properties in the solvent described hereinafter. Such factors as those described above are considered to operate synergistically to produce such excellent effects as described above.

When C. I. Pigment Green 58 and a pigment derivative (sulfonated pigment derivative) such as described above are included, the content ratio of the pigment derivative (sulfonated pigment derivative) in the ink is not particularly limited, but is preferably 2 to 32 parts by weight, and more preferably 7 to 28 parts by weight with respect to 100 parts by weight of C. I. Pigment Green 58 (main pigment). Particularly excellent discharge stability of droplets and long-term dispersion stability of the pigment particles in the ink can thereby be obtained, and the color filter formed using the ink can be provided with particularly excellent brightness and contrast.

The ink (blue ink) can be provided with particularly excellent coloration properties particularly when the ink includes C. I. Pigment Blue 15:6 or a derivative of C. I. Pigment Blue 15 as the pigment (blue pigment). Particularly excellent ink discharge stability and long-term dispersion stability of the pigment particles in the ink can also be obtained.

The content ratio of the colorant in the ink is preferably 3 to 25 wt % or higher, more preferably 3.5 to 20 wt %, and more preferably 4.0 to 9.4 wt %. When the content ratio of the colorant is within the aforementioned range, higher color saturation can be maintained in the color filter that is manufactured using the ink, and the color filter can be used for clearer image display. The amount of the ink that is needed to form a colored portion having a predetermined color saturation can also be reduced, which is advantageous from the perspective of resource saving. Since the amount of evaporation of the solvent can be suppressed during formation of the colored portion of the color filter, the environmental impact can be reduced. In the conventional technique, when the colorant is included in such a relatively high concentration, the discharge stability is particularly low, and flight deflection, instability of the droplet discharge quantity, and other problems occur particularly easily when droplets of the ink are discharged. Also in the conventional technique, such problems as a severe occurrence of defects due to fluctuation of the discharge quantity among different locations on the surface, and marked reduction of production properties of the color filter occurs particularly when droplets are discharged onto a large substrate (e.g., G5 or larger) to form colored portions. In the present invention, however, even when the colorant is included at a relatively high concentration, such problems as those described above can be reliably prevented from occurring, unevenness of color, saturation, and the like in different locations of the manufactured color filter, or fluctuation of characteristics between individual units can be reliably prevented, and a color filter can be manufactured with excellent productivity, as described in detail hereinafter. Specifically, the effects of the present invention are more significantly demonstrated when the ink includes a relatively high concentration of the colorant, as described above. The durability of the manufactured color filter can also be made particularly excellent.

The average grain size of the pigment particles (colorant particles) in the ink is not particularly limited, but is preferably 10 to 200 nm, and more preferably 20 to 180 nm. The dispersion stability of the pigment in the ink, as well as the contrast and other characteristics in the color filter can thereby be made particularly excellent while making the light fastness of the color filter manufactured using the ink adequately superior.

Solvent

Besides the components described above, a solvent may be included in the ink.

The solvent functions as a dispersion medium for dispersing the colorant in the ink. In a ink manufacturing method such as the one described hereinafter, the solvent usually functions as a medium for dissolving a resin material such as described above in a liquid dispersion. Most of the solvent (dispersion medium) constituting the ink is usually removed in the process of manufacturing the color filter.

Ester compounds, ether compounds, hydroxyketones, carbonic diesters, cyclic amide compounds, and the like, for example, may be used as the solvent, preferred among which are (1) ethers (polyalcohol ethers) as condensates of polyalcohols (e.g., ethylene glycol, propylene glycol, butylene glycol, glycerin, and the like); alkyl ethers (e.g., methyl ether, ethyl ether, butyl ether, hexyl ether, and the like) of polyalcohols or polyalcohol ethers; and esters (e.g., formate, acetate, propionate, and the like); (2) esters (e.g., methyl esters and the like) of polycarboxylic acids (e.g., succinic acid, glutamic acid, and the like); (3) ethers, esters, and the like of compounds (hydroxy acids) having at least one hydroxyl group and at least one carboxyl group in the molecule thereof; and (4) carbonic diesters having a chemical structure such as that obtained by reaction of a polyalcohol and a phosgene. Examples of compounds that can be used as the solvent include 2-(2-methoxy-1-methylethoxy)-1-methyl ethyl acetate, triethylene glycol dimethyl ether, triethylene glycol diacetate, diethylene glycol monoethyl ether acetate, 4-methyl-1,3-dioxolan-2-one, bis(2-butoxyethyl)ether, dimethyl glutarate, ethylene glycol di-n-butyrate, 1,3-butylene glycol diacetate, diethylene glycol monobutyl ether acetate, tetraethylene glycol dimethyl ether, 1,6-diacetoxyhexane, tripropylene glycol monomethyl ether, butoxypropanol, diethylene glycol methyl ethyl ether, diethylene glycol methyl butyl ether, triethylene glycol methyl ethyl ether, triethylene glycol methyl butyl ether, dipropylene glycol monomethyl ether acetate, diethylene glycol dimethyl ether, ethyl 3-ethoxy propionate, diethylene glycol ethyl methyl ether, 3-methoxybutyl acetate, diethylene glycol diethyl ether, ethyl octanoate, ethylene glycol monobutyl ether acetate, ethylene glycol monobutyl ether, cyclohexyl acetate, diethyl succinate, ethylene glycol diacetate, propylene glycol diacetate, 4-hydroxy-4-methyl-2-pentanone, dimethyl succinate, 1-butoxy-2-propanol, diethylene glycol monoethyl ether, diethylene glycol monomethyl ether, dipropylene glycol monomethyl ether, 3-methoxy-n-butyl acetate, diacetin, dipropylene glycol mono n-propyl ether, polyethylene glycol monomethyl ether, butyl glycolate, ethylene glycol monohexyl ether, dipropylene glycol mono n-butyl ether, N-methyl-2-pyrrolidone, triethylene glycol butyl methyl ether, bis(2-propoxyethyl)ether, diethylene glycol diacetate, diethylene glycol butyl methyl ether, diethylene glycol butyl ethyl ether, diethylene glycol butyl propyl ether, diethylene glycol ethyl propyl ether, diethylene glycol methyl propyl ether, diethylene glycol propyl ether acetate, triethylene glycol methyl ether acetate, triethylene glycol ethyl ether acetate, triethylene glycol propyl ether acetate, triethylene glycol butyl ether acetate, triethylene glycol butyl ethyl ether, triethylene glycol ethyl methyl ether, triethylene glycol ethyl propyl ether, triethylene glycol methyl propyl ether, dipropylene glycol methyl ether acetate, n-nonyl alcohol, diethylene glycol monobutyl ether, triethylene glycol monomethyl ether, ethylene glycol 2-ethylhexyl ether, triethylene glycol monoethyl ether, diethylene glycol monohexyl ether, triethylene glycol monobutyl ether, diethylene glycol mono-2-ethylhexyl ether, tripropylene glycol mono n-butyl ether, butyl cellosolve acetate, and the like, and one or more types of compounds selected from the above examples may be combined and used. Among these examples, the solvent preferably includes one or more types of compounds selected from the group that includes 1,3-butylene glycol diacetate, bis(2-butoxyethyl)ether, and diethylene glycol monobutyl ether acetate. The ink can thereby be provided with particularly excellent droplet discharge stability. As a result, color mixing of the colored portions (inks) between adjacent cells can be more effectively prevented. Unevenness of color, saturation, and the like in regions of the manufactured color filter can be more effectively suppressed, and the color filter can be provided with particularly excellent uniformity of characteristics between individual units. When the ink includes a pigment as the colorant, particularly excellent long-term dispersion stability of the pigment particles in the ink can be obtained. Adequately excellent long-term dispersion stability of the pigment can also be obtained even when the content ratio of the pigment in the ink is high. When the solvent is composed of a compound such as described above, particularly excellent discharge stability of droplets can be obtained, the dispersion stability of the pigment particles in the ink can be made particularly excellent, and the ink can be provided with particularly excellent long-term storage properties. When the solvent is composed of a compound such as described above, the ink can be reliably made to spread into the entire cell in the method for manufacturing a color filter such as described hereinafter, and the effects of providing the landing prohibition region can be more significantly demonstrated. A flattened colored portion can easily be formed even when the conditions for removing the solvent are not strictly prescribed. In other words, the internal shape of the pixels is easily controlled during baking.

The boiling point of the solvent at atmospheric pressure (1 atm) is preferably 160 to 300° C., more preferably 180 to 290° C., and even more preferably 200 to 280° C. When the boiling point of the solvent at atmospheric pressure is within this range, blockage and the like in the droplet discharge head for discharging the ink can be more effectively prevented, and the color filter can be manufactured with particularly excellent productivity.

The vapor pressure of the solvent at 25° C. is preferably 0.7 mmHg or lower, and more preferably 0.1 mmHg or lower.

When the vapor pressure of the solvent is within this range, blockage and the like in the droplet discharge head for discharging the ink can be more effectively prevented, and the color filter can be manufactured with particularly excellent productivity.

The content ratio of the solvent in the ink is preferably 50 to 98 wt %, more preferably 70 to 95 wt %, and even more preferably 80 to 93 wt %. When the content ratio of the solvent is within this range, the manufactured color filter can be provided with excellent durability while the discharge properties of the ink from the droplet discharge head are made particularly excellent. Adequate color saturation can also be maintained in the manufactured color filter.

Dispersing Agent

A dispersing agent may be included in the ink. Particularly excellent dispersion stability and dispersion properties of the pigment in the ink can thereby be obtained when the ink includes a pigment as the colorant, for example. Through the use of the dispersing agent, the dispersing agent adheres to (adsorbs on) the surfaces of the pigment particles (pigment particles having a relatively large grain size that are not fine dispersed) added to the dispersing-agent-dispersed liquid in the fine dispersion step of the manufacturing method such as described hereinafter, and excellent dispersion properties of the pigment particles (pigment particles having a relatively large grain size that are not fine dispersed) in the dispersing-agent-dispersed liquid can be obtained. The fine dispersion process in the fine dispersion step can thereby be efficiently performed, the production properties of the ink can be made particularly excellent, particularly excellent long-term dispersion stability of the pigment particles (fine dispersed pigment fine-particles) can be obtained in the color filter ultimately obtained, and the color filter manufactured using the ink can be provided with particularly excellent brightness and contrast.

The dispersing agent is not particularly limited, but a polymer-based dispersing agent, for example, may be used. Examples of polymer-based dispersing agents include basic polymer-based dispersing agents, neutral polymer-based dispersing agents, acidic polymer-based dispersing agents, and the like. Examples of such polymer-based dispersing agents include dispersing agents composed of acrylic-based and modified acrylic-based copolymers; urethane-based dispersing agents; and dispersing agents composed of polyaminoamide salts, polyether esters, phosphoric acid ester-based compounds, aliphatic polycarboxylic acids, and the like.

More specific examples of dispersing agents include Disperbyk 101, Disperbyk 102, Disperbyk 103, Disperbyk P104, Disperbyk P104S, Disperbyk 220S, Disperbyk 106, Disperbyk 108, Disperbyk 109, Disperbyk 110, Disperbyk 111, Disperbyk 112, Disperbyk 116, Disperbyk 140, Disperbyk 142, Disperbyk 160, Disperbyk 161, Disperbyk 162, Disperbyk 163, Disperbyk 164, Disperbyk 166, Disperbyk 167, Disperbyk 168, Disperbyk 170, Disperbyk 171, Disperbyk 174, Disperbyk 180, Disperbyk 182, Disperbyk 183, Disperbyk 184, Disperbyk 185, Disperbyk 2000, Disperbyk 2001, Disperbyk 2050, Disperbyk 2070, Disperbyk 2095, Disperbyk 2150, Disperbyk LPN6919, Disperbyk 9075, and Disperbyk 9077 (all manufactured by Byk Chemie Japan); EFKA 4008, EFKA 4009, EFKA 4010, EFKA 4015, EFKA 4020, EFKA 4046, EFKA 4047, EFKA 4050, EFKA 4055, EFKA 4060, EFKA 4080, EFKA 4400, EFKA 4401, EFKA 4402, EFKA 4403, EFKA 4406, EFKA 4408, EFKA 4300, EFKA 4330, EFKA 4340, EFKA 4015, EFKA 4800, EFKA 5010, EFKA 5065, EFKA 5066, EFKA 5070, EFKA 7500, and EFKA 7554 (all manufactured by Ciba Specialty Chemicals); Solsperse 3000, Solsperse 9000, Solsperse 13000, Solsperse 16000, Solsperse 17000, Solsperse 18000, Solsperse 20000, Solsperse 21000, Solsperse 24000, Solsperse 26000, Solsperse 27000, Solsperse 28000, Solsperse 32000, Solsperse 32500, Solsperse 32550, Solsperse 33500 Solsperse 35100, Solsperse 35200, Solsperse 36000, Solsperse 36600, Solsperse 38500, Solsperse 41000, Solsperse 41090, and Solsperse 20000 (all manufactured by Nippon Lubrizol); Ajisper PA111, Ajisper PB711, Ajisper PB821, Ajisper PB822, and Ajisper PB824 (all manufactured by Ajinomoto Fine-Techno); Disparlon 1850, Disparlon 1860, Disparlon 2150, Disparlon 7004, Disparlon DA-100, Disparlon DA-234, Disparlon DA-325, Disparlon DA-375, Disparlon DA-705, Disparlon DA-725, and Disparlon PW-36 (all manufactured by Kusumoto Chemicals); Floren DOPA-14, Floren DOPA-15B, Floren DOPA-17, Floren DOPA-22, Floren DOPA-44, Floren TG-710, and Floren D-90 (all manufactured by Kyoei Kagaku); Anti-Terra-205 (manufactured by Byk Chemie Japan); and the like, and one or more types of compounds selected from the above examples may be combined and used.

The joint use of a dispersing agent having a predetermined acid value (also referred to hereinafter as an acid-value dispersing agent) and a dispersing agent having a predetermined amine value (also referred to hereinafter as an amine-value dispersing agent) as dispersing agents is particularly preferred. The effects of an acid-value dispersing agent for demonstrating viscosity-reducing effects whereby the viscosity of the ink is reduced, and the effects of an amine-value dispersing agent whereby the viscosity of the color filter ink (first ink) is stabilized can thereby be obtained at the same time, and particularly excellent dispersion stability of the pigment in the ink can be obtained. In particular, a method such as the one described hereinafter has a preparatory dispersion step for obtaining a dispersing-agent-dispersed liquid in which the dispersing agent is dispersed in a solvent by stirring a mixture of the dispersing agent, a thermoplastic resin, and the solvent prior to performing the pigment fine dispersion process, but in such a method, the joint use of an acid-value dispersing agent and an amine-value dispersing agent makes it possible to reliably prevent association of the dispersing agents (association of the acid-value dispersing agent and the amine-value dispersing agent), and to obtain particularly excellent dispersion stability of the pigment such as described above.

Specific examples of acid-value dispersing agents include Disperbyk P104, Disperbyk P104S, Disperbyk 220S, Disperbyk 110, Disperbyk 111, Disperbyk 170, Disperbyk 171, Disperbyk 174, and Disperbyk 2095 (all manufactured by Byk Chemie Japan); EFKA 5010, EFKA 5065, EFKA 5066, EFKA 5070, EFKA 7500, and EFKA 7554 (all manufactured by Ciba Specialty Chemicals); Solsperse 3000, Solsperse 16000, Solsperse 17000, Solsperse 18000, Solsperse 36000, Solsperse 36600, and Solsperse 41000 (all manufactured by Nippon Lubrizol); and the like.

Specific examples of amine-value dispersing agents include Disperbyk 102, Disperbyk 160, Disperbyk 161, Disperbyk 162, Disperbyk 163, Disperbyk 164, Disperbyk 166, Disperbyk 167, Disperbyk 168, Disperbyk 2150, Disperbyk LPN6919, Disperbyk 9075, and Disperbyk 9077 (all manufactured by Byk Chemie Japan); EFKA 4015, EFKA 4020, EFKA 4046, EFKA 4047, EFKA 4050, EFKA 4055, EFKA 4060, EFKA 4080, EFKA 4300, EFKA 4330, EFKA 4340, EFKA 4400, EFKA 4401, EFKA 4402, EFKA 4403, and EFKA 4800 (all manufactured by Ciba Specialty Chemicals); Ajisper PB711 (manufactured by Ajinomoto Fine Techno); Anti-Terra-205 (manufactured by Byk Chemie Japan); and the like.

When an acid-value dispersing agent and an amine-value dispersing agent are used jointly, the acid value (acid value on a solid basis) of the acid-value dispersing agent is not particularly limited, but is preferably 5 to 370 KOH mg/g, more preferably 20 to 270 KOH mg/g, and more preferably 30 to 135 KOH mg/g. When the acid value of the acid-value dispersing agent is within the aforementioned range, the dispersion stability of the pigment can be particularly excellent in the case of joint use with an amine-value dispersing agent. The acid value of the dispersing agent can be calculated by a method based on DIN EN ISO 2114, for example.

The acid-value dispersing agent is preferably one having a predetermined amine value, i.e., an amine value of zero.

When an amine-value dispersing agent and an acid-value dispersing agent are used jointly, the amine value (amine value on a solid basis) of the amine-value dispersing agent is not particularly limited, but is preferably 5 to 200 KOH mg/g, more preferably 25 to 170 KOH mg/g, and more preferably 30 to 130 KOH mg/g. When the amine value of the amine-value dispersing agent is within the aforementioned range, the dispersion stability of the pigment can be particularly excellent in the case of joint use with an amine-value dispersing agent. The amine value of the dispersing agent can be calculated by a method based on DIN 16945, for example.

The amine-value dispersing agent is preferably one having a predetermined acid value, i.e., an acid value of zero.

When an acid-value dispersing agent and an amine-value dispersing agent are used jointly, it is preferred that the relation $0.1 \leq X_A/X_B \leq 1$ be satisfied, and more preferred that the relation $0.15 \leq X_A/X_B \leq 0.5$ be satisfied, wherein $X_A$ (wt %) is the content ratio of the acid-value dispersing agent in the ink, and $X_B$ (wt %) is the content ratio of the amine-value dispersing agent in the ink. By satisfying such a relation, the synergistic effects of jointly using an acid-value dispersing agent and an amine-value dispersing agent are more significantly demonstrated, and particularly excellent pigment dispersion stability, droplet discharge stability, and other characteristics can be obtained.

It is also preferred that the relation $0.01 \leq (AV \times X_A)/(BV \times X_B) \leq 1.9$ be satisfied, and more preferred that the relation $0.10 \leq (AV \times X_A)/(BV \times X_B) \leq 0.95$ be satisfied, wherein AV (KOHmg/g) is the acid value of the acid-value dispersing agent, BV (KOHmg/g) is the amine value of the amine-value dispersing agent, $X_A$ (wt %) is the content ratio of the acid-value dispersing agent, and $X_B$ (wt %) is the content ratio of the amine-value dispersing agent. By satisfying such a relation, the synergistic effects of jointly using an acid-value dispersing agent and an amine-value dispersing agent are more significantly demonstrated, and particularly excellent pigment dispersion stability, droplet discharge stability, and other characteristics can be obtained.

The content ratio of the dispersing agent in the ink is not particularly limited, but is preferably 2.5 to 10.2 wt %, and more preferably 3.2 to 9.2 wt %.

Other Components

Besides the abovementioned components, the ink may include a thermoplastic resin. Particularly excellent dispersion properties of the pigment particles in the ink can thereby be obtained. Extremely excellent dispersion stability of the pigment particles in the ink can be obtained particularly through the use of a thermoplastic resin in the preparatory dispersion step in the manufacturing method such as described hereinafter.

Examples of thermoplastic resins include alginic acid, polyvinyl alcohol, hydroxypropyl cellulose, carboxymethyl cellulose, hydroxyethyl cellulose, methyl cellulose, styrene-acrylic acid resin, styrene-acrylic acid-acrylic acid ester resin, styrene-maleic acid resin, styrene-maleic acid semi-ester resin, methacrylic acid-methacrylic acid ester resin, acrylic acid-acrylic acid ester resin, isobutylene-maleic acid resin, rosin-modified maleic acid resin, polyvinyl pyrrolidone, gum arabic starch, polyallyl amine, polyvinyl amine, polyethylene imine, and the like, and one or more types of compounds selected from the above examples may be combined and used.

The content ratio of the thermoplastic resin in the color filter ink is not particularly limited, but is preferably 1.5 to 7.7 wt %, and more preferably 2.1 to 7.2 wt %.

The ink of the present invention may include components other than those described above. Examples of such components include various dyes; various cross-linking agents; thermoacid generators such as diazonium salt, iodonium salt, sulfonium salt, phosphonium salt, selenium salt, oxonium salt, ammonium salt, benzothiazolium salt, and other onium salts; diazonium salt, iodonium salt, sulfonium salt, phosphonium salt, selenium salt, oxonium salt, ammonium salt, and other photoacid generators; various polymerization initiators; acid crosslinking agents; intensifiers; photostabilizers; adhesive improvers; various polymerization accelerants; various photostabilizers; glass, alumina, and other fillers; vinyl trimethoxysilane, vinyl triethoxysilane, vinyl tris(2-methoxy ethoxy)silane, N-(2-aminoethyl)-3-aminopropyl methyl dimethoxysilane, N-(2-aminoethyl)-3-aminopropyl trimethoxysilane, 3-aminopropyl triethoxysilane, 3-glycidoxy propyl trimethoxysilane, 3-glycidoxy propyl methyl dimethoxysilane, 2-(3,4-epoxycyclohexyl)ethyl trimethoxysilane, 3-chloro propyl methyl dimethoxysilane, 3-chloro propyl trimethoxysilane, 3-methacryloxy propyl trimethoxysilane, 3-mercapto propyl trimethoxysilane, and other adhesion accelerants; 2,2-thiobis(4-methyl-6-t-butyl phenol), 2,6-di-t-butyl phenol, and other antioxidants; 2-(3-t-butyl-5-methyl-2-hydroxy phenyl)-5-chloro benzotriazole, alkoxy benzophenone, and other UV absorbers; sodium polyacrylate, and other anti-coagulants; and the like.

Examples of dyes include azo dyes, anthraquinone dyes, condensed multi-ring aromatic carbonyl dyes, indigoid dyes, carbonium dyes, phthalocyanine dyes, methines, polymethine dyes, and the like. Specific examples of dyes include C. I. Direct Red 2, 4, 9, 23, 26, 28, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, and 247; C. I. Acid Red 35, 42, 51, 52, 57, 62, 80, 82, 111, 114, 118, 119, 127, 128, 131, 143, 145, 151, 154, 157, 158, 211, 249, 254, 257, 261, 263, 266, 289, 299, 301, 305, 319, 336, 337, 361, 396, and 397; C. I. Reactive Red 3, 13, 17, 19, 21, 22, 23, 24, 29, 35, 37, 40, 41, 43, 45, 49, and 55; C. I. Basic Red 12, 13, 14, 15, 18, 22, 23, 24, 25, 27, 29, 35, 36, 38, 39, 45, and 46; C. I. Direct Violet 7, 9, 47, 48, 51, 66, 90, 93, 94, 95, 98, 100, and 101; C. I Acid Violet 5, 9, 11, 34, 43, 47, 48, 51, 75, 90, 103, and 126; C. I. Reactive Violet 1, 3, 4, 5, 6, 7, 8, 9, 16, 17, 22, 23, 24, 26, 27, 33, and 34; C. I. Basic Violet 1, 2, 3, 7, 10, 15, 16, 20, 21, 25, 27, 28, 35, 37, 39, 40, and 48; C. I. Direct Yellow 8, 9, 11, 12, 27, 28, 29, 33, 35, 39, 41, 44, 50, 53, 58, 59, 68, 87, 93, 95, 96, 98, 100, 106, 108, 109, 110, 130, 142, 144, 161, and 163; C. I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, and 227; C. I. Reactive Yellow 2, 3, 13, 14, 15, 17, 18, 23, 24, 25, 26, 27, 29, 35, 37, 41, and 42; C. I. Basic Yellow 1, 2, 4, 11, 13, 14, 15, 19, 21, 23, 24, 25, 28, 29, 32, 36, 39, and 40; C. I. Acid Green 16; C. I. Acid Blue 9, 45, 80, 83, 90 and 185; C. I. Basic Orange 21 and 23; and the like.

Examples of cross-linking agents that may be used include polycarboxylic acid anhydrides, polycarboxylic acids, polyfunctional epoxy monomers, polyfunctional acrylic monomers, polyfunctional vinyl ether monomers, and polyfunctional oxetane monomers. Specific examples of polycarboxylic acid anhydrides include phthalic anhydride, itaconic anhydride, succinic anhydride, citraconic anhydride, dodecenyl succinic anhydride, tricarballylic anhydride, maleic anhydride, hexahydrophthalic anhydride, dimethyl tetrahydrophthalic anhydride, himic anhydride, nadic anhydride, and other aliphatic or alicyclic dicarboxylic anhydrides; 1,2,3,4-butane tetracarboxylic acid dianhydride and cyclopentane tetracarboxylic acid dianhydride; benzophenone tetracarboxylic anhydride and other aromatic polycarboxylic acid anhydrides; ethylene glycol bis trimellitate, glycerin tris trimellitate, and other ester-containing organic anhydrides, among which an aromatic polycarboxylic acid anhydride is preferred. An epoxy resin curing agent composed of a commercially available carboxylic acid anhydride can also be suitably used. Specific examples of polycarboxylic acids include succinic acid, glutaric acid, adipic acid, butane tetracarboxylic acid, maleic acid, itaconic acid, and other aliphatic polycarboxylic acids; hexahydrophthalic acid, 1,2-cyclohexane dicarboxylic acid, 1,2,4-cyclohexane tricarboxylic acid, cyclopentane tetracarboxylic acid, and other aliphatic polycarboxylic acids; and phthalic acid, isophthalic acid, terephthalic acid, pyromellitic acid, trimellitic acid, 1,4,5,8-naphthalene tetracarboxylic acid, benzophenone tetracarboxylic acid, and other aromatic polycarboxylic acid, but among these, aromatic polycarboxylic acid is preferred. Specific examples of a polyfunctional epoxy monomer include the product name Celloxide 2021 manufactured by Daicel Chemical Industries, the product name Epolead GT401 manufactured by Daicel Chemical Industries, the product name Epolead PB3600 manufactured by Daicel Chemical Industries, bisphenol A, hydrogenated bisphenol A, and triglycidyl isocyanurate. Specific example of a polyfunctional acrylic monomer include pentaerythritolethoxy tetraacrylate, pentaerythritol tetraacrylate, pentaerythritol triacrylate, pentaerythritolethoxy tetraacrylate, ditrimethylolpropane tetraacrylate, trimethylolpropane triacrylate, trimethylolpropane ethoxy triacrylate, dipentaerythritol hexaacrylate trimethallyl isocyanurate, and triallyl isocyanurate. Examples of a polyfunctional vinyl ether monomer include 1,4-butanediol vinyl ether, 1,6-hexanediol divinyl ether, nonanediol divinyl ether, cyclohexanediol divinyl ether, cyclohexanedimethanol divinyl ether, triethylene glycol divinyl ether, trimethylolpropane trivinyl ether, and pentaerythritol tetravinyl ether. Examples of polyfunctional oxetane monomers include xylylene dioxetane, biphenyl-type oxetane, and novolac-type oxetane.

The thermoacid generator is a component for generating acid by applying heat, and particularly preferred among those described above are sulfonium salt and benzothiazolium. More specific examples of thermoacid generators in terms of product names include Sunaid SI-45, Sunaid SI-47, Sunaid SI-60, Sunaid SI-60L, Sunaid SI-80, Sunaid SI-80L, Sunaid SI-100, Sunaid SI-100L, Sunaid SI-145, Sunaid SI-150, Sunaid SI-160, Sunaid SI-110L, Sunaid SI-180L (all product names, manufactured by Sanshin Chemical Industry Co., Ltd.), CI-2921, CI-2920, CI-2946, CI-3128, CI-2624, CI-2639, CI-2064 (all product names, manufactured by Nippon Soda Co., Ltd.), CP-66, CP-77 (product names, manufactured by Adeka Corporation), and FC-520 (product name, manufactured by 3M Company).

The photoacid generator is a component for generating acid by using light, and more specific examples include the product names Cyracure UVI-6970, Cyracure UVI-6974, Cyracure UVI-6990, Cyracure UVI-950 (all product names, manufactured by US Union Carbide), Irgacure 261 (product name, Ciba Specialty Chemicals), SP-150, SP-151, SP-170, Optomer SP-171 (all product names, manufactured by Adeka Corporation), CG-24-61 (product name, manufactured by Ciba Specialty Chemicals), Daicat II (product name, manufactured by Daicel Chemical Industries, Ltd.), UVAC 1591 (product name, manufactured by Daicel UCB Co., Ltd.), CI-2064, CI-2639, CI-2624, CI-2481, CI-2734, CI-2855, CI-2823, CI-2758 (product name, manufactured by Nippon Soda Co., Ltd.), PI-2074 (product name, manufactured by Rhone Poulenc, pentafluorophenyl borate tolyl cumyl iodonium), FFC509 (product name, manufactured by 3M Company), BBI-102, BBI-101, BBI-103, MPI-103, TPS-103, MDS-103, DTS-103, NAT-103, NDS-103 (product name, manufactured by Midori Kagaku Co., Ltd.), and CD-1012 (product name, manufactured by Sartomer Co., Inc.).

The viscosity (viscosity (kinetic viscosity) measured using an E-type viscometer) at 25° C. of the ink used to manufacture the color filter is preferably 13 mPa·s or lower, more preferably 12 mPa·s or lower, and more preferably 5 to 11 mPa·s. When the viscosity (kinetic viscosity) of the ink is thus adequately low, the ink can be more reliably made to spread into the entire cell while color mixing of the colored portions (inks) between adjacent cells is effectively prevented. The production efficiency (efficiency of forming the colored portion) of the color filter can also be made particularly excellent, for example, and unwanted fluctuation of the thickness and other characteristics of the colored portion can be effectively prevented. Measurement of the viscosity (kinetic viscosity) of the ink can be performed using an E-type viscometer (e.g., RE-01 manufactured by Toki Sangyo), for example, particularly in accordance with JIS Z8809.

The amount of change in the viscosity at 25° C. of the ink after the ink is left for 7 days at 65° C. is preferably 0.5 mPa·s or less, more preferably 0.3 mPa·s or less, and more preferably 0.2 mPa·s or less. The color filter ink can thereby be provided with particularly excellent discharge stability, and the color filter ink can be suitably used for a longer period of time to manufacture a color filter in which the occurrence of uneven color, saturation, and the like is reliably prevented.

The contact angle of the ink droplets with respect to the bottom surface (substrate) in the cell is preferably 60° or less, and more preferably 55° or less. The ink can thereby be more reliably made to spread into the entire cell while color mixing of the colored portions (inks) between adjacent cells is effectively prevented. In the present specification, the contact angle can be calculated based on JIS K 3257. The contact angle of the ink with respect to the bottom surface (substrate) can be calculated using the ink and a flat plate composed of the same material as the substrate.

Color Filter Ink Manufacturing Method

Preferred embodiments of the method for manufacturing a color filter ink such as described above will next be described.

The manufacturing method of the present embodiment has a preparatory dispersion step of obtaining a dispersing-agent-dispersed liquid in which a dispersing agent is dispersed in a solvent, by stirring a mixture of a dispersing agent, a thermoplastic resin, and a solvent; a fine dispersion step of adding a pigment (colorant) to the dispersing-agent-dispersed liquid, adding inorganic beads in multi-stage fashion and performing a fine dispersion process, and obtaining a pigment dispersion;

and a curable resin mixing step of mixing the pigment dispersion and the curable resin material.

Preparatory Dispersion Step

In the preparatory dispersion step, a dispersing-agent-dispersed liquid in which a dispersing agent is dispersed in a solvent is prepared by stirring a mixture that includes a dispersing agent, a thermoplastic resin, and a solvent. The associated state of the dispersing agent can thereby be released (undone).

By thus pre-dispersing a mixture that does not include a pigment prior to the process described in detail hereinafter for fine dispersing the pigment in the present embodiment, a color filter ink can ultimately be obtained that has particularly excellent discharge stability, in which the pigment particles are uniformly and stably dispersed.

In this step, the thermoplastic resin, the dispersing agent, and the solvent are mixed together in advance, whereby the dispersing agent and the thermoplastic resin are adhered to the surfaces of the pigment particles (pigment particles having a relatively large grain size that are not fine dispersed) added to the dispersing-agent-dispersed liquid in the fine dispersion step described hereinafter, and excellent dispersion properties of the pigment particles (pigment particles having a relatively large grain size that are not fine dispersed) in the dispersing-agent-dispersed liquid can be obtained. The fine dispersion process in the fine dispersion step can thereby be efficiently performed, the production properties of the ink can be made particularly excellent, particularly excellent long-term dispersion stability of the pigment particles (fine dispersed pigment fine-particles) and discharge stability of droplets can be obtained, and the effects of providing the landing prohibition region can be more significantly demonstrated in the ink ultimately obtained.

The content ratio (sum of the content ratios when a plurality of types of dispersing agents is used jointly) of the dispersing agent in the dispersing-agent-dispersed liquid prepared in the present step is not particularly limited, but is preferably 10 to 40 wt %, and more preferably 12 to 32 wt %. When the content ratio of the dispersing agent is within this range, such effects as previously described are demonstrated more significantly.

The content ratio of the thermoplastic resin in the dispersing-agent-dispersed liquid prepared in the present step is not particularly limited, but is preferably 6 to 30 wt %, and more preferably 8 to 26 wt %. When the content ratio of the thermoplastic resin is within this range, such effects as previously described are demonstrated more significantly.

The content ratio of the solvent in the dispersing-agent-dispersed liquid prepared in the present step is not particularly limited, but is preferably 40 to 80 wt %, and more preferably 53 to 75 wt %. When the content ratio of the solvent is within this range, such effects as previously described are demonstrated more significantly.

In the present step, a dispersing-agent-dispersed liquid is obtained by stirring a mixture of the abovementioned components using various types of agitators.

Examples of agitators that can be used in the present step include a Dispermill or other single-shaft or twin-shaft mixer or the like.

The stirring time for which the agitator is used is not particularly limited, but is preferably 1 to 30 minutes, and more preferably 3 to 20 minutes. The associated state of the dispersing agent can thereby be more effectively released while adequately excellent production properties of the color filter ink are obtained, the ink ultimately obtained can be provided with particularly excellent dispersion stability of pigment particles and particularly excellent discharge stability, and the effects of providing the landing prohibition region can be more significantly demonstrated.

The speed of the stirring vanes of the agitator in the present step is not particularly limited, but is preferably 500 to 4000 rpm, and more preferably 800 to 3000 rpm. The associated state of the dispersing agent can thereby be more effectively released while adequately excellent production properties of the ink are obtained, and it is possible to obtain particularly excellent dispersion stability of pigment particles in the ink ultimately obtained. Degradation, denaturation, and the like of the thermoplastic resin and other components due to heat and the like can also be reliably prevented.

Fine Dispersion Step

A pigment such as described above is then added to the dispersing-agent-dispersed liquid obtained in the step described above, inorganic beads are added in multiple stages, and a fine dispersion process is performed (fine dispersion step).

Prior to adding the pigment, a preparatory dispersion step such as the one described above is thus provided in the present embodiment, and inorganic beads are added in multiple stages in the step (fine dispersion step) of fine dispersing the pigment. In the fine dispersion step, adding the inorganic beads in multi-stage fashion makes it possible to form fine-particles of the pigment with superior efficiency, and to make the pigment particles adequately small in the ink ultimately obtained. In particular, the effects of jointly using a halogenated phthalocyanine zinc complex (main pigment) and a sulfonated pigment derivative (secondary pigment) such as described above, and the effects of using a method having a preparatory dispersion step and a multi-stage fine dispersion step act synergistically, the ink ultimately obtained can be provided with extremely excellent dispersion stability of pigment and discharge stability of droplets, and the ink can be used to manufacture a color filter having extremely excellent brightness and contrast.

In contrast, when the fine dispersion step is not performed in multiple stages, it is difficult to make the pigment particles adequately small in the ink ultimately obtained, and the production properties of the ink can be severely reduced. Even when the fine dispersion step is performed in multiple stages, such problems as the following can occur when the preparatory dispersion step such as described above is omitted. Specifically, when the preparatory dispersion step is omitted, since the associated state of the dispersing agent is not adequately released (not undone) when the pigment is added, it is difficult to uniformly adhere the dispersing agent and the thermoplastic resin to the surfaces of the pigment particles in the fine dispersion step. It is also difficult obtain adequately excellent dispersion properties of the pigment particles (pigment particles having relatively large grain size that are not fine dispersed) in the solvent in the fine dispersion step.

It is sufficient for the present step to be performed by adding the inorganic beads in multiple stages, and the inorganic beads may be added in three or more stages, but the inorganic beads are preferably added in two stages. The production properties of the ink can thereby be made particularly excellent while the ink ultimately obtained is provided with adequately excellent long-term dispersion stability of the pigment particles.

A method for adding the inorganic beads in two stages will be described below. Specifically, a typical example of a method will be described for performing a first treatment using first organic beads, and a second treatment using second organic beads in the fine dispersion step.

The inorganic beads (first inorganic beads and second inorganic beads) used in the present step may be composed of any material insofar as the material is an inorganic material, but preferred examples of the inorganic beads include zirconia beads (e.g., Toray Ceram grinding balls (trade name); manufactured by Toray) and the like.

First Treatment

In the present step, the pigments (main pigment and secondary pigment) are first added to the dispersing-agent-dispersed liquid prepared in the preparatory dispersion step described above, and a first treatment is performed for primary fine dispersion using first inorganic beads having a predetermined grain size.

The first inorganic beads used in the first treatment preferably have a larger grain size than the second inorganic beads used in the second treatment. The efficiency of fine-particle formation (fine dispersion) of the pigments in the overall fine dispersion step can thereby be made particularly excellent.

The average grain size of the first inorganic beads is not particularly limited, but is preferably 0.5 to 3.0 mm, more preferably 0.5 to 2.0 mm, and more preferably 0.5 to 1.2 mm. When the average grain size of the first inorganic beads is within the aforementioned range, the efficiency of fine-particle formation (fine dispersion) of the pigments in the overall fine dispersion step can be made particularly excellent. In contrast, when the average grain size of the first inorganic beads is less than the lower limit of the aforementioned range, severe reduction of the efficiency of fine-particle formation (grain size reduction) of the pigment particles by the first treatment tends to occur according to the type and other characteristics of the pigments. When the average grain size of the first inorganic beads exceeds the upper limit of the aforementioned range, although the efficiency of fine-particle formation (grain size reduction) of the pigment particles by the first treatment can be made relatively excellent, the efficiency of fine-particle formation (grain size reduction) of the pigment particles by the second treatment is reduced, and the efficiency of fine-particle formation (fine dispersion) of the pigments is reduced in the fine dispersion step as a whole.

The amount of the first inorganic beads used is not particularly limited, but is preferably 100 to 600 parts by weight, and more preferably 200 to 500 parts by weight with respect to 100 parts by weight of the dispersing-agent-dispersed liquid.

The amount of the pigments added to the dispersing-agent-dispersed liquid is not particularly limited, but is preferably 12 parts by weight or more, and more preferably 18 to 35 parts by weight with respect to 100 parts by weight of the dispersing-agent-dispersed liquid.

The first treatment may be performed by stirring using various types of agitators in a state in which the pigments and the first inorganic beads are added to the dispersing-agent-dispersed liquid.

Examples of agitators that can be used in the first treatment include a ball mill or other media-type dispersing device, a Dispermill or other single-shaft or twin-shaft mixer, or the like.

The stirring time (processing time of the first treatment) for which the agitator is used is not particularly limited, but is preferably 10 to 120 minutes, and more preferably 15 to 40 minutes. Fine-particle formation (fine dispersion) of the pigments can thereby be efficiently advanced without reducing the production properties of the ink.

The speed of the stirring vanes of the agitator in the first treatment is not particularly limited, but is preferably 1000 to 5000 rpm, and more preferably 1200 to 3800 rpm. Fine-particle formation (fine dispersion) of the pigments can thereby be efficiently advanced without reducing the production properties of the ink. Degradation, denaturation, and the like of the thermoplastic resin and other components due to heat and the like can also be reliably prevented.

Second Treatment

A second treatment using second inorganic beads is performed after the first treatment. A pigment dispersion is thereby obtained in which the pigment particles are adequately fine dispersed.

The second treatment may be performed in a state in which the first inorganic beads are included, but the first inorganic beads are preferably removed prior to the second treatment. Fine-particle formation (fine dispersion) of the pigments in the second treatment can thereby be performed with particularly excellent efficiency. The first inorganic beads can be easily and reliably removed by filtration or the like, for example.

The second inorganic beads used in the second treatment preferably have a smaller grain size than the first inorganic beads used in the first treatment. The pigments can thereby be adequately formed into fine-particles (fine dispersed) in the ink ultimately obtained, particularly excellent dispersion stability (long-term dispersion stability) of the pigment particles in the ink over a long period of time can be obtained, and particularly excellent discharge stability of droplets can be obtained.

The average grain size of the second inorganic beads is not particularly limited, but is preferably 0.03 to 0.3 mm, and more preferably 0.05 to 0.2 mm. When the average grain size of the second inorganic beads is within the aforementioned range, the pigments can be formed into fine-particles (fine dispersed) with particularly excellent efficiency in the fine dispersion step as a whole. In contrast, when the average grain size of the second inorganic beads is less than the lower limit of the aforementioned range, severe reduction of the efficiency of fine-particle formation (grain size reduction) of the pigment particles by the second treatment tends to occur according to the type and other characteristics of the pigments. When the average grain size of the second inorganic beads exceeds the upper limit of the aforementioned range, fine-particle formation (fine dispersion) of the pigment particles can be difficult to adequately advance.

The amount of the second inorganic beads used is not particularly limited, but is preferably 100 to 600 parts by weight, and more preferably 200 to 500 parts by weight with respect to 100 parts by weight of the dispersing-agent-dispersed liquid.

The second treatment can be performed using various types of agitators.

Examples of agitators that can be used in the second treatment include a ball mill or other media-type dispersing device, a Dispermill or other single-shaft or twin-shaft mixer, or the like.

The stirring time (processing time of the second treatment) for which the agitator is used is not particularly limited, but is preferably 10 to 120 minutes, and more preferably 15 to 40 minutes. Fine-particle formation (fine dispersion) of the pigments can thereby be adequately advanced without reducing the production properties of the ink.

The speed of the stirring vanes of the agitator in the second treatment is not particularly limited, but is preferably 1000 to 5000 rpm, and more preferably 1200 to 3800 rpm. Fine-particle formation (fine dispersion) of the pigments can thereby be efficiently advanced without reducing the production properties of the ink. Degradation, denaturation, and the like of the thermoplastic resin and other components due to heat and the like can also be reliably prevented.

A case was described above in which the fine dispersion process was performed in two stages, but three or more stages of processing may also be performed. In such a case, the inorganic beads used in the later stages preferably have a smaller diameter than the inorganic beads used in the first stages. In other words, the average grain size of the inorganic beads ($n^{th}$ inorganic beads) used in the $n^{th}$ process is preferably smaller than the average grain size of the inorganic beads ($(n-1)^{th}$ inorganic beads) used in the $(n-1)^{th}$ process. By satisfying such a relationship, the pigment particles can be formed into fine-particles (fine dispersed) with particularly excellent efficiency, and the diameter of the pigment particles can be reduced in the ink ultimately obtained.

In the fine dispersion step (e.g., the first treatment and the second treatment), the solvent may be used for dilution or the like, for example, as needed.

Curable Resin Mixing Step

The pigment dispersion obtained in the fine dispersion step such as described above is mixed with the curable resin material (curable resin mixing step). The ink (color filter ink) is thereby obtained.

The present step is preferably performed in a state in which the second inorganic beads used in the second treatment have been removed. The second inorganic beads can be easily and reliably removed by filtration, for example.

The present step can be performed using various types of agitators.

Examples of agitators that can be used in the present step include a Dispermill or other single-shaft or twin-shaft mixer, or the like.

The stirring time (processing time of the present step) for which the agitator is used is not particularly limited, but is preferably 1 to 60 minutes, and more preferably 15 to 40 minutes.

The speed of the stirring vanes of the agitator in the present step is not particularly limited, but is preferably 1000 to 5000 rpm, and more preferably 1200 to 3800 rpm.

In the present step, a liquid having a different composition than the solvent used in the aforementioned step may be added. A ink having the desired characteristics can thereby be reliably obtained while dispersion of the dispersing agent in the aforementioned preparatory dispersion step, and fine dispersion of the pigment particles in the fine dispersion step are appropriately performed.

In the present step, at least a portion of the solvent used in the aforementioned step may be removed prior to mixing of the pigment dispersion and the curable resin material, and after mixing of the pigment dispersion and the curable resin material. The composition of the solvent in the preparatory dispersion step and the fine dispersion step, and the composition of the solvent in the ink ultimately obtained can thereby be made to differ from each other. As a result, a ink having the desired characteristics can be reliably obtained while dispersion of the dispersing agent in the aforementioned preparatory dispersion step, and fine dispersion of the pigment particles in the fine dispersion step are appropriately performed.

The solvent can be removed by placing the liquid to be removed in a reduced-pressure atmosphere, heating, or another method, for example.

Ink Set

The ink such as that described above is used in the manufacture of a color filter using an inkjet method. A color filter ordinarily has colored portions having a plurality of colors (ordinarily, RGB corresponding to the three primary colors of light) in correlation with a full color display. A plurality of types of ink that correspond to the plurality of colors of colored portions is used in the formation of the colored portions. In other words, an ink set provided with a plurality of colors of ink is used in the manufacture of a color filter. In the present invention, it is sufficient insofar as a ink such as described above is used to form at least one type of colored portion in the manufacturing of a color filter, but the ink is preferably used to form all of the colors of colored portions.

Image Display Device

Preferred embodiments of the liquid crystal display device, which is an image display device (electrooptic device) having the color filter 1, will next be described.

Figure 8:
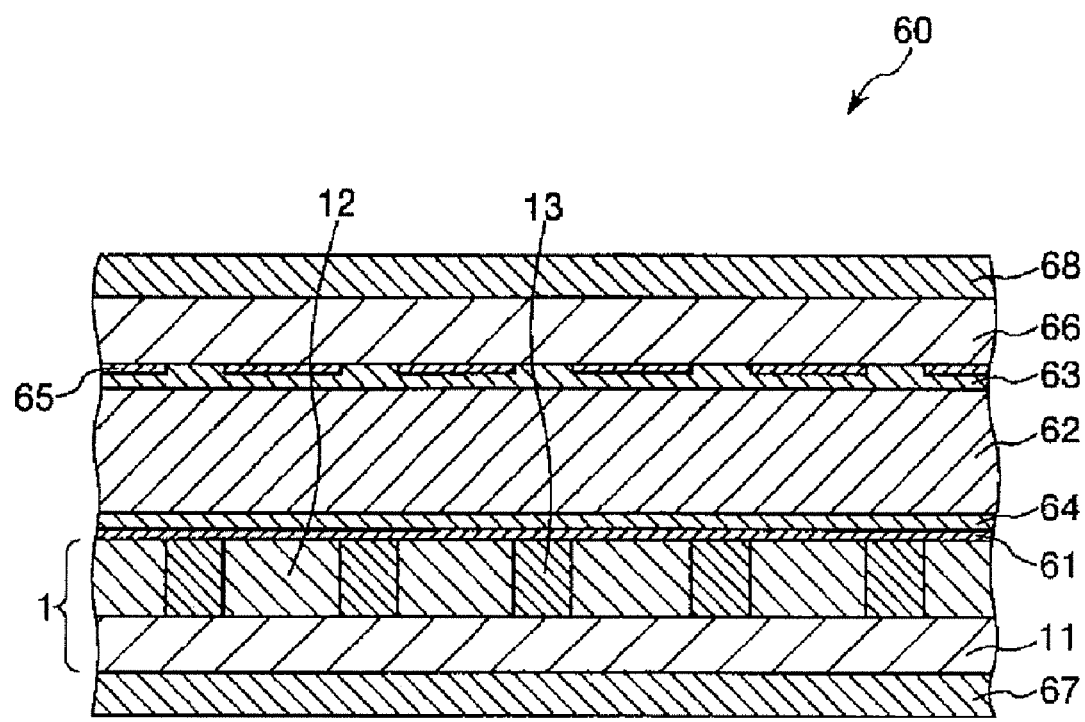
FIG. 8 is a cross-sectional view showing an embodiment of a liquid crystal display device.

FIG. 8 is a cross-sectional view showing a preferred embodiment of the liquid crystal display device. As shown in the diagram, the liquid crystal display device 60 has a color filter 1, a substrate (opposing substrate) 66 arranged on the surface on which the colored portions 12 of the color filter 1 are disposed, a liquid crystal layer 62 composed of a liquid crystal sealed in the gaps between the color filter 1 and the substrate 66, a polarizing plate 67 disposed on the surface (lower side in FIG. 8) opposite from the surface that faces the liquid crystal layer 62 of the substrate 11 of the color filter 1, and a polarizing plate 68 disposed on the side (upper side in FIG. 8) opposite from the surface that faces liquid crystal layer 62 of the substrate 66. A shared electrode 61 is disposed on the surface (the surface opposite from the surface facing the substrate 11 of the colored portions 12 and the partition wall 13) on which the colored portions 12 and the partition wall 13 of the color filter 1 are disposed. Pixel electrodes 65 are disposed in the form of a matrix in positions that correspond to the colored portions 12 of the color filter 1 on the substrate (opposing substrate) 66, facing the liquid crystal layer 62 and color filter 1. An alignment film 64 is disposed between the shared electrode 61 and the liquid crystal layer 62, and an alignment film 63 is disposed between the substrate 66 (pixel electrodes 65) and the liquid crystal layer 62.

The substrate 66 is a substrate having optical transparency with respect to visible light, and is a glass substrate, for example.

The shared electrode 61 and the pixel electrodes 65 are composed of a material having optical transparency with respect to visible light, and are ITO or the like, for example.

Although not depicted in the diagram, a plurality of switching elements (e.g., TFT: thin film transistors) is disposed so as to correspond to the pixel electrodes 65. The pixel electrodes 65 corresponding to the colored portions 12 can be used to control the transmission properties of light in areas that correspond to the colored portions 12 (pixel electrodes 65) by controlling the state of the voltage applied between the shared electrode 61 and the pixel electrodes.

In the liquid crystal display device 60, light emitted from the backlight, which is not depicted, is incident from the polarizing plate 68 side (the upper side in FIG. 8). The light that passes through the liquid crystal layer 62 and enters the colored portions 12 (12A, 12B, 12C) of the color filter 1 is emitted from the polarizing plate 67 (lower side of FIG. 8) as light having a color that corresponds to the colored portions 12 (12A, 12B, 12C).

As described above, since the colored portions 12 are formed using the color filter manufacturing method of the present invention, color mixing between adjacent colored portions 12 is prevented. As a result, the liquid crystal display device 60 has excellent color reproduction properties.

Electronic Device

A liquid crystal display device or another image display device (electrooptic device) 1000 having a color filter 1 such as that described above can be used in a display unit of a variety of electronic equipment.

Figure 9:
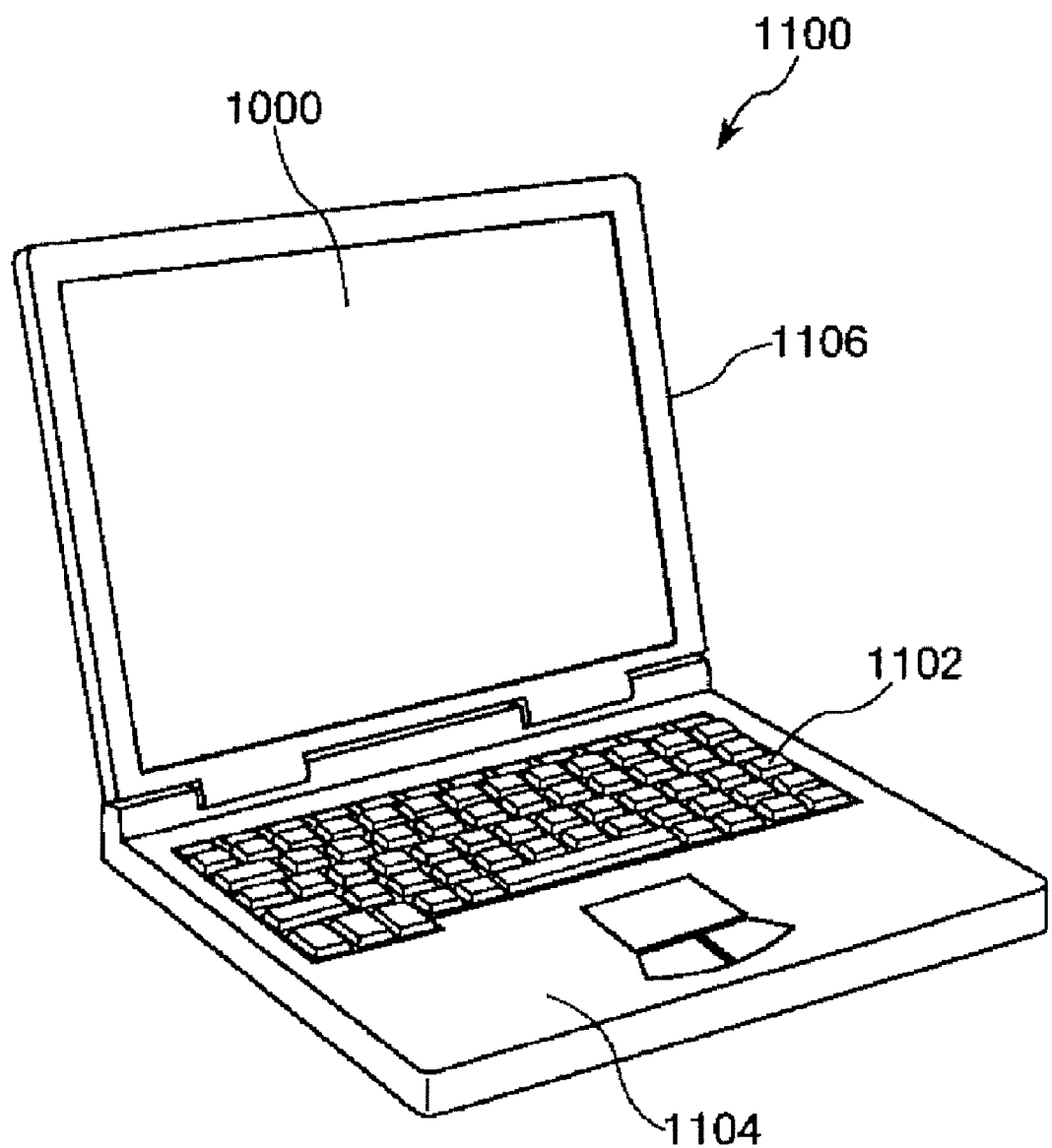
FIG. 9 is a perspective view showing a mobile (or notebook) personal computer exemplifying an electronic device in accordance with the present invention.

FIG. 9 is a perspective view showing the configuration of a mobile (or notebook) personal computer to which the electronic equipment of the present invention has been applied.

In the diagram, a personal computer 1100 is composed of a main unit 1104 provided with a keyboard 1102, and a display unit 1106. The display unit 1106 is rotatably supported by the main unit 1104 via a hinge structure.

In the personal computer 1100, the display unit 1106 is provided with an image display device 1000.

Figure 10:
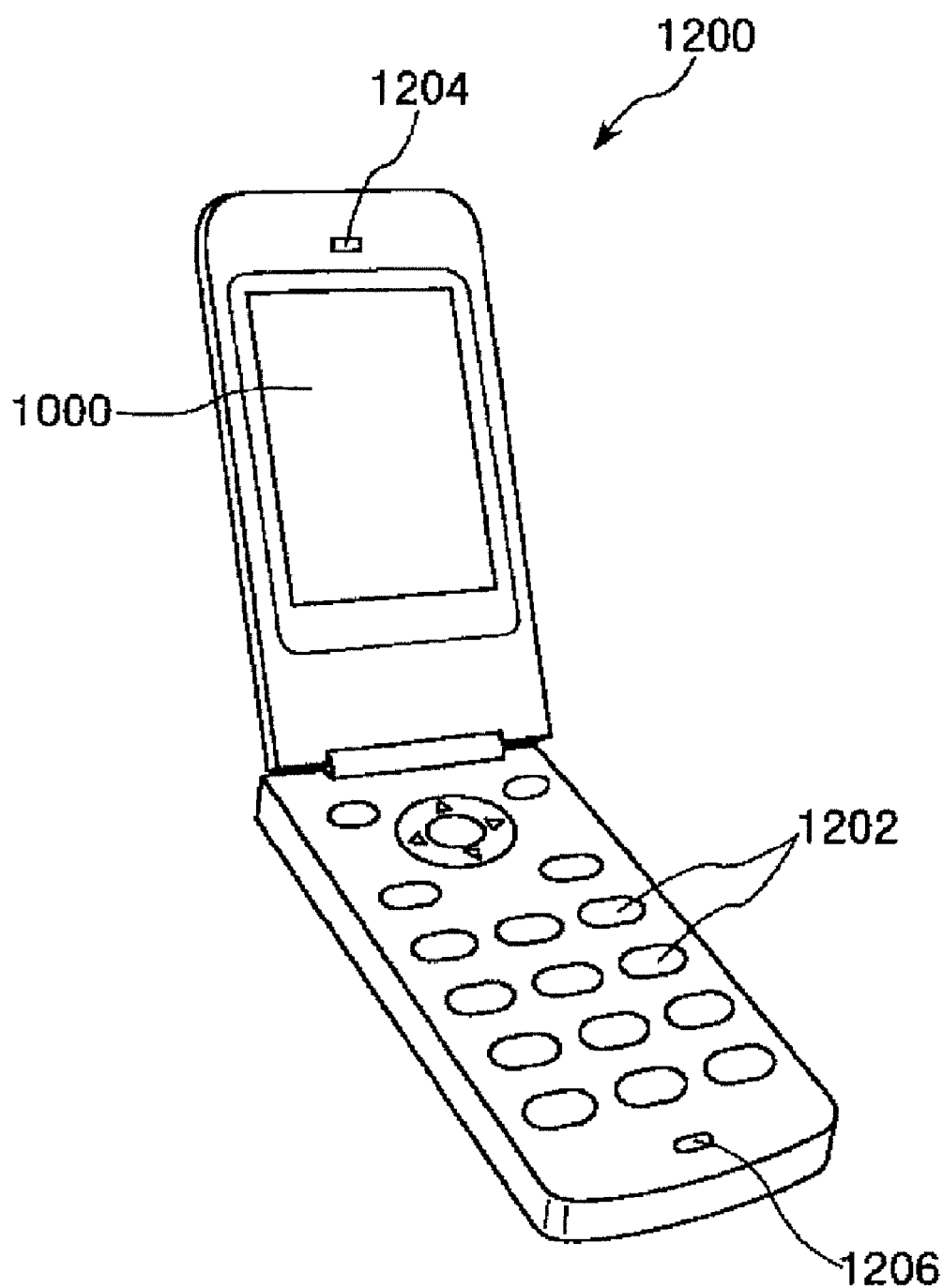
FIG. 10 is a perspective view showing a portable telephone (including PHS) exemplifying an electronic device in accordance with the present invention.

FIG. 10 is a perspective view showing the configuration of a portable telephone (including PHS) to which the electronic device of the present invention has been applied.

In the diagram, the portable telephone 1200 has a plurality of operating buttons 1202, an earpiece 1204, and a mouthpiece 1206, as well as an image display device 1000 provided to the display unit.

FIG. 11 is a perspective view showing the configuration of a digital still camera in which the electronic device of the present invention has been applied. In the diagram, connection to external apparatuses is displayed in a simplified manner.

In this case, an ordinary camera exposes a silver-salt photography film to the optical image of a photographed object, but in contrast, a digital still camera 1300 photoelectrically converts the optical image of a photographed image and generates an imaging signal (image signal) with the aid of a CCD (Charge Coupled Device) or another imaging element.

An image display device 1000 is disposed in the display portion on the back surface of a case (body) 1302 in the digital still camera 1300, is configured to perform display operation on the basis of a pickup signal from the CCD, and functions as a finder for displaying the photographed object as an electronic image.

A circuit board 1308 is disposed inside the case. The circuit board 1308 has a memory that can store (record) the imaging signal.

A photo-detection unit 1304 that includes an optical lens (imaging optical system), a CCD, and the like is disposed on the front surface side (back surface side in the configuration of the diagram) of the case 1302.

A photographer confirms the image of the object to be photographed displayed on the display unit, and the imaging signal of the CCD when a shutter button 1306 is pressed is transferred and stored in the memory of the circuit board 1308.

In the digital still camera 1300, a video signal output terminal 1312 and a data communication I/O terminal 1314 are disposed on the side surface of the case 1302. A television monitor 1430 is connected to the video signal output terminal 1312 as required, and a personal computer 1440 is connected to the data communication I/O terminal 1314 as required, as shown in the diagram. An imaging signal stored in the memory of the circuit board 1308 is configured to be outputted by a prescribed operation to the television monitor 1430 and the personal computer 1440.

The electronic device of the present invention may be applied to the above-described personal computer (mobile personal computer), portable telephone, and digital still camera, and other examples include televisions (e.g., liquid crystal display devices), video cameras, view finder-type and direct-view monitor-type video tape recorders, laptop personal computers, car navigation devices, pagers, electronic assistants (including those with a communication function), electronic dictionaries, calculators, electronic game devices, word processors, work stations, videophones, security television monitors, electronic binoculars, POS terminals, apparatuses having a touch panel (e.g., cash dispensers for financial institutions, and automatic ticketing machines), medical equipment (e.g., electronic thermometers, sphygmomanometers, blood glucose sensors, electrocardiograph display devices, ultrasound diagnostic devices, and endoscopic display devices), fish finders, various measuring apparatuses, instruments (e.g., instruments in vehicles, aircraft, and ships), flight simulators, and various other monitors, and projectors, and other projection display devices. Among these, televisions have display units that are tending to become markedly larger in recent years, but in electronic devices having such a large display unit (e.g., a display unit having a diagonal length of 80 cm or more), color mixing occurs between adjacent colored portions, and problems in color reproduction properties occur readily when a color filter manufactured using a conventional color filter manufacturing method is used. However, the occurrence of such problems can be reliably prevented through the use of the present invention. In other words, the effect of the present invention is more markedly demonstrated when application is made to an electronic device having a large display unit such as that described above.

The present invention above was described based on preferred embodiments, but the present invention is not limited to these embodiments.

For example, in the embodiments described above, the landing prohibition region was described as being provided to both edges of the cell, but this configuration is not limiting, and a landing prohibition region may be provided to only one edge of a cell.

The ink is also not limited to being obtained by a method such as described above.

It is also possible to substitute or to add as another configuration the parts constituting a color filter, image display device, and electronic device with any part that demonstrates the same function.

EXAMPLES

Next, specific examples of the present invention will be described.

1. Synthesis of Polymer

Preparation of Polymer Solution

Synthesis Example 1

As the medium (solvent), 37.6 parts by weight of 1,3-butylene glycol diacetate was placed in a 1-L reaction container provided with an agitator, a reflux condenser, a dropping funnel, a nitrogen introduction tube, and a temperature gauge, and heated to 90° C. Next, 2 parts by weight of 2,2'- azobis(isobutyronitrile) (AIBN) and 3 parts by weight 1,3-butylene glycol diacetate (solvent) were added, and a solution in which 27 parts by weight of (3,4-epoxycyclohexyl)methyl methacrylate (product name: Cyclomer M100, manufactured by Daicel Chemical Industries), 1.5 parts by weight of 2-(0-[1'-methylpropylideneamino]carboxyamino)ethyl methacrylate (product name: MOI-BM, manufactured by Showa Denko), and 1.5 parts by weight of 2-hydroxyethyl methacrylate (HEMA) were admixed was dropped over about 4 hours using a dropping pump. Also, a solution (polymerization initiator solution) in which 5 parts by weight of dimethyl 2,2'-azobis(isobutyrate) (product name V-601, manufactured by Wako Pure Chemical Industries) as the polymerization initiator were dissolved in 20 parts by weight of 1,3-butylene glycol diacetate (medium) was dropped over about 4 hours using a separate dropping pump. After the dropping of the polymerization initiator solution was completed, 0.2 part by weight of AIBN and 1 part by weight of 1,3-butylene glycol diacetate (medium) was added and held for about 2 hours at about the same temperature, after which 0.2 part by weight of AIBN and 1 part by weight of 1,3-butylene glycol diacetate (medium) was added and held for about 2 hours at about the same temperature, and then cooled to room temperature to obtain a polymer solution A1 containing a polymer A.

Synthesis Example 2

The same operation as synthesis example 1 described above was carried out, except that the type of monomer components, usage amount, and type of medium (solvent) used in the synthesis of the polymer (preparation of the polymer solution) were varied in the manner shown in Table 1. As a result, a polymer solution A2 containing a polymer A was obtained.

Synthesis Example 3

The same operation as synthesis example 1 described above was carried out, except that 30 parts by weight of γ-methacryloxypropyl trimethoxysilane (product name: SZ6030, manufactured by Dow Corning Toray) was used in place of (3,4-epoxycyclohexyl)methyl methacrylate (product name: Cyclomer M100, manufactured by Daicel Chemical Industries), 2-(0-[1'-methylpropylideneamino]carboxyamino)methacrylate (product name: MOI-BM, manufactured by Showa Denko), and 2-hydroxyethyl methacrylate (HEMA). As a result, a polymer solution B1 (homopolymer) containing a polymer B was obtained.

Synthesis Example 4

The same operation as synthesis example 3 described above was carried out, except that the type of monomer components, usage amount, and type of medium (solvent) used in the synthesis of the polymer (preparation of the polymer solution) were varied in the manner shown in Table 1. As a result, a polymer solution B2 containing a polymer B was obtained.

Synthesis Example 5

The same operation as synthesis example 1 described above was carried out, except that 30 parts by weight of 1H,1H,5H-octafluoropentyl methacrylate (product name: Biscoat 8FM, manufactured by Osaka Organic Chemical Industry) was used in place of (3,4-epoxycyclohexyl)methyl methacrylate (product name: Cyclomer M100, manufactured by Daicel Chemical Industries), 2-(0-[1'-methylpropylideneamino]carboxyamino)methacrylate (product name: MOI-BM, manufactured by Showa Denko), and 2-hydroxyethyl methacrylate (HEMA). As a result, a polymer solution C1 (homopolymer solution) containing a polymer C was obtained.

Synthesis Example 6

The same operation as synthesis example 5 described above was carried out, except that the type of monomer components, usage amount, and type of medium (solvent) used in the synthesis of the polymer (preparation of the polymer solution) were varied in the manner shown in Table 1. As a result, a polymer solution C2 containing a polymer C was obtained.

The type of material and usage amount (composition of the polymer synthesized in synthesis examples 1 to 6) used in the synthesis of the polymers (preparation of the polymer solutions) in the synthesis example 1 to 6 are summarized in Table 1. In the table, "S" refers to a medium (solvent), and more particularly "S1" refers 1,3-butylene glycol diacetate, "S2" refers to diethylene glycol monobutyl ether acetate, "V-601" refers to dimethyl 2,2'-azobis(isobutyrate), "AIBN" refers to 2,2'-azobis(isobutyronitrile), "a1" refers to (3,4-epoxycyclohexyl)methyl methacrylate (Cyclomer M100), "a2" refers to 2-(0-[1'-methylpropylideneamino]carboxyamino)ethyl methacrylate (MOI-BM), "a3" refers to 2-hydroxyethyl methacrylate (HEMA), "b1" refers to γ-methacryloxypropyl trimethoxysilane (SZ6030), "b2" refers to ethyl methacrylate, "c1-1" refers to 1H,1H,5H-octafluoropentyl methacrylate (Biscoat 8FM), "c1-2" refers to 1,2,3,4,5-pentafluorostyrene, and "c2" refers to cyclohexyl methacrylate. Also shown in the table are the weight-average molecular weights Mw of the polymers that constitute the polymer solutions.

TABLE 1

| | COMPONENTS (PARTS BY WEIGHT) MONOMER COMPONENT | | | | | | | | | | | | SOLVENT (S) | POLYMER |
|---|---|---|---|---|---|---|---|---|---|---|---|---|---|---|
| | a1 | a2 | a3 | a4 | b1 | b2 | c1-1 | c1-2 | c2-2 | M | V-601 | AIBN | COMPOSITION | Mw |
| POLYMER SOLUTION A1 | 27 | 1.5 | 1.5 | — | — | — | — | — | — | 62.6 | 5 | 2.4 | S1 | 2700 |
| POLYMER SOLUTION A2 | 25 | 1 | 2 | 2 | — | — | — | — | — | 62.6 | 5 | 2.4 | S2 | 2800 |
| POLYMER SOLUTION B1 | — | — | — | — | 30 | — | — | — | — | 62.6 | 5 | 2.4 | S1 | 2800 |

TABLE 1-continued

| | COMPONENTS (PARTS BY WEIGHT) MONOMER COMPONENT | | | | | | | | | | | SOLVENT (S) | POLYMER |
|---|---|---|---|---|---|---|---|---|---|---|---|---|---|
| | a1 | a2 | a3 | a4 | b1 | b2 | c1-1 | c1-2 | c2-2 | M | V-601 | AIBN | COMPOSITION | Mw |
| POLYMER SOLUTION B2 | — | — | — | — | 26 | 4 | — | — | — | 62.6 | 5 | 2.4 | S2 | 2800 |
| POLYMER SOLUTION C1 | — | — | — | — | — | — | 30 | — | — | 62.6 | 5 | 2.4 | S1 | 2800 |
| POLYMER SOLUTION C2 | — | — | — | — | — | — | — | 28 | 2 | 62.6 | 5 | 2.4 | S2 | 2800 |

2. Preparation of Color Filter Ink

Ink Set

Ink Set 1

Added to an agitator (single-shaft mixer) having a capacity of 400 cc were 5.04 g (14 parts by weight) of Disperbyk 111 as a dispersing agent, 28.07 g (78 parts by weight) of Disperbyk 166 as a dispersing agent, 19.43 g (54 parts by weight) of SPCN-17X (manufactured by Showa Highpolymer) as a thermoplastic resin, and 91.05 g (253 parts by weight) of 1,3-butylene glycol diacetate as a solvent, and a dispersing-agent-dispersed liquid was obtained by stirring the mixture for 10 minutes in a Dispermill and performing preparatory dispersion (preparatory dispersion step). The speed of the stirring vanes of the agitator at this time was set to 2000 rpm.

Pigments were then added as described below to the dispersing-agent-dispersed liquid obtained by the preparatory dispersion step, inorganic beads were added in multiple stages, and the fine dispersion step of performing the fine dispersion process was performed.

First, 35.99 g (100 parts by weight) of pigments were added at once to the obtained dispersing-agent-dispersed liquid, and the mixture was stirred for 10 minutes. At this time, the speed of the stirring vanes of the agitator was set to 2000 rpm. The mixture used as the pigments included 25.85 g of a mixture of C. I. Pigment Red 254 and a pigment derivative indicated by Formula (5), 7.60 g of a mixture of C. I. Pigment Red 177 and a pigment derivative indicated by Formula (4), and 3.55 g of a powdered sulfonated pigment derivative having the chemical structure indicated by Formula (6). At this time, the mixture of the pigments and the dispersing-agent-dispersed liquid was diluted by 1,3-butylene glycol diacetate as a first liquid medium to give a pigment content ratio of 16 wt %.

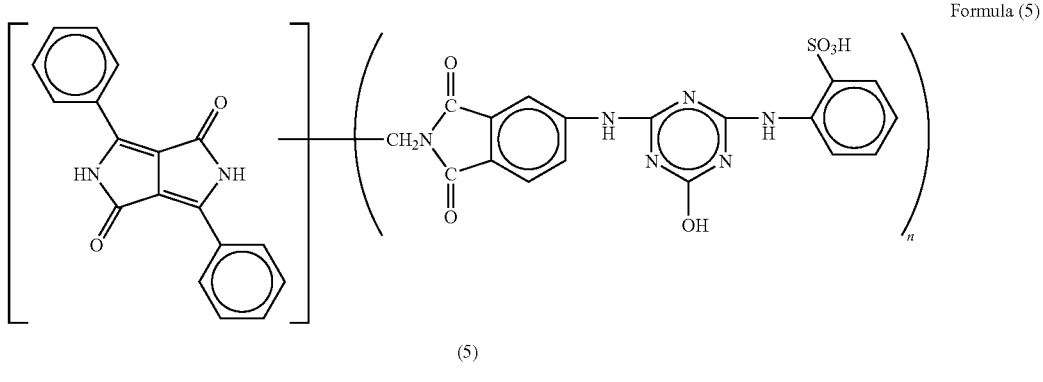

Formula (5)

(5)

In Formula (5), n is an integer from 1 to 4.

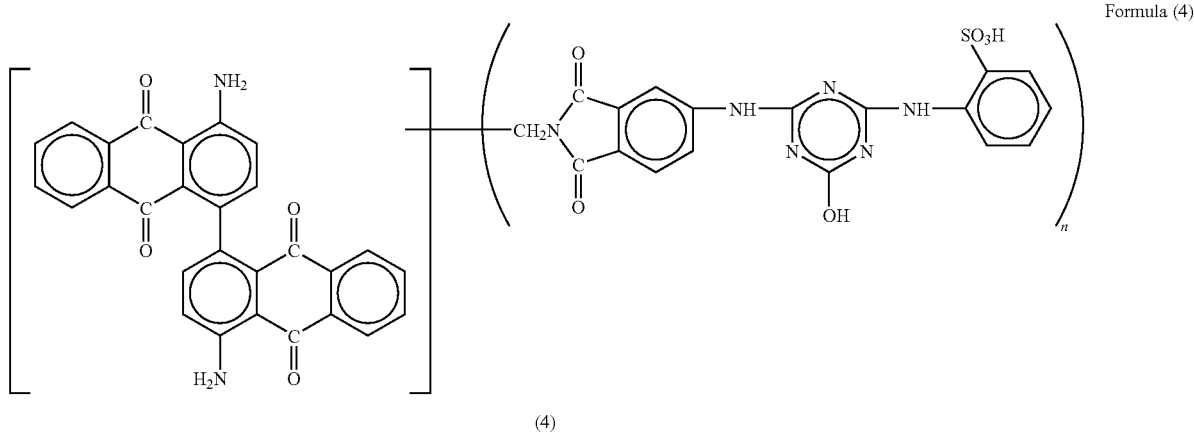

Formula (4)

(4)

In Formula (4), n is an integer from 1 to 4.

Formula (6)

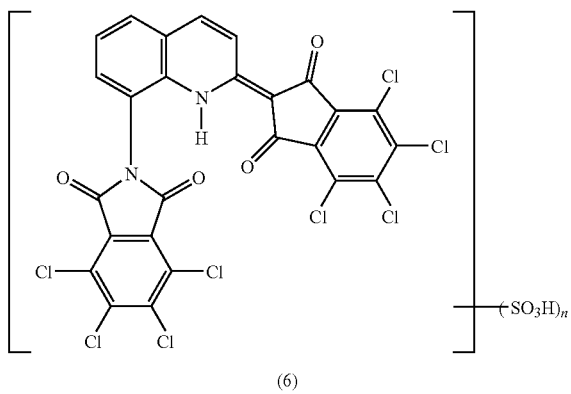

(6)

In Formula (6), n is an integer from 1 to 5.

Next, inorganic beads (first inorganic beads: zirconia beads; "Toray Ceram grinding balls" (trade name); manufactured by Toray) having an average grain size of 0.8 mm were then added, the mixture was stirred for 30 minutes at room temperature, and the first stage of dispersion processing (first treatment) was performed. At this time, the speed of the stirring vanes of the agitator was set to 2000 rpm.

The inorganic beads (first inorganic beads) were then removed by filtration using a filter ("PALL HDCII Membrane Filter"; manufactured by PALL), after which inorganic beads (second inorganic beads: zirconia beads; "Toray Ceram grinding balls" (trade name); manufactured by Toray) having an average grain size of 0.1 mm were added, the mixture was further stirred for 30 minutes, and the second stage of dispersion processing (second treatment) was performed. At this time, the speed of the stirring vanes of the agitator was set to 2000 rpm. The mixture was also diluted by 1,3-butylene glycol diacetate as a first liquid medium.

The inorganic beads (second inorganic beads) were then removed by filtration using a filter ("PALL HDCII Membrane Filter"; manufactured by PALL), and a pigment dispersion was obtained.

The pigment dispersion obtained as described above, the polymer solution A1, the polymer solution B1, the polymer solution C1, and 1,3-butylene glycol diacetate as a solvent were then mixed. The present step was performed by placing the abovementioned pigment dispersion, polymer solution A1, polymer solution B1, and polymer solution C1 in a 400 cc agitator (single-shaft mixer) and stirring the mixture for 10 minutes in a Dispermill. At this time, the speed of the stirring vanes of the agitator was set to 2000 rpm. The desired red color filter ink (R ink) was thereby obtained. The pigment content ratio of the R ink at this time was 7.3 wt %.

A green color filter ink (G ink) and a blue color filter ink (B ink) were prepared in the same manner as the red color filter ink described above, except that the type of pigment and the usage amount of each component were varied. A first ink set corresponding to the R ink and composed of the three colors R, G, B was thereby obtained. The average grain size of the pigment constituting the R ink, the average grain size of the pigment constituting the G ink, and the average grain size of the pigment constituting the B ink were 70 nm, 70 nm, and 70 nm, respectively. Also, C. I. Pigment Green 58 and a powdered sulfonated pigment derivative having the chemical structure indicated by Formula (3) were used as the G ink pigments, and the content ratio of pigments in the final G ink was 10.1 wt %. Also, C. I. Pigment Blue 15:6 was used as the pigment of the B ink, and the content ratio of pigment in the final B ink was 4.9 wt %.

Ink Sets 2 and 3

Color filter ink sets were prepared in the same manner as Ink Set 1, except that the types and usage amounts of materials used to prepare the color inks were varied as shown in Table 2.

Table 2 also shows the compositions and characteristics of the ink sets.

In the table, C. I. Pigment Red 254 is referred to as "PR254," C. I. Pigment Red 177 is referred to as "PR177," C. I. Pigment Green 58 is referred to as "PG58," C. I. Pigment Green 36 is referred to as "PG36," C. I. Pigment Blue 15:6 is referred to as "PB15:6," C. I. Pigment Yellow 150 is referred to as "PY150," the mixture of C. I. Pigment Red 254 and the pigment derivative indicated by Formula (5) is referred to as "PR254D," the mixture of C. I. Pigment Red 177 and the pigment derivative indicated by Formula (4) is referred to as "PR177D," 1,3-butylene glycol diacetate is referred to as "S1," diethylene glycol monobutyl ether acetate is referred to as "S2," Disperbyk 111 is referred to as "DA1," Disperbyk 166 is referred to as "DA2," and SPCN-17X is referred to as "DR1."

In the uncured resin material column in Table 2, the polymer included in the polymer solution A1 is indicated as A1. In the same manner, the polymers included in the polymer solutions A2 to A9, B1 to B5, and C1 to C3 are referred to as A2 to A9, B1 to B5, and C1 to C3, respectively. The viscosities were measured using an E-type viscometer (e.g., RE-01 manufactured by Toki Sangyo) at 25° C. in accordance with JIS Z8809.

TABLE 2

| | | COLOR INK COMPOSITION | | | | | | | |
|---|---|---|---|---|---|---|---|---|---|
| | | PIGMENT | | THERMOPLASTIC RESIN | | CURABLE RESIN MATERIAL | | DISPERSING AGENT | |
| | | TYPE | CONTENT RATIO (wt %) | TYPE | CONTENT RATIO (wt %) | TYPE | CONTENT RATIO (wt %) | TYPE | CONTENT RATIO (wt %) |
| INK SET 1 | R INK | PR177D/PR254D/SPD | 5.1/1.5/0.7 | DR1 | 3.9 | A1/B1/C1 | 0.8/0.8/0.4 | DA1 | 1.0 |
| | G INK | PG58/SPD | 9.1/1.0 | DR1 | 8.0 | A1/B1/C1 | 0.8/0.8/0.4 | DA1 | 1.2 |
| | B INK | PB15:6 | 4.9 | DR1 | 4.3 | A1/B1/C1 | 0.8/0.8/0.4 | DA1 | 0.7 |
| INK SET 2 | R INK | PR177D/PR254D/SPD | 5.1/1.5/0.7 | DR1 | 3.9 | A2/B2/C2 | 0.8/0.8/0.4 | DA1 | 1.0 |
| | G INK | PG58/SPD | 9.1/1.0 | DR1 | 8.0 | A7/B6/C3 | 0.8/0.8/0.4 | DA1 | 1.2 |
| | B INK | PB15:6 | 4.9 | DR1 | 4.3 | A7/B6/C3 | 0.8/0.8/0.4 | DA1 | 0.7 |

TABLE 2-continued

| INK SET 3 | R INK | PR177D/PR254D/SPD | 5.1/1.5/0.7 | DR1 | 3.9 | A1/B1 | 1.1/1.0 | DA1 | 1.0 |
| | G INK | PG58/SPD | 9.1/1.0 | DR1 | 8.0 | A1/B1 | 1.1/1.0 | DA1 | 1.2 |
| | B INK | PB15:6 | 4.9 | DR1 | 4.3 | A1/B1 | 1.1/1.0 | DA1 | 0.7 |

| | | | COLOR INK | | | | |
| --- | --- | --- | --- | --- | --- | --- | --- |
| | | | COMPOSITION | | | | |
| | | | DISPERSING AGENT | | SOLVENT | | |
| | | | TYPE | CONTENT RATIO (wt %) | TYPE | CONTENT RATIO (wt %) | CURING AGENT (wt %) | VISCOSITY (mPa·s) |
| INK SET 1 | R INK | | DA2 | 5.7 | S1 | 80.1 | — | 10.1 |
| | G INK | | DA2 | 3.6 | S1 | 75.1 | — | 8.3 |
| | B INK | | DA2 | 2.1 | S1 | 86.0 | — | 8.4 |
| INK SET 2 | R INK | | DA2 | 5.7 | S2 | 80.1 | — | 10.0 |
| | G INK | | DA2 | 3.6 | S2 | 75.1 | — | 8.9 |
| | B INK | | DA2 | 2.1 | S2 | 86.0 | — | 9.0 |
| INK SET 3 | R INK | | DA2 | 5.7 | S3 | 80.0 | — | 10.2 |
| | G INK | | DA2 | 3.6 | S3 | 75.0 | — | 8.0 |
| | B INK | | DA2 | 2.1 | S3 | 85.9 | — | 7.6 |

3. Manufacture of Color Filters

Example 1

A color filter was manufactured as described below using the ink set 1 obtained as described above.

First, a substrate (G5 size: 1100×1300 mm) composed of soda glass on which a silica (SiO$_2$) film for preventing elution of the sodium ions was formed on the two sides was prepared and washed.

Next, a radiation-sensitive composition for forming a partition wall containing carbon black was applied to the entire surface of one of the surfaces of the washed substrate to form a coated film.

Next, a prebaking treatment was performed at a heating temperature of 110° C. and a heating time of 120 seconds.

The substrate was thereafter irradiated via a photomask, subjected to post exposure baking (PEB), subsequently developed using an alkali development fluid, and then subjected to a post baking treatment to thereby form a partition wall. PEB was carried out at a heating temperature of 110° C., a heating time of 120 seconds, and an irradiation intensity of 150 mJ/cm$^2$. The development treatment time was set to 60 seconds. The post baking treatment was carried out at a heating temperature of 150° C. for a heating time of 5 minutes. The thickness of the partition wall thus formed was 2.1 μm. The width $L_3$ in the movement direction (Y-axis direction) of the cell substrate with respect to the droplet discharge head was 100 μm.

Next, the ink was discharged into the cells as areas surrounded by the partition wall by using a droplet discharge device such as that shown in FIGS. 3 to 6. In this case, three color filter inks were used. A droplet discharge head was used in which the nozzle plate had been bonded using an epoxy adhesive (AE-40, manufactured by Ajinomoto Fine-Techno). The droplets were set so as not to land in the regions (landing prohibition regions) at a width $L_1$ (20.0 μm) from both edges of the cells in the direction (Y-axis direction) of movement of the substrate relative to the droplet discharge head. The average diameter $L_2$ of the droplets discharged from the droplet discharge device was set to 5.0 μm. The movement speed of the substrate relative to the droplet discharge head was set to 300 mm/second.

Thereafter, heat treatment is carried out for 10 minutes at 100° C. on a hot plate, and heat treatment was then carried out for one hour in an oven at 200° C., whereby three colored portions were formed. A color filter such as that shown in FIG. 1 was thereby obtained.

Examples 2 Through 7

Color filters were manufactured in the same manner as in Example 1, except that the cell sizes were changed as shown in Table 3, and the width $L_1$ of the landing prohibition regions, the average diameter $L_2$ of the droplets, and the movement speed of the substrate relative to the droplet discharge head were also varied as shown in Table 3.

Examples 8 and 9

Color filters were manufactured in the same manner as in Example 1, except that the ink sets 1 were changed to the ink sets shown in Table 3.

Comparative Examples 1 and 2

Color filters were manufactured in the same manner as in Example 1, except that the cell width $L_3$ was changed as shown in Table 3, and the width $L_1$ of the landing prohibition regions, the average diameter $L_2$ of the droplets, and the movement speed of the substrate relative to the droplet discharge head were also varied as shown in Table 3.

Table 3 also shows the cell width and height, and the settings of the droplet discharge device in the examples and comparative examples. The contact angle of the ink with respect to the substrate was also measured in accordance with JIS K 3257 and shown in Table 3.

TABLE 3

| | DROPLET DISCHARGE DEVICE SETTINGS | | | | | | CONTACT ANGLE BETWEEN SUBSTRATE AND INK | | |
|---|---|---|---|---|---|---|---|---|---|
| | SUBSTRATE CELL WIDTH L3 (μm) | SUBSTRATE CELL HEIGHT (nm) | SUBSTRATE MOVEMENT SPEED (mm/sec) | PROHIBITION REGION WIDTH L1 (μm) | AVERAGE DROPLET DIAMETER L2 (μm) | L1/L2 | L1/L3 | R INK (°) | G INK (°) | B INK (°) |
| EXAMPLE 1 | 100.0 | 2.1 | 300.0 | 20.0 | 5.0 | 4.0 | 0.2 | 53 | 50 | 51 |
| EXAMPLE 2 | 100.0 | 2.1 | 300.0 | 8.3 | 16.6 | 0.5 | 0.083 | 53 | 50 | 51 |
| EXAMPLE 3 | 100.0 | 2.1 | 300.0 | 20.0 | 4.4 | 4.5 | 0.2 | 53 | 50 | 51 |
| EXAMPLE 4 | 100.0 | 2.1 | 300.0 | 2.5 | 0.63 | 4.0 | 0.025 | 53 | 50 | 51 |
| EXAMPLE 5 | 50.0 | 2.1 | 300.0 | 25.0 | 12.5 | 2.0 | 0.5 | 53 | 50 | 51 |
| EXAMPLE 6 | 50.0 | 2.1 | 300.0 | 5.0 | 5.0 | 1.0 | 0.1 | 53 | 50 | 51 |
| EXAMPLE 7 | 40.0 | 2.1 | 300.0 | 12.5 | 5.0 | 2.5 | 0.31 | 53 | 50 | 51 |
| EXAMPLE 8 | 350.0 | 1.4 | 300.0 | 20.0 | 5.0 | 4.0 | 0.057 | 53 | 50 | 51 |
| EXAMPLE 9 | 350.0 | 2.6 | 300.0 | 20.0 | 5.0 | 4.0 | 0.057 | 53 | 50 | 51 |
| COMPARATIVE EXAMPLE 1 | 100.0 | 2.1 | 300.0 | 70.0 | 14.0 | 5.0 | 0.7 | 53 | 50 | 51 |
| COMPARATIVE EXAMPLE 2 | 350.0 | 2.1 | 300.0 | 8.0 | 20.0 | 0.4 | 0.023 | 53 | 50 | 51 |

4. Evaluation of Color Filters

The color filters obtained in the manner described above were evaluated in the manner described below 4-1. Evaluation of Color Reproduction Properties A liquid crystal display device such as shown in FIG. 8 was manufactured using the color filters manufactured in the examples and comparative examples.

The transmission spectrum was measured by a spectrophotometer (MCPD 3000, manufactured by Otsuka Electronics) for the obtained liquid crystal display devices using a standard C light source in a state of red monochromatic display, green monochromatic display, and blue monochromatic display. The hue (R(xy), G(xy), B(xy)) according to an xy display system was calculated, the NTSC ratio was computed, and evaluation was performed according to the three ranges described below. A higher NTSC ratio can be considered to indicate higher color reproduction properties.

A: 100NTSC ratio is 80% or higher.
B: NTSC ratio is 73% or higher and less than 80%.
C: NTSC ratio is less than 73%.
D: There is significant fluctuation per pixel due to light leakage and the like, and measurement is meaningless.

4-2. Evaluation of Color Mixing

An arbitrary 1000 pixels of the color filters obtained in the examples and working examples were observed by a microscope, and color mixing was evaluated according to the criteria below.
A: No color mixing or crossover of ink onto the partition wall was observed.
B: Color mixing was not observed, but crossover of ink onto the partition wall was observed, and the occurrence thereof was 1% or less.
C: Color mixing was not observed, but crossover of ink onto the partition wall was observed, and the occurrence thereof was higher than 1%, and 5% or lower.
D: Color mixing was observed, or the occurrence of ink crossover onto the partition wall was higher than 5%.

4-3. Evaluation of Light Leakage

Liquid crystal display devices such as shown in FIG. 8 were assembled using ten color filters from each of the examples and comparative examples.

Visual observation was performed using the liquid crystal display devices in a dark room in a state of red monochromatic display, green monochromatic display, blue monochromatic display, and white monochromatic display, and the occurrence of light leakage (white spots, luminescent spots) was evaluated according to the five ranges shown below.

A: There was no color filter in which light leakage (white spots, luminescent spots) occurred.
B: Light leakage (white spots, luminescent spots) was observed in 1 to 2 color filters.
C: Light leakage (white spots, luminescent spots) was observed in 3 to 5 color filters.
D: Light leakage (white spots, luminescent spots) was observed in 6 to 9 color filters.
E: Light leakage (white spots, luminescent spots) was observed in 10 color filters.

These results are shown in Table 4.

TABLE 4

| | EVALUATION OF COLOR REPRODUCTION PROPERTIES | EVALUATION OF COLOR MIXING | EVALUATION OF LIGHT LEAKAGE |
|---|---|---|---|
| EXAMPLE 1 | A | A | A |
| EXAMPLE 2 | A | B | A |
| EXAMPLE 3 | A | A | B |
| EXAMPLE 4 | A | A | A |
| EXAMPLE 5 | A | A | A |
| EXAMPLE 6 | A | A | A |
| EXAMPLE 7 | A | A | A |
| EXAMPLE 8 | A | A | A |
| EXAMPLE 9 | A | A | A |
| COMPARATIVE EXAMPLE 1 | D | A | E |
| COMPARATIVE EXAMPLE 2 | D | D | C |

As is apparent from Table 4, color mixing was prevented, and excellent color reproduction properties were obtained in the color filters manufactured by the manufacturing method of the present invention. There was also no light leakage. In contrast, satisfactory results were not obtained in the color filters of the comparative examples.

The similar results as described above were also obtained when a commercially available liquid crystal television was disassembled, the liquid crystal display device unit was replaced by a unit manufactured as described above, and the same evaluations as described above were performed.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A color filter manufacturing method comprising:
    discharging droplets of an ink from a droplet discharge head into a plurality of cells formed on a substrate while selectively moving the substrate with respect to the droplet discharge head in one of a first direction and a second direction opposite from the first direction; and
    curing the ink discharged in the cells to form a colored portion within each of the cells,
    the discharging of the droplets including selectively prohibiting landing of the droplets in only one of first and second landing prohibition regions formed at a predetermined width from first and second edges respectively of each of the cells, with each of the first and second landing prohibition regions being arranged so that a relationship $0.5 \leq L1/L2 \leq 4.5$ is satisfied, wherein the value L1 (μm) indicates the predetermined width of each of the first and second landing prohibition regions and the value L2 (μm) indicates an average diameter of the droplets of the ink, wherein the first and second edges are aligned substantially perpendicular to the first and second directions, and one of the first and second edges is the trailing edge relative to the one of the first and second directions,
    the selectively prohibiting landing of the droplets includes selectively prohibiting landing of the droplets in the one of the first and second landing prohibition region that is on the trailing edge side.

2. The color filter manufacturing method according to claim 1, wherein
    the landing prohibition region is arranged such that a relationship $0.025 \leq L_1/L_3 \leq 0.5$ is satisfied, wherein a value $L_3$ (μm) indicates a width of each of the cells in the movement direction of the substrate with respect to the droplet discharge head.

3. The color filter manufacturing method according to claim 1, wherein
    the width L1 of each of the first and second landing prohibition regions is 3.0 to 50.0 μm.

4. The color filter manufacturing method according to claim 1, wherein
    the ink has a viscosity of 13 mPa·s or less at 25° C.

5. The color filter manufacturing method according to claim 1, wherein
    the droplets have a contact angle of 60° or less with respect to the substrate.

6. The color filter manufacturing method according to claim 1, wherein
    the discharging of the droplets includes moving the substrate with respect to the droplet discharge head at a speed of 30 to 400 mm/second.

7. The color filter manufacturing method according to claim 1, wherein
    the substrate includes a partition wall provided between an adjacent pair of the cells with the partition wall having a height of 1.4 to 2.6 μm.

8. The color filter manufacturing method according to claim 1, wherein
    the ink includes at least a colorant, a resin material, and a solvent with the resin material including a first polymer containing at least a first epoxy-containing vinyl monomer as a monomer component.

9. The color filter manufacturing method according to claim 8, wherein
    the first polymer is a copolymer having the first epoxy-containing vinyl monomer and a second vinyl monomer as monomer components, the second vinyl monomer having an isocyanate group or a block isocyanate group in which an isocyanate group is protected by a protective group.

10. The color filter manufacturing method according to claim 8, wherein
    the first polymer is a copolymer having the first epoxy-containing vinyl monomer and a third vinyl monomer as monomer components, the third vinyl monomer having a hydroxyl group.

11. The color filter manufacturing method according to claim 8, wherein
    the resin material further includes a second polymer containing at least an alkoxysilyl-containing vinyl monomer represented by a chemical formula (1) below as a monomer component,

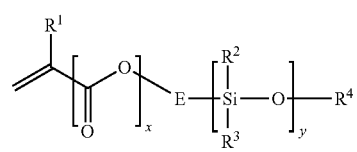

(1)

wherein, in the chemical formula (1), $R^1$ represents a hydrogen atom or a $C_{1-7}$ alkyl group, E represents a single bond hydrocarbon group or a bivalent hydrocarbon group, $R^2$ represents a $C_{1-6}$ alkyl group or a $C_{1-6}$ alkoxyl group, $R^3$ represents a $C_{1-6}$ alkyl group or a $C_{1-6}$ alkoxyl group, $R^4$ represents a $C_{1-6}$ alkyl group, a value x is 0 or 1, and a value y is an integer from 1 to 10.

12. The color filter manufacturing method according to claim 8, wherein the resin material when uncured further includes a third polymer containing at least a fluoroalkyl- or fluoroaryl-containing vinyl monomer represented by a chemical formula (2) below as a monomer component,

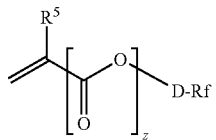 (2)

wherein, in the chemical formula (2), $R^5$ represents a hydrogen atom or a $C_{1-7}$ alkyl group, D represents a single bond hydrocarbon group, a bivalent hydrocarbon group, or a bivalent hydrocarbon group containing a hetero atom, Rf represents a $C_{1-20}$ fluoroalkyl group or fluoroaryl group, and a value z is 0 or 1.

* * * * *